US010915906B2

(12) United States Patent
Keith

(10) Patent No.: US 10,915,906 B2
(45) Date of Patent: Feb. 9, 2021

(54) SYSTEM AND METHOD FOR FACILITATING SECURE SELF PAYMENT TRANSACTIONS OF RETAIL GOODS

(71) Applicant: DIGITAL RETAIL APPS., INC., Toronto (CA)

(72) Inventor: Wendy MacKinnon Keith, Toronto (CA)

(73) Assignee: DIGITAL RETAIL APPS., INC., Toronto (CA)

( * ) Notice: Subject to any disclaimer, the term of this patent is extended or adjusted under 35 U.S.C. 154(b) by 0 days.

(21) Appl. No.: 16/845,991

(22) Filed: Apr. 10, 2020

(65) Prior Publication Data
US 2020/0242620 A1 Jul. 30, 2020

Related U.S. Application Data

(63) Continuation of application No. 15/897,976, filed on Feb. 15, 2018, which is a continuation of application
(Continued)

(51) Int. Cl.
G06Q 20/00 (2012.01)
G06Q 20/42 (2012.01)
(Continued)

(52) U.S. Cl.
CPC ............ G06Q 20/42 (2013.01); G06K 5/00 (2013.01); G06Q 20/12 (2013.01); G06Q 20/20 (2013.01);
(Continued)

(58) Field of Classification Search
CPC ........ G06Q 20/42; G06Q 20/12; G06Q 20/20; G06Q 20/322; G06Q 20/3274; G06K 5/00
(Continued)

(56) References Cited

U.S. PATENT DOCUMENTS 4,964,053 A 10/1990 Humble
5,397,882 A 3/1995 van Solt
(Continued)

FOREIGN PATENT DOCUMENTS

JP 2007-328549 A 12/2007
JP 2009-176259 A 8/2009
(Continued)

OTHER PUBLICATIONS

U.S. Appl. No. 16/845,858, filed Apr. 10, 2020, Keith.
(Continued)

Primary Examiner — Daniel A Hess
(74) Attorney, Agent, or Firm — Jason H. Vick; Sheridan Ross, PC

(57) ABSTRACT

Disclosed herein are various embodiments for systems and methods for self-payment and verification of the purchase of retail goods and services. According to an embodiment of the invention, a method for verifying the purchase using a mobile electronic device in wireless communication with a payment verification system and a code generating system is provided, the method comprising the steps of: receiving from a consumer information identifying an item for purchase; receiving from a consumer information identifying payment means for purchasing the item for purchase; processing the information identifying the item for purchase and information identifying payment means and generating a unique QR code indicating a purchase of the item; sending the unique QR code to a mobile device for display by a consumer to the vendor of the item for purchase.

41 Claims, 20 Drawing Sheets

Related U.S. Application Data

No. 14/988,118, filed on Jan. 5, 2016, now Pat. No. 9,934,506, which is a continuation of application No. 14/189,623, filed on Feb. 25, 2014, now Pat. No. 9,262,781, which is a continuation of application No. 13/801,132, filed on Mar. 13, 2013, now Pat. No. 8,720,771.

(60) Provisional application No. 61/751,653, filed on Jan. 11, 2013, provisional application No. 61/732,268, filed on Nov. 30, 2012, provisional application No. 61/615,140, filed on Mar. 23, 2012.

(51) Int. Cl.
| | |
|---|---|
| *G06K 5/00* | (2006.01) |
| *G06Q 20/32* | (2012.01) |
| *G06Q 20/20* | (2012.01) |
| *G06Q 30/02* | (2012.01) |
| *G06Q 30/06* | (2012.01) |
| *G06Q 20/12* | (2012.01) |
| *G06Q 20/38* | (2012.01) |

(52) U.S. Cl.
CPC ....... *G06Q 20/322* (2013.01); *G06Q 20/3274* (2013.01); *G06Q 20/385* (2013.01); *G06Q 20/3821* (2013.01); *G06Q 30/02* (2013.01); *G06Q 30/06* (2013.01); *G06Q 30/0637* (2013.01)

(58) Field of Classification Search
USPC ..................................................... 235/375
See application file for complete search history.

(56) References Cited

U.S. PATENT DOCUMENTS

| | | | |
|---|---|---|---|
| 5,494,136 | A | 2/1996 | Humble |
| 5,637,846 | A | 6/1997 | Boers et al. |
| 5,923,735 | A | 7/1999 | Swartz et al. |
| 5,965,861 | A | 10/1999 | Addy et al. |
| 5,992,570 | A | 11/1999 | Walter et al. |
| 6,598,791 | B2 | 7/2003 | Bellis, Jr. et al. |
| 6,681,989 | B2 | 1/2004 | Bodin |
| 6,926,202 | B2 | 8/2005 | Noonan |
| 6,954,735 | B1 | 10/2005 | Djupsjobacka et al. |
| 7,044,370 | B2 | 5/2006 | Bellis, Jr. et al. |
| 7,124,940 | B2 | 10/2006 | Som |
| 7,239,241 | B2 | 7/2007 | Claudatos et al. |
| 7,273,168 | B2 | 9/2007 | Linlor |
| 7,364,070 | B2 | 4/2008 | Chang |
| 7,424,447 | B2 | 9/2008 | Fuzell-Casey et al. |
| 7,571,139 | B1 | 8/2009 | Giordano et al. |
| 7,911,346 | B1 | 3/2011 | Claudatos et al. |
| 8,002,175 | B2 | 8/2011 | Kuriyama et al. |
| 8,326,315 | B2 | 12/2012 | Phillips et al. |
| 8,352,323 | B2 | 1/2013 | Fisher |
| 8,396,758 | B2 | 3/2013 | Paradise et al. |
| 8,412,590 | B2 | 4/2013 | Elliott |
| 8,489,112 | B2 | 7/2013 | Roedding et al. |
| 8,494,274 | B2 | 7/2013 | Badharudeen et al. |
| 8,494,908 | B2 | 7/2013 | Herwig et al. |
| 8,510,171 | B2 | 8/2013 | Pederson et al. |
| 8,554,611 | B2 | 10/2013 | Roberts et al. |
| 8,571,939 | B2 | 10/2013 | Lindsey et al. |
| 8,589,245 | B2 | 11/2013 | Michaelis et al. |
| 8,626,187 | B2 | 1/2014 | Grosman et al. |
| 8,626,200 | B2 | 1/2014 | Shaw et al. |
| 8,720,771 | B2 | 5/2014 | MacKinnon Keith |
| 8,732,028 | B2 | 5/2014 | Napper |
| 8,746,557 | B2 | 6/2014 | Connell, II et al. |
| 8,751,316 | B1 | 6/2014 | Fletchall et al. |
| 8,825,531 | B1 | 9/2014 | Catoe |
| 8,880,047 | B2 | 11/2014 | Konicek et al. |
| 8,942,995 | B1 | 1/2015 | Kerr |
| 9,053,473 | B2 | 6/2015 | Edwards |
| 9,262,755 | B2 | 2/2016 | Ran |
| 9,262,781 | B2 | 2/2016 | MacKinnon Keith |
| 9,330,382 | B2 | 5/2016 | Argue et al. |
| 9,721,282 | B2 | 8/2017 | Hitchcock et al. |
| 9,934,506 | B2 | 4/2018 | MacKinnon Keith |
| 9,996,825 | B1 | 6/2018 | Casey et al. |
| 10,068,271 | B1 | 9/2018 | Ben-Amotz |
| 10,127,588 | B2 | 11/2018 | Longino |
| 10,169,960 | B2 | 1/2019 | Inderrieden et al. |
| 10,319,174 | B2 | 6/2019 | Miller et al. |
| 2002/0023027 | A1 | 2/2002 | Simonds |
| 2002/0073025 | A1 | 6/2002 | Tanner et al. |
| 2002/0077937 | A1 | 6/2002 | Lyons et al. |
| 2002/0123932 | A1 | 9/2002 | Brenhouse |
| 2003/0018522 | A1 | 1/2003 | Denimarck et al. |
| 2004/0054592 | A1 | 3/2004 | Hernblad |
| 2004/0093274 | A1 | 5/2004 | Vanska et al. |
| 2004/0143505 | A1 | 7/2004 | Kovach |
| 2006/0033620 | A1 | 2/2006 | Mathewson, II et al. |
| 2006/0043175 | A1 | 3/2006 | Fu et al. |
| 2006/0085477 | A1 | 4/2006 | Phillips et al. |
| 2007/0032225 | A1 | 2/2007 | Konicek et al. |
| 2007/0155489 | A1 | 7/2007 | Beckley et al. |
| 2007/0220597 | A1 | 9/2007 | Ishida |
| 2008/0005036 | A1 | 1/2008 | Morris |
| 2008/0091616 | A1 | 4/2008 | Helwin et al. |
| 2009/0017764 | A1 | 1/2009 | Bonner et al. |
| 2009/0043658 | A1 | 2/2009 | Webb et al. |
| 2009/0061929 | A1 | 3/2009 | Evans |
| 2009/0076875 | A1 | 3/2009 | Lert, Jr. et al. |
| 2009/0224977 | A1 | 9/2009 | Bonner et al. |
| 2009/0248532 | A1 | 10/2009 | Sugiura |
| 2009/0254479 | A1 | 10/2009 | Pharris |
| 2009/0271265 | A1 | 10/2009 | Lay et al. |
| 2009/0287576 | A1 | 11/2009 | Suzuki |
| 2010/0082444 | A1 | 4/2010 | Lin et al. |
| 2010/0082485 | A1 | 4/2010 | Lin et al. |
| 2010/0133335 | A1 | 6/2010 | Maguid et al. |
| 2010/0138344 | A1 | 6/2010 | Wong et al. |
| 2010/0140351 | A1 | 6/2010 | Trenciansky |
| 2010/0145861 | A1 | 6/2010 | Law et al. |
| 2010/0211452 | A1 | 8/2010 | D'Angelo et al. |
| 2011/0055547 | A1 | 3/2011 | Lee et al. |
| 2011/0099104 | A1 | 4/2011 | Nybom |
| 2011/0125561 | A1 | 5/2011 | Marcus |
| 2011/0145051 | A1 | 6/2011 | Paradise et al. |
| 2011/0145092 | A1* | 6/2011 | Paradise ............ G06Q 30/0601 705/26.35 |
| 2011/0145093 | A1 | 6/2011 | Paradise et al. |
| 2011/0270751 | A1 | 11/2011 | Csinger et al. |
| 2011/0307318 | A1 | 12/2011 | LaPorte et al. |
| 2012/0010930 | A1 | 1/2012 | Langdon et al. |
| 2012/0041845 | A1 | 2/2012 | Rothschild |
| 2012/0047011 | A1 | 2/2012 | Rippetoe et al. |
| 2012/0116559 | A1 | 5/2012 | Davis et al. |
| 2012/0136739 | A1 | 5/2012 | Chung |
| 2012/0173351 | A1 | 7/2012 | Hanson et al. |
| 2012/0271712 | A1 | 10/2012 | Katzin et al. |
| 2012/0280040 | A1 | 11/2012 | Carney et al. |
| 2012/0284101 | A1 | 11/2012 | Schiller et al. |
| 2012/0284130 | A1* | 11/2012 | Lewis ................... G06Q 40/00 705/16 |
| 2012/0296751 | A1 | 11/2012 | Napper |
| 2013/0080289 | A1 | 3/2013 | Roy et al. |
| 2013/0110678 | A1 | 5/2013 | Vigier et al. |
| 2013/0110728 | A1 | 5/2013 | Kobres |
| 2013/0151358 | A1 | 6/2013 | Ra |
| 2013/0173403 | A1 | 7/2013 | Grigg et al. |
| 2013/0246218 | A1 | 9/2013 | Gopalan |
| 2013/0254114 | A1 | 9/2013 | Smith |
| 2013/0275221 | A1 | 10/2013 | Zeto, III et al. |
| 2013/0311230 | A1 | 11/2013 | Kellstrand et al. |

(56) References Cited

U.S. PATENT DOCUMENTS

2018/0181965 A1  6/2018  MacKinnon Keith
2019/0080332 A1  3/2019  MacKinnon

FOREIGN PATENT DOCUMENTS

NL        8800907 A    11/1989
WO   WO 2011/158253   12/2011
WO   WO 2013/142209    9/2013

OTHER PUBLICATIONS

U.S. Appl. No. 16/845,897, filed Apr. 10, 2020, Keith.
U.S. Appl. No. 16/845,936, filed Apr. 10, 2020, Keith.
U.S. Appl. No. 16/845,966, filed Apr. 10, 2020, Keith.
U.S. Appl. No. 61/482,965, filed May 5, 2011, Lewis.
A GS1 Mobile Com White Papers "Mobile Commerce: Opportunities and Challenges" Feb. 2008 (60 pages).
AisleBuyer "Meet the World's First Virtual Shopping Assistant and Mobile Self-Checkout" available at web.archive.org/web/20110223012049/http://aislebuyer.com/; 2011 (11 pages).
AisleBuyer, AisleBuyer—Demo (video), https://www.youtube.com/watch?v=fLVXt6EmhFE; Jun. 11, 2010; (3 pages).
AisleBuyer, AisleBuyer—Magic Beans Demo (video), https://www.youtube.com/watch?v=CHLLCg-xOP4, Dec. 7, 2010 (3 pages).
AisleBuyer "Customer Centric Retail: Mobile Creates a New Shopping Paradigm" www.aislebiyer.com; Nov. 25, 2011 (14 pages).
Breeding, Marshall "Smarter Libraries Through Technology: Mobile Heads into the Mainstream for Libraries" ALA TechSource; Oct. 2011.
Boot, Merijn "Electronic Retail Payments at Public Events" Business Information Technology University of Twente; Sep. 2011; 92 pages.
Chau, Patrick Y.K., et al. "Trends in Mobile Technology and Business in the Asia-Pacific Region: Chapter 4: Mobile Business and Services in Hong Kong: Its Evolution, Development and Challenges" Inderscience Enterprises Ltd.; 2008; (15 pages).
Choi, Young B., et al. "The State-of-the Art of Mobile Payment Architecture and Emerging Issues" International Journal of Electronic Finance; Feb. 2006 (10 pages).
Claessens, Joris et al. "Combining World Wide Web and Wireless Security" Informatica (Slovenia); Feb. 3, 2002; 12 pages.
Fandango Movies—Android Apps on Google Play; Sep. 19, 2013 (3 pages).
Greengard, Samuel "Mobile Makes Sense for Faster Food—Johnny Rockets Restaurants Puts M-Commerce to the Test" Miller Freeman Inc.; Apr. 1, 2001 (3 pages).
Herzberg, Amir "Payments and Banking with Mobile Personal Devices" Communications of the ACM; May 2003.
Honig, Zach "Apple Store iOS App Adds In-Store Purchasing, We Go Hands-On (article and video)" Nov. 8, 2011 (2 pages).
Jonker, Jan-Willem "M-Commerce and M-Payment 'Combining Technologies'" Apr. 15, 2003.
Karnouskos, Stamatis et al. "Mobile Payment: A Journey Through Existing Procedures and Standardization Initiatives" IEEE Communications Survey & Tutorials; Fourth Quarter 2004; vol. 6, No. 4.
Layer, Marine "Newballpark.org Monthly Archives: May 2007" May 31, 2007; 17 pages.
Library Technology Guides; Press Release: Tech Logic "Tech Logic Introduces MyMobileLibrary: App, Powered by Boopsie" Tech Logic, Jun. 21, 2011.
OSXDaily "Hate Lines at the Apple Store? EasyPay Lets you Self Checkout" Nov. 8, 2011 (1 page).
Pamminger, Herbert "NFC: The New Dimension of Mobile Ticketing and Access Control" Skidata Kudelski Group; Mar. 20, 2007 (17 pages).
Pearce, James "Mobile and Bar-Code Tech Key to M-Commerce Service" ZDNet Australia; Nov. 7, 2003 (1 page).
PhoneArena "ISIS Mobile Payment (video)"; https://www.youtube.com/watch?v=ElyAoID2JE; Nov. 9, 2011; (3 pages).
QThru "Use your mobile smartphone for self-checkout!" Dec. 10, 2011 (2 pages).
QThru Demo: Self-Checkout via mobile phone (video); https://www.retailcustomerexperience.com/videos/qthru-demo-self-checkout-via-mobile-phone/; Nov. 1, 2011 (12 pages).
Scornavacca Eusebio Jr., et al. "Barcode Enabled M-Commerce: Strategic Implications and Business Models" Inderscience Enterprises, Ltd.; Jan. 10, 2006 (25 pages).
Taylor, David "Can I Buy Stuff at an Apple Store with Just My iPhone" https://www.askdavetaylor.com/buy_stuff_at_apple_store_Easypay_just_iphone/; Apr. 28, 2012 (8 pages).
Thanh, Do van "Mobile E-Commerce on Mobile Phones" Idea Group Publishing; 2003; 28 pages.
Telewide Enterprises Ltd. "3G Community Project Mobile Car Park" 2005 (5 pages).
Using EasyPay at Apple Retail (Video), https://www.youtube.com/watch?v=h22AltU4_GE; Nov. 9, 2011 (4 pages).
International Search Report for International Application No. PCT/US2013/031016, dated May 28, 2013.
Written Opinion for International Application No. PCT/US2013/031016, dated May 28, 2013.
International Preliminary Report on Patentability for International Application No. PCT/US2013/031016, dated Oct. 2, 2014.
Examination Report for Canadian Application No. 2,868,192, dated Nov. 8, 2018.
Examination Report for Canadian Application No. 2,868,192, dated Jul. 25, 2019.
Examination Report for Great Britain Application No, GB1416751.4, dated Apr. 6, 2018.
Examination Report for Great Britain Application No. GB1416751.4, dated Sep. 18, 2018.
Examination Report for Great Britain Application No. GB1416751.4, dated Jan. 23, 2019.
Examination Report for Great Britain Application No. GB1416751.4, dated Apr. 5, 2019.
Office Action for U.S. Appl. No. 13/801,132, dated Aug. 27, 2013.
Notice of Allowance for U.S. Appl. No. 13/801,132, dated Dec. 10, 2013.
Notice of Allowance for U.S. Appl. No. 13/801,132, dated Dec. 19, 2013.
Office Action for U.S. Appl. No. 14/189,623, dated May 14, 2015.
Notice of Allowance for U.S. Appl. No. 14/189,623, dated Oct. 8, 2015.
Office Action for U.S. Appl. No. 14/988,118, dated Oct. 13, 2016.
Examiner's Interview Summary for U.S. Appl. No. 14/988,118, dated Feb. 2, 2017.
Office Action for U.S. Appl. No. 14/988,118, dated Apr. 3, 2017.
Notice of Allowance for U.S. Appl. No. 14/988,118, dated Nov. 16, 2017.
Office Action (Restriction Requirement) for U.S. Appl. No. 15/897,976, dated Jan. 2, 2019.
Office Action for U.S. Appl. No. 15/897,976, dated May 7, 2019.
Office Action for U.S. Appl. No. 15/897,976, dated Dec. 6, 2019.
Office Action for U.S. Appl. No. 15/897,976, dated Jun. 15, 2020.
Office Action for U.S. Appl. No. 16/182,487, dated Dec. 20, 2018.
Office Action for U.S. Appl. No. 16/182,487, dated May 23, 2019.
Office Action for U.S. Appl. No. 16/182,487, dated May 5, 2020.
Office Action for U.S. Appl. No. 16/845,858, dated May 18, 2020.
Office Action for U.S. Appl. No. 16/845,897 dated May 18, 2020.
Office Action for U.S. Appl. No. 16/845,936 dated May 22, 2020.
Office Action for U.S. Appl. No. 16/845,966 dated May 28, 2020.
Petition for Inter Partes Review of U.S. Pat. No. 9,262,781, including Exhibits 1001-1014 and 1025-1026; Case No. IPR2020-00148, filed Nov. 15, 2019 (4,276 pages).
Documents filed with *H-E-B, LP* v. *Digital Retail Apps, Inc.*; United States Patent and Trademark Office—Before the Patent Trial and Appeal Board, Case No. IPR 2020-00148; Filed between Nov. 22, 2019-Feb. 10, 2020 (21pages).
Patent Owner Preliminary Response to Petition Pursuant to 37 C.F.R. § 42.107(a) for *H-E-B, LP* v. *Digital Retail Apps, Inc.*; United

(56) References Cited

OTHER PUBLICATIONS

States Patent and Trademark Office—Before the Patent Trial and Appeal Board, Case No. IPR 2020-00148; Filed on Feb. 24, 2020 (77 pages).
Documents filed with *H-E-B, LP* v. *Digital Retail Apps, Inc.*; United States Patent and Trademark Office—Before the Patent Trial and Appeal Board, Case No. IPR 2020-00148; Filed between Mar. 27, 2020-Apr. 20, 2020 (181 pages).
Decision Granting Institution of Inter Partes Review and Scheduling Order for *H-E-B, LP* v. *Digital Retail Apps, Inc.*; United States Patent and Trademark Office—Before the Patent Trial and Appeal Board, Case No. IPR 2020-00148; Filed May 19, 2020 (55 pages).
Petition for Inter Partes Review of U.S. Pat. No. 9,262,781, including Exhibits 1001-1014 and 1025-1026; Case No. IPR2020-00148, filed Nov. 15, 2019 (4,313 pages).
Documents filed with *H-E-B, LP* v. *Digital Retail Apps, Inc.*; United States Patent and Trademark Office—Before the Patent Trial and Appeal Board, Case No. IPR 2020-00149; Filed between Nov. 22, 2019-Feb. 10, 2020 (21 pages).
Patent Owner Preliminary Response to Petition Pursuant to 37 C.F.R. § 42.107(a) for *H-E-B, LP* v. *Digital Retail Apps, Inc.*; United States Patent and Trademark Office—Before the Patent Trial and Appeal Board, Case No. IPR 2020-00149; Filed on Feb. 24, 2020 (73 pages).
Documents filed with *H-E-B, LP* v. *Digital Retail Apps, Inc.*; United States Patent and Trademark Office—Before the Patent Trial and Appeal Board, Case No. IPR 2020-00149; Filed between Mar. 27, 2020-Apr. 20, 2020 (160 pages).
Decision Granting Institution of Inter Partes Review and Scheduling Order for *H-E-B, LP* v. *Digital Retail Apps, Inc.*; United States Patent and Trademark Office—Before the Patent Trial and Appeal Board, Case No. IPR 2020-00149; Filed May 19, 92020 (86 pages).
Petition for Inter Partes Review of U.S. Pat. No. 9,934,506, including Exhibits 1001-1010; Case No. IPR2020-00347, filed Dec. 27, 2019 (3,245 pages).
Documents filed with *H-E-B, LP* v. *Digital Retail Apps, Inc.*; United States Patent and Trademark Office—Before the Patent Trial and Appeal Board, Case No. IPR 2020-00347; Filed between Jan. 10, 2020-Apr. 3, 2020 (41 pages).
Patent Owner Preliminary Response to Petition Pursuant to 37 C.F.R. § 42.107(a) for *H-E-B, LP* v. *Digital Retail Apps, Inc.*; United States Patent and Trademark Office—Before the Patent Trial and Appeal Board, Case No. IPR 2020-00347; Filed on Apr. 10, 2020 (151 pages).
Documents filed with *H-E-B, LP* v. *Digital Retail Apps, Inc.*; United States Patent and Trademark Office—Before the Patent Trial and Appeal Board, Case No. IPR 2020-00347; Filed between Apr. 20, 2020-May 22, 2020 (38 pages).
Petition for Inter Partes Review of U.S. Pat. No. 9,934,506, including Exhibits 1001-1010; Case No. IPR2020-00348, filed Dec. 27, 2019 (3,252 pages).
Documents filed with *H-E-B, LP* v. *Digital Retail Apps, Inc.*; United States Patent and Trademark Office—Before the Patent Trial and Appeal Board, Case No. IPR 2020-00348; Filed between Jan. 10, 2020-Apr. 9, 2020 (41 pages).
Patent Owner Preliminary Response to Petition Pursuant to 37 C.F.R. § 42.107(a) for *H-E-B, LP* v. *Digital Retail Apps, Inc.*; United States Patent and Trademark Office—Before the Patent Trial and Appeal Board, Case No. IPR 2020-00348; Filed on Apr. 10, 2020 (151 pages).
Documents filed with *H-E-B, LP* v. *Digital Retail Apps, Inc.*; United States Patent and Trademark Office—Before the Patent Trial and Appeal Board, Case No. IPR 2020-00348; Filed between Apr. 20, 2020-May 22, 2020 (38 pages).
Documents filed with U.S. District Court Proceedings for *Digital Retail Apps, Inc.* vs. *H-E-B, LP*; U.S. District Court, for the District of Delaware; Civil Action No. 6:19-cv-00167 ADA Includes publicly available documents filed from Feb. 20, 2019-May 21, 2020; (3,770 pages).
Documents filed with *H-E-B, LP* v. *Digital Retail Apps, Inc.*; United States Patent and Trademark Office—Before the Patent Trial and Appeal Board, Case No. IPR 2020-00148; Filed on Jun. 11, 2020 (4 pages).
Documents filed with *H-E-B, LP* v. *Digital Retail Apps, Inc.*; United States Patent and Trademark Office—Before the Patent Trial and Appeal Board, Case No. IPR 2020-00149; Filed Jun. 11, 2020 (4 pages).
Decision Granting Institution of Inter Partes Review and Scheduling Order for *H-E-B, LP* v. *Digital Retail Apps, Inc.*; United States Patent and Trademark Office—Before the Patent Trial and Appeal Board, Case No. IPR 2020-00347; Filed Jul. 6, 2020 (49pages).
Decision Granting Institution of inter Partes Review for *H-E-B, LP* v. *Digital Retail Apps, Inc.*; United States Patent and Trademark Office—Before the Patent Trial and Appeal Board, Case No. IPR 2020-00348; Filed on Jul. 6, 2020 (12 pages).
Documents filed with *H-E-B, LP* v. *Digital Retail Apps, Inc.*; United States Patent and Trademark Office—Before the Patent Trial and Appeal Board, Case No. IPR 2020-00348; Filed between Jul. 17, 2020-Jul. 29, 2020 (7 pages).
Dilonardo, Robert I "Self-Checkout Reaches Critical Mass" Loss Prevention Media; Jan. 2, 2006; 9 pages.
Grimes, William "When the Cashier is You" New York Times; Apr. 8, 2004; 3 pages.
Hirsch, Jerry "Alcohol Sales to Minor Becomes Issue with Self-Checkout Lanes" Los Angeles Times; Jul. 8, 2009; 8 pages.
IBM United States Hardware Announcement 105-482 "Next-Generation Self Checkout Modular Solutions Redesigned and Improved to be Better Meet the Needs of Shoppers and Retailers" Dec. 6, 2005; 23 pages.
International Standard "Financial Transaction Card Originated Messages—Interchange Message Specifications—Part 1: Messages, data elements and code values" ISO 8583-1; First Edition; Jun. 15, 2003; 204 pages.
Lake, Matt "How it Works; the Self-Checkout: Lots of Swiping, No Stealing" the New York Times; Jun. 6, 2002; 3 pages.
Messina, John "Stop & Shop Supermarket Chain Goes Hi-Tech" Phys Org; Aug. 29, 2008; 3 pages.
NCR "NCR RealScan 74 OFX (7874) Release 1.1 User Guide" B005-0000-1822; Issue C; 2008; 268 pages.
Salzmann, Victoria S. "Big-Box Bullies Bust Benign Buyer Behavior: Wal-Mart, Get your Hands Off My Receipt!" Florida A&M University Law Review; vol. 4; No. 1; Fall 2008; 43 pages.
Taylor, David "Can I Buy Stuff at an Apple Store with Just My iPhone" Apr. 28, 2012 (6 pages).
Office Action for U.S. Appl. No. 16/845,858, dated Aug. 11, 2020.
Documents filed with U.S. District Court Proceedings for *Digital Retail Apps, Inc.* vs. *H-E-B, LP*; U.S. District Court, for the District of Delaware; Civil Action No. 6:19-cv-00167 ADA Includes publicly available documents made available on Aug. 4, 2020; (17 pages).
Documents filed with U.S. District Court Proceedings for *Digital Retail Apps, Inc.* vs. *H-E-B, LP*; U.S. District Court, for the District of Delaware; Civil Action No. 6:19-cv-00167 ADA Includes publicly available documents filed on Jul. 31, 2020; (1 page).
Defendant H-E-B, LP's Final Invalidity Contentions for *Digital Retail Apps, Inc.* vs. *H-E-B, LP*; U.S. District Court, for the District of Delaware; Civil Action No. 6:19-cv-00167 ADA Includes publicly available documents filed Mar. 6, 2020 (1,301 pages).
Petitioner H-E-B, LP's Reply to Patent Owner's Response to Petition for Inter Partes Review of U.S. Pat. No. 9,262,781 filed with *H-E-B, LP* v. *Digital. Retail. Apps, Inc.*; United States Patent and Trademark Office—Before the Patent Trial and Appeal Board, Case No. IPR 202000148; Filed on Dec. 4, 2020 (106 pages).
Petitioner H-E-B, LP's Reply to Patent Owner's Response to Petition for Inter Partes Review of U.S. Pat. No. 9,262,781 filed with *H-E-B, LP* v. *Digital Retail Apps, Inc.*; United States Patent and Trademark Office—Before the Patent Trial and Appeal Board, Case No. IPR 202000149; filed on Dec. 4, 2020 (103 pages).
Petitioner H-E-B, LP's Reply to Patent Owner's Response to Petition for Inter Partes Review of U.S. Patent No. 9,934,50 filed with *H-E-B, LP* v. *Digital Retail Apps, Inc.*; United States Patent and

(56) References Cited

OTHER PUBLICATIONS

Trademark Office—Before the Patent Trial and Appeal Board, Case No. IPR 202000347; Filed on Dec. 21, 2020 (95 pages).
Documents filed with U.S. District Court Proceedings for *Digital Retail Apps, Inc.* vs. *H-E-B, LP*; U.S. District Court, for the District of Delaware; Civil Action No. 6:19-rv-00167 ADA Includes publicly available documents filed from Dec. 2, 2020-Oct. 12, 2020; (753 pages).
Office Action for U.S. Appl. No. 16/182,487, dated Oct. 28, 2020.
Office Action for U.S. Appl. No. 16/845,897 dated Sep. 23, 2020.
Office Action for U.S. Appl. No. 16/845,936 dated Sep. 25, 2020.
Office Action for U.S. Appl. No. 16/845,966 dated Oct. 28, 2020.
Documents filed with *H-E-B, LP* v. *Digital Retail Apps, Inc.*; United States Patent and Trademark Office—Before the Patent Trial and Appeal Board, Case No. IPR 2020-00148; Filed from Aug. 12, 2020-Nov. 5, 2020 (14 pages).
Patent Owner's Response to Petition Pursuant to 37 C.F.R § 42.120 filed with *H-E-B, LP* v. *Digital Retail Apps, Inc,*; United States Patent and Trademark Office—Before the Patent Trial and Appeal Board, Case No. IPR 2020-00148; Filed on Sep. 11, 2020 (392 pages).
Documents filed with *H-E-B, LP* v. *Digital Retail Apps, Inc.*; United States Patent and Trademark Office—Before the Patent Trial and Appeal Board, Case No. IPR 2020-00149; filed from Aug. 12, 2020-Nov. 5, 2020 (14 pages).
Patent Owner's Response to Petition Pursuant to 37 C.F.R § 42.120 filed with *H-E-B, LP* v. *Digital Retail Apps, Inc.*; United States Patent and Trademark Office—Before the Patent Trial and Appeal Board, Case No. IPR 2020-00149; filed on Sep. 11, 2020 (390 pages).
Documents filed with *H-E-B, LP* v. *Digital Retail Apps, Inc.*; United States Patent and Trademark Office—Before the Patent Trial and Appeal Board, Case No. IPR 2020-00347; Filed between Aug. 12, 202-Nov. 5, 2020 (18 pages).
Patent Owner's Response to Petition Pursuant to 37 C.F.R. § 42.120 for *H-E-B, LP* v. *Digital Retail Apps, Inc.*; United States Patent and Trademark Office—Before the Patent Trial and Appeal Board, Case No. IPR 2020-00347; Filed on Sep. 28, 2020 (409 pages).
Documents filed with U.S. District Court Proceedings for *Digital Retail Apps, Inc.* vs. *H-E-B, LP*; U.S. District Court, for the District of Delaware; Civil Action No. 6:19-cv-00167 ADA Includes publicly available documents filed from Aug. 7, 2020-Oct. 12, 2020; (9 pages).

\* cited by examiner

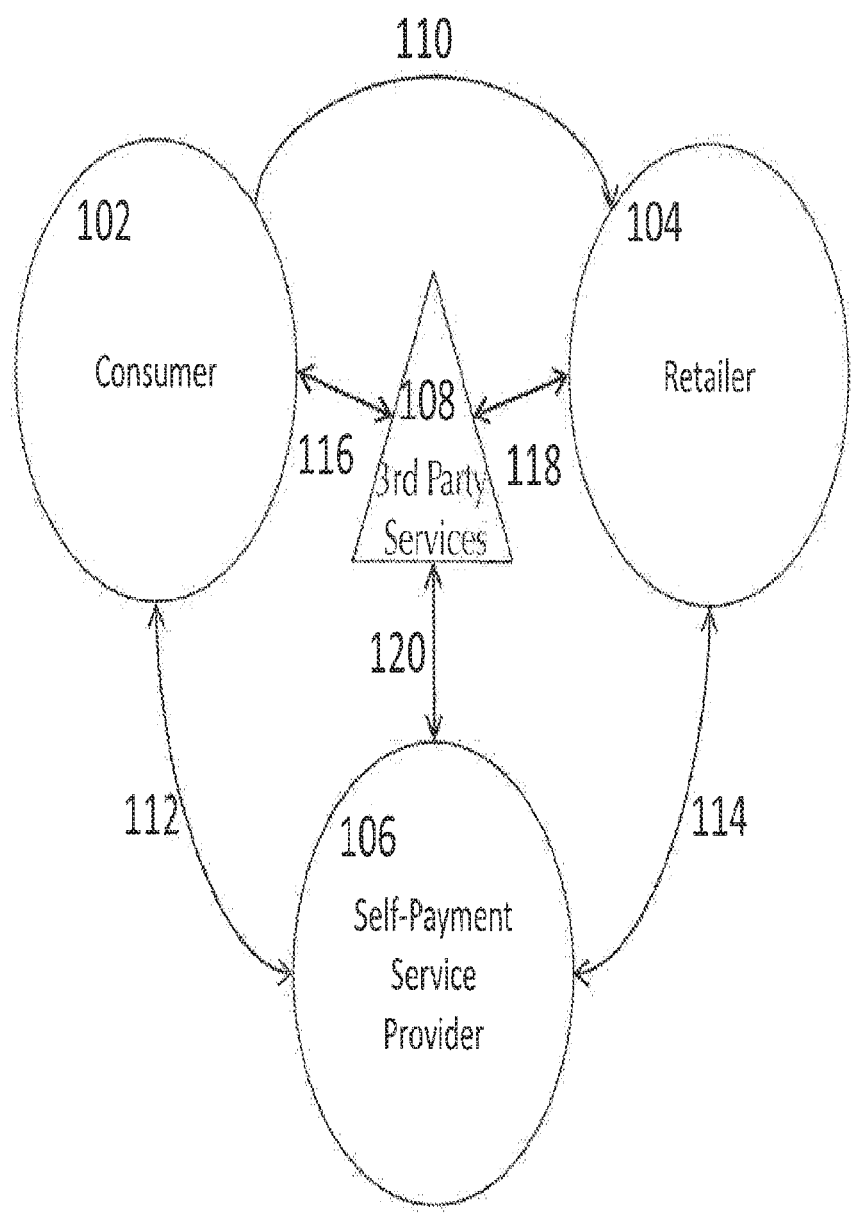

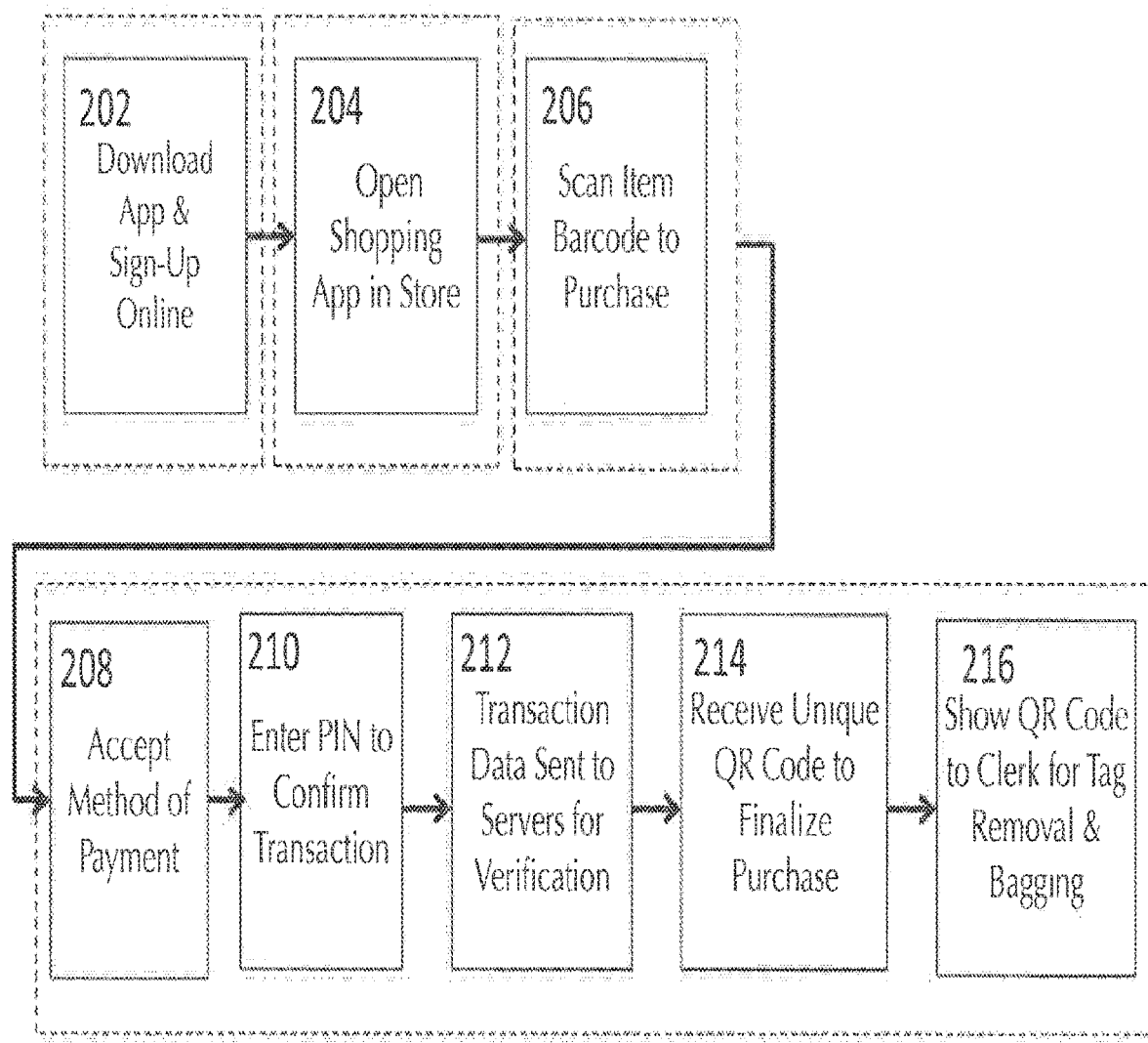

Fig. 3
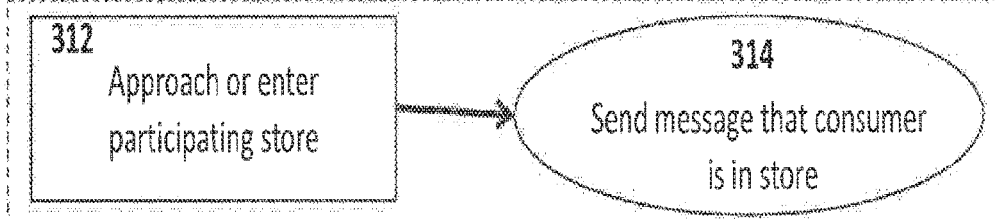
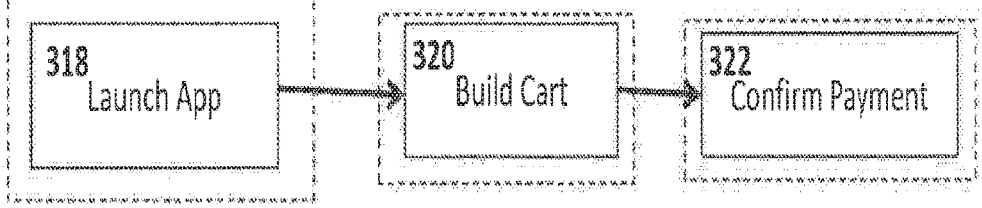
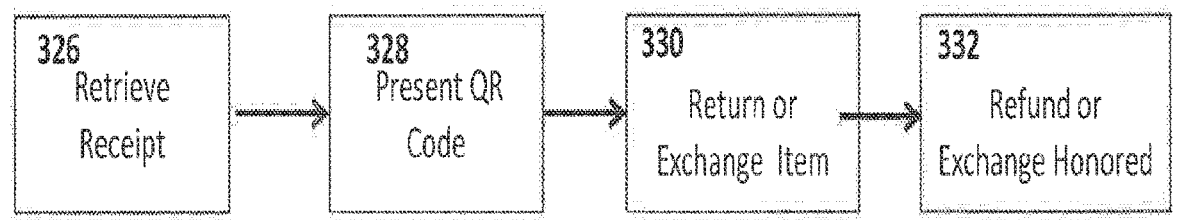

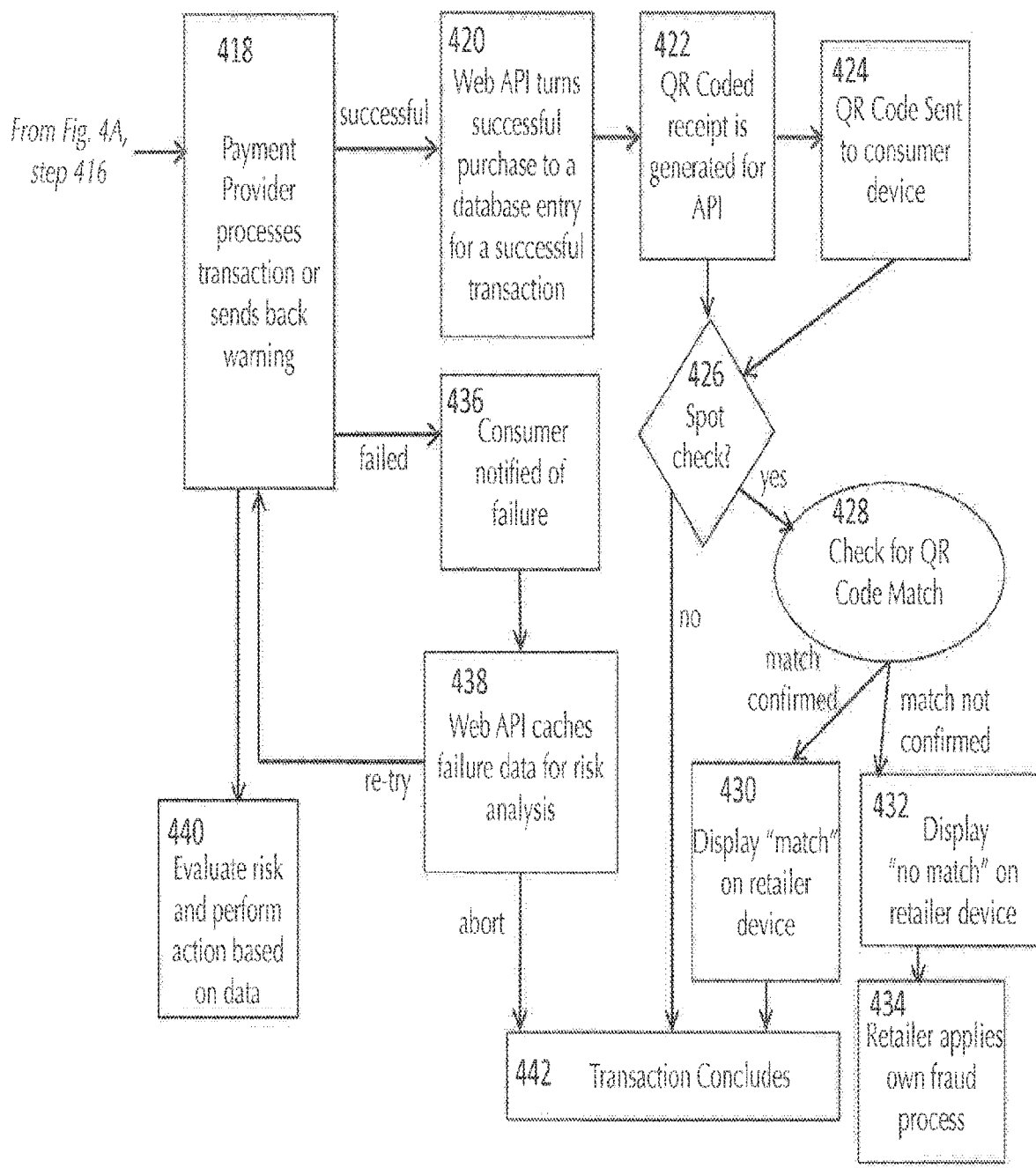

SYSTEM AND METHOD FOR FACILITATING SECURE SELF PAYMENT TRANSACTIONS OF RETAIL GOODS

CROSS REFERENCE TO RELATED APPLICATIONS

This application is a continuation of, and claims the benefit of, U.S. patent application Ser. No. 15/897,976, filed Feb. 15, 2018, which is a continuation of U.S. patent application Ser. No. 14/988,118, filed Jan. 5, 2016, now U.S. Pat. No. 9,934,506, which is a continuation of U.S. patent application Ser. No. 14/189,623, filed Feb. 25, 2014, now U.S. Pat. No. 9,262,781, which is a continuation of U.S. patent application Ser. No. 13/801,132, filed Mar. 13, 2013, now U.S. Pat. No. 8,720,771, which claims the benefit of U.S. Provisional Patent Application No. 61/615,140 filed Mar. 23, 2012; U.S. Provisional Patent Application No. 61/732,268 filed Nov. 30, 2012; and U.S. Provisional Patent Application No. 61/751,653 filed Jan. 11, 2013; the disclosures of which are hereby incorporated by reference in their entirety.

FIELD OF THE INVENTION

The present invention relates generally to systems and methods for the payment and verification of payment of goods and services for use with mobile devices. More specifically, the invention relates to systems and methods for paying and verifying the payment of goods and services for use with mobile devices wherein a unique coded receipt is generated to verify the valid purchase of goods and services.

BACKGROUND OF THE INVENTION

Retailers generally have the same goals: to increase sales and profit. Retailers can increase revenue and profit by acquiring more customers, and by persuading each customer to buy more products, more expensive products, or more profitable products. Retailers generally focus on their customers in order to increase sales. They try to improve customer service and offer a unique and pleasant shopping experience. Customers respond positively to businesses that try to understand their needs, and who offer better and faster services.

Some factors affecting in-store sales are the number of customers willing to purchase a product at the store and the time that is required to process customers' purchases at the store. Time is often a critical factor. Customers do not like to wait.

If a consumer visits a store looking for a particular product, he or she has to: find a store, physically access the store, find the desired products in the store, interact with a sales associate, and then purchase his or her product. To complete a purchase, the consumer has to first find a checkout inside a store, and then visit a register to complete his or her purchase. Sometimes this can be a long process, and consumers may experience a lot of difficulties when they shop and pay for their desired items.

The delays and difficulties associated with locating and purchasing an item can have a negative effect on a retailer's sales. If customers are forced to wait for assistance to locate or purchase an item, they may become frustrated and leave the store without making the purchase, leading to lost revenue. In addition, a customer who leaves due to delays in checking out may fail to return the item to the proper stock location, leading to additional overhead. Delays and lack of attention may further lead to an overall poor shopping experience, discouraging customers from shopping at that store again, These two aspects—being forced to wait and a poor shopping experiences—can lead to lost sales for a retailer.

In addition, to complete a purchase transaction, consumers usually must carry cash or a debit/credit card. Forgetting a wallet means that a consumer has to postpone his or her purchase, it is more likely that a consumer will forget his or her wallet than mobile device when he or she leaves the home.

Modern technologies are rapidly becoming a part of the connection between customers and retailers, and this new relationship calls for new approaches. Today, more than four billion people own mobile devices. Many people are moving from standard cell phones to internet—enabled smart phones, tablets and other e-devices that are as powerful as computers. Customers are a click away from buying products. For customers, the benefit is all about convenience. Using modern technologies makes life easier. The massive growth of social media, e-commerce and mobile commerce has shifted customers' expectations of their shopping and paying experience.

Today there are systems that exist in the marketplace that allow a consumer to pay for his or her purchase in-aisle, however these systems typically require the consumer to interact with either a mobile-device-carrying personal retail associate that processes the transaction using the consumers' physical plastic payment card in combination with a proprietary hardware device or that requires the consumer to stop at a self-service kiosk, scan a code using his or her mobile device at a kiosk and print out a paper receipt verifying the transaction which is then to be shown by the consumer at the exit to a retail sales associate who would first examine the paper receipt and if necessary enter the receipt transaction details to confirm that the transaction was successful. These systems typically use proprietary software and hardware, such as a mobile device magnetic card or EMV (chip) reader attachment or a kiosk that is used to either take final payment or that provides the consumer with a paper receipt which then needs to be displayed as the consumer leaves the store. Generally speaking, the currently existing systems require the use of a physical payment card and/or that requires an interaction with an actual store associate to process the payment.

Such existing mobile shopping applications do not provide a complete and secure solution for in-store mobile payment and self-checkout. For example, methods involving visual inspection of a paper receipt are vulnerable to duplication and falsification and generally slow down the customer's shopping process.

In view of the above, it would be beneficial to provide a system that allows a consumer to proceed with a transaction for goods on demand, and to do so in a secure fashion that is acceptable to both the consumer and the retailer.

SUMMARY OF THE INVENTION

Disclosed herein are various embodiments for systems and methods for facilitating self-payment and verification of the purchase of retail goods and services.

According to an embodiment of the invention, a method for verifying the purchase using a mobile electronic device in wireless communication with a payment verification system and a code generating system is provided, the method comprising the steps of: receiving from a consumer information identifying an item for purchase; receiving from a consumer information identifying payment means for purchasing the item for purchase; processing the information identifying the item for purchase and information identifying payment means and generating a unique QR code indicating a purchase of the item; sending the unique QR code to a mobile device for display by a consumer to the vendor of the item for purchase.

According to an embodiment of the invention, a computer-implemented method is provided for verifying the purchase of goods and services between a consumer and a retailer, said consumer having a mobile device capable of communicating with a server, and said retailer having an electronic device capable of communicating with the server and with the consumer's mobile device, the method comprising the following steps: receiving a first set of data from the consumer's mobile device, said first set of data identifying one or more goods or services to be purchased; receiving a second set of data from the consumer's mobile device, said second set of data identifying payment means for the purchase of said one or more goods or services; creating a data record in a database representing the purchase of said one or more goods or services by said consumer; generating in response to the successful purchase of said one or more goods or services via the identified payment means a unique code, said unique code associated with said data record such that said unique code contains a link to said data record; transmitting said unique code to the consumer's mobile device for use by the consumer to verify to the retailer the purchase of said one or more goods or services; and wherein the steps of receiving the first set of data, receiving a first set of data, receiving a second set of data, creating a data record, generating a unique code, associating said unique code, and transmitting said unique code are performed by the server.

In a related embodiment, the unique code is in the form of a quick response ("QR") code.

In another related embodiment, the data record includes the following data: the goods or services purchased, the method of payment used to purchase the goods or services, the date of the purchase, and a consumer ID.

In another related embodiment, the step of generating in response to the successful purchase of said one or more goods or services via the identified means of payment a unique code comprises the steps of transmitting to a third-party server a request for a unique code, the request containing information to be embedded in the unique code; and receiving from the third-party server a unique code in response to the second request.

In another related embodiment, the method further comprises the steps of determining whether any of the one or more goods or services identified in the first set of data are currently unavailable; and transmitting a notification to the consumer's mobile device indicating whether any of the one or more goods or services identified in the first set of data are currently unavailable.

In another related embodiment, the first set of data is input by the consumer into the consumer's mobile device when the consumer is outside of the retailer location containing the goods and services, and the method further comprises the steps of creating a data entry in the data record to indicate the portion of the goods identified in the first set of data that have already been collected from the retailer by the consumer.

In another related embodiment, the method further comprises the following steps: capturing via the retailer's electronic device said unique code contained on the consumer's mobile device; verifying the validity of the unique code displayed on the consumer's mobile device; and displaying via the retailer device whether or not the unique code displayed on the consumer's mobile device is valid.

In another related embodiment, the method further comprises the steps of retrieving from a database a data record associated with said unique code; obtaining from said data record the identity of the goods or services purchased by the consumer; transmitting to the retailer device the goods or services purchased by the consumer; and displaying on the retailer device the goods or services purchased.

In another related embodiment, the retailer's electronic device includes an optical capture device and associated software for processing captured images, and the step of reading via the retailer's electronic device said unique code comprises optically scanning the unique code.

In another related embodiment, the step of verifying the validity of the unique code displayed on the consumer's mobile device comprises transmitting said unique code to the server; retrieving embedded information from said unique code; comparing the embedded information from said unique code to entries in a table containing valid purchase information; and indicating whether the embedded information in said unique code matches an entry in the table containing valid purchase information, In another embodiment, a system is provided which provides for implementing the above methods. In particular, a system is provided for verifying the purchase of goods and services between a consumer and a retailer, said consumer having a mobile device capable of communicating with one or more servers, the system comprising: a server comprising one or more processors and a non-transitory storage medium in communication with said one or more processors, said non-transitory storage medium having instructions thereon which, when executed by the one or more processors, causes the one or more processors to execute the steps of: receiving a first set of data from the consumer's mobile device, said first set of data identifying one or more goods or services to be purchased; receiving a second set of data from the consumer's mobile device, said second set of data identifying payment means for the purchase of said one or more goods or services; creating a data record in a database representing the purchase of said one or more goods or services by said consumer; generating in response to the successful purchase of said one or more goods or services via the identified payment means a unique code, said unique code associated with said data record such that said unique code contains a link to said data record; transmitting said unique code to the consumer's mobile device for use by the consumer to verify to the retailer the purchase of said one or more goods or services.

In another embodiment, a computer-implemented method is provided for verifying the purchase of goods and services between a consumer and a retailer, said consumer having a mobile device capable of communicating with a server, and said retailer having an electronic device capable of communicating with the consumer's mobile device and with the server, the method comprising the following steps: scanning a code displayed on the consumer's mobile device; transmitting a request to the server to verify that the code displayed on the consumer's mobile device is valid: receiving a response from the server indicating whether the code displayed on the consumer's mobile device represents a valid purchase; displaying whether or not the code displayed on the consumer's mobile device is valid; and wherein the steps of reading a code, transmitting a request, receiving a response, and displaying are performed by the electronic device.

In a related embodiment, the code is in the form of a quick response ("QR") code.

In a related embodiment, the data record includes the following data: the goods or services purchased, the method of payment used to purchase the goods or services, the date of the purchase, and a consumer ID.

In a related embodiment, the method further comprises the steps of receiving from the server a list of goods or services purchased by the consumer associated with the code; and displaying on the retailer electronic device the goods or services purchased.

In another embodiment, a system is provided which provides for implementing the above methods. In particular, a system is provided for verifying the purchase of goods and services between a consumer and a retailer, said consumer having a mobile device capable of communicating with a server, the system comprising: a retailer electronic device comprising one or more processors and a non-transitory storage medium in communication with said one or more processors, said non-transitory storage medium having instructions thereon which, when executed by the one or more processors, cause the one or more processors to execute the steps of: scanning a code displayed on the consumer's mobile device; transmitting a request to the server to verify that the code displayed on the consumer's mobile device is valid; and receiving a response from the server indicating whether the code displayed on the consumer's mobile device represents a valid purchase; displaying whether or not the code displayed on the consumer's mobile device is valid.

These and other aspects and advantages will become apparent to those of ordinary skill in the art by reading the following detailed description, with reference where appropriate to the accompanying drawings. While the present invention is capable of being embodied in various forms, for simplicity and illustrative purposes, the principles of the invention are described by referring to several embodiments thereof It is understood, however, that the present disclosure is to be considered as an exemplification of the claimed subject matter, and is not intended to limit the appended claims to the specific embodiments illustrated. It will be apparent to one of ordinary skill in the art that the invention may be practiced without limitation to these specific details. In other instances, well-known methods and structures have not been described in detail so as not to unnecessarily obscure the invention. Further, it should be understood that the foregoing summary is merely illustrative and is not intended to limit in any manner the scope or range of equivalents to which the appended claims are lawfully entitled.

BRIEF DESCRIPTION OF THE DRAWINGS

The invention is described below in connection with the following illustrative figures, wherein like reference numbers refer to like elements throughout, and wherein:

FIG. 1 is a high-level communications flow diagram showing the parties involved and their relationships in the process of performing a secure self-payment transaction, according to an embodiment of the invention;

FIG. 2 is a process flow diagram showing the steps for a secure self-payment transaction, according to an embodiment of the invention;

FIG. 3 is a process flow diagram showing the consumer steps to completing an in-aisle secure self-payment transaction, according to an embodiment of the invention;

FIGS. 4A and 4B are a process flow diagram showing certain steps undertaken in the self-payment transaction using a secure self-payment application and related system components, according to an embodiment of the invention;

DETAILED DESCRIPTION

Figure 1A:
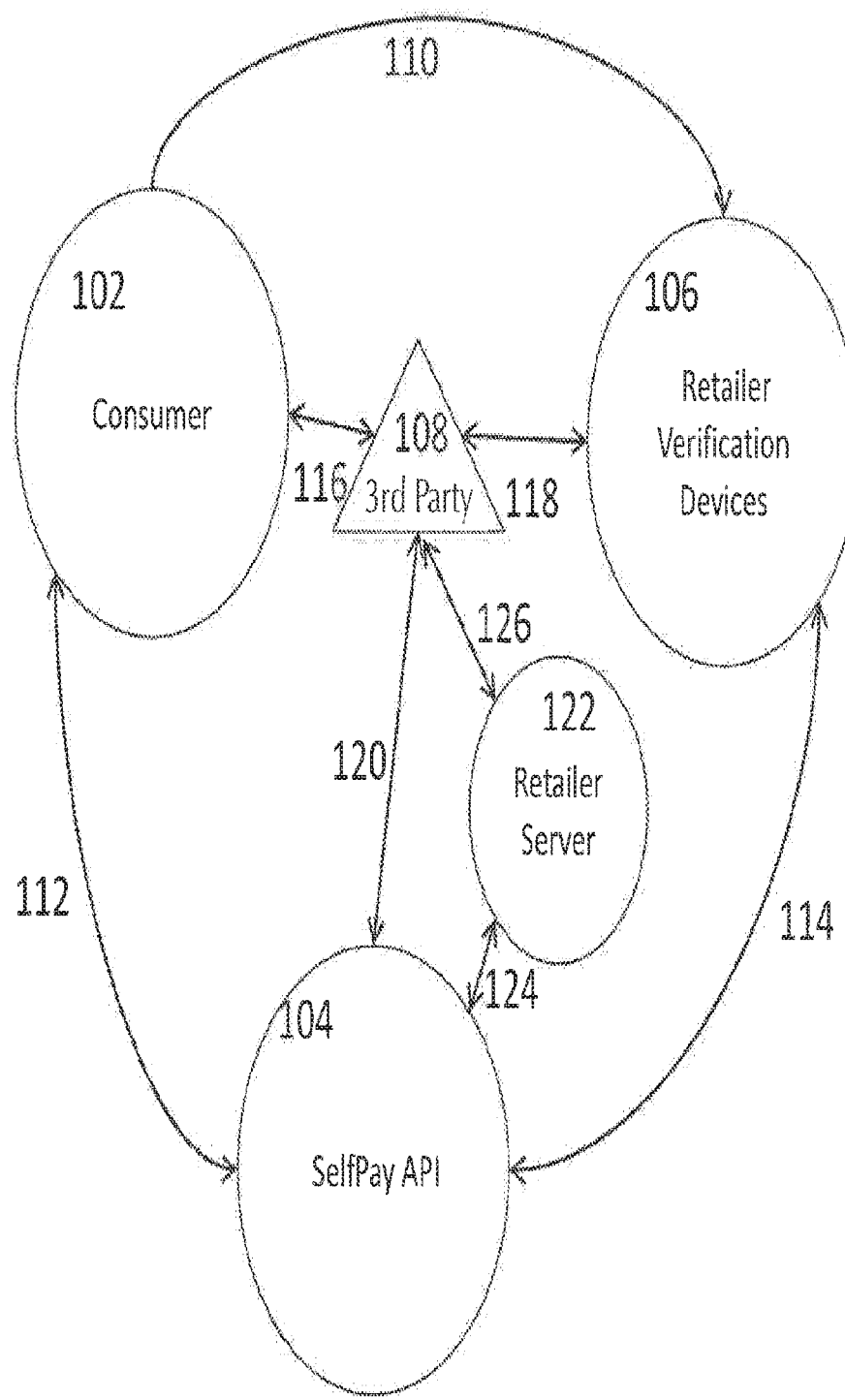
FIG. 1A is a high-level communications flow diagram showing the parties involved and their relationships in the process of performing higher security steps in the secure self-payment transaction involving the retailer server, according to an embodiment of the invention.

Described herein are systems and methods for facilitating in-store and mobile retail purchases for goods and services, including a payment verification process that utilizes the consumer's mobile device. As part of the systems and methods, a consumer can use the secure self-payment system and method described herein which may be embodied in software (web, application software ("app"), or otherwise) to add items designated with a barcode or other identifying feature to a virtual shopping cart and to purchase these items while in-store without the need to wait in a traditional checkout line. The self-payment system includes a consumer-facing self-payment application (or self-payment "app"), a retailer-facing verification application (or verification "app") a service provider web API that uses proprietary as well as third-party functionality, and a service provider server.

The self-payment systems and methods described herein do not require a retailer to utilize third-party proprietary hardware systems and interactions. Moreover, the self-payment systems and methods described herein give the consumer control over where and when payment is performed in-store as well as control over the handling of his or her payment at every step of the purchase process. There is no need for live interaction with a retailer for the purpose of taking payment, which may introduce delays and result in frustration to the consumer. Instead, the consumer conducts the payment transaction at his or her leisure using a self-payment consumer application installed on the consumers' own personal mobile device.

The payment processing step of the self-payment application may involve a variety of third-party payment processors. This is due to the fact that while a service provider may have preferred processing partners, a given retailer may be incompatible or unwilling to use certain partner's services. As a result, the selection of a third-party payment processor and the corresponding method of processing payments is subject to the particular needs of the service provider and its retail partner. The method of payment processing selected does not affect the overall secure self-payment application.

Unlike existing services, the verification component described herein does not require a manual keyed entry of a purchase ID by the retailer into a point-of-service ("POS") system or other similar device or interaction with a physical kiosk to print a physical receipt.

According to the systems and methods described herein, upon payment of goods or services, the service provider provides the consumer with a token or code that can be provided to the retailer to verify the purchase of such goods or services. In the preferred embodiment, the verification portion of the payment process uses a QR-coded digital receipt to be displayed on the consumer's mobile device. This QR-coded digital receipt is scanned for verification by the retailer through the use of a companion verification application residing on the retailer's electronic device. In the preferred embodiment, the retailer verification component is fully mobile and may be used by a live associate anywhere in-store, such as at a designated service desk, near the exit doors, or throughout the store by an associate while walking around tending to shoppers and performing daily tasks. Additionally or alternatively, the retailer verification application is added into existing hardware such as a kiosk or other stationary hardware through the service provider's application programming interface, or "API."

The verification component of the secure self-payment systems and methods described herein are used as part of retailer loss prevention initiatives. In particular, the verification process of the secure self-payment systems and methods described herein is designed to complement a retailer's existing spot check procedures. A spot check procedure is one in which the retailer physically or visually inspects the consumer or his or her purchase items and receipt after the transaction is conducted to ensure that the consumer is not engaging in theft of goods or services. The most common method of a retailer spot check procedure is performed at the exit of a store and traditionally involves the retail associate physically inspecting a paper receipt and looking through a consumer's shopping bag. As discussed below, the retailer verification application can automatically verify a consumer's transaction based on the code displayed on the consumer's mobile device. This automatic verification helps to eliminate human error in the first instance, in addition, in certain embodiments the retailer verification application provides visual cues to the retail associate if the secure self-payment system cannot retrieve a legitimate data record corresponding to the displayed QR coded receipt as shown on the consumer's mobile device. These visual cues can further supplement a retailer's fraud prevention process.

In the preferred embodiment the communications involved in the secure self-payment process are exchanged between four main parties: the consumer, the retailer, the application service provider, and third-parties that provide various services related to the self-payment application, such as payment processing, payment card data capture, product barcode information capture, and social media updates. Methods of communication include the use of both wired and wireless networks using well-known standards and protocols. Communications involved in the secure self-payment process also include real world physical interactions between the consumer-facing self-payment application and the retailer-facing verification application or other compatible device, and include such interactions directed to capturing information displayed or transmitted by these devices.

In the preferred embodiment, the self-payment application is one of 21 shopper activity-based software modules that comprise a suite of white label branded mobile shopping "apps" (i.e., software programs) brand-customized for an individual retailer. Alternatively, the self-payment application is the only module in the suite of apps.

In another embodiment, in addition or as an alternative to being part of a separate suite of apps for the consumer mobile device, the self-payment application is included in a third-party app through a web interface. The self-payment application is also designed to work with other third-party services for functions relating to both core and optional features. In those embodiments Where the service provider makes its web API available to third parties, some features and functions may be modified by the third-party, but the payment verification aspect remains intact.

Communications Between Parties

FIG. 1 provides a high-level diagram showing the communications between parties in the self-payment application, according to an embodiment where the retailer operates a semi-open network. FIG. 1 explains the communication breakdown and parties involved in both the core and optional self-payment application functions and activities. Accordingly, not all of the communications need be present in all embodiments of the self-secure systems and methods described herein.

As shown in FIG. 1, the consumer 102 is the customer, shopper or other user running the self-payment application on his or her mobile device. The mobile device is described in greater detail in the sections below. The consumer may be simultaneously running other background processes or supporting software. The retailer 104 is the party who sells goods and services and who operates the purchase verification on the retailer's electronic device, which is typically also a mobile device. The retailer's electronic device is described in greater detail in the sections below. The service provider 106 is the party that provides the secure self-payment web API, and that makes available the consumer self-payment application and the companion verification application used by the retailer. In certain of the illustrative examples described herein, the service provider is referred to as "SelfPay." For purposes relating to communication and networking, the web API is the wide area network accessible programming interface through which the self-payment application components are accessed. This web API can be accessed by the service provider through the self-payment app or other service provider-developed apps, as well as by third-party software developed by a third-party.

The third-party 108 represents the party or parties that are being used to facilitate specific functions of the self-payment application that are not performed by the consumer self-payment app, the retailer companion app, or the web API. These functions do not need to be performed in-app by the self-payment application, and may instead be performed using other hardware and software and then relayed to the self-payment application through a network for final confirmation or feedback. As used herein, the term "in-app" means that the function or functions are performed by or communicated through the specified application, or "app." One example of a function performed by a third-party 108 is the processing of credit card payments. Alternatively, all or portions of these functions may be internalized into a web API.

The manner of communication, including the protocol and data content of the communication, may vary depending on the purpose of the communication and the respective capabilities of the sending and receiving party. As used herein, the terms "two-way connection" or "two-way data connection" are generally used to refer to any of the following:
 (i) a connection initiated by one party with a required or expected response;
 (ii) a connection initiated by one party which is one way, but in practice is responded to with a one-way connection; or
 (iii) a protocol by which one party sends a regular request for information and receives a response.

As used herein, the terms "one-way connection" or "one-way data connection" are generally used to refer to any of the following:
 (i) a connection initiated by one party that does not require a non-trivial response note that most one-way connection protocols are at least trivially two-way in that they generally require an acknowledgement response to establish communications; for example, a consumer using a device using NFC (near field communications) may initiate a one-way send of a verification URL, but initiating this one-way send requires two-way communications to set up such communications;
 (ii) a connection initiated by one party that does not require a two-way connection; or
 (iii) a connection, which because of the nature of the protocol by which the connection occurs, sends information in only one direction an example of such a one way connection would be a QR code-based information exchange from one device to another wherein the QR code is scanned.

As illustrated in FIG. 1, the consumer 102 and the retailer 104 communicate via a one-way data connection 110 involving the use of the consumer's self-payment application and the retailer's verification application for the purposes of verifying a consumer's purchase. In the preferred embodiment, one-way data connection 110 refers to use of the retailer's electronic device to capture information from the self-payment application on the consumer's device. The act of capturing this information can encompass a variety of methods, including scanning or reading a code containing this information, as well as receiving a wireless transmission of the information. In the preferred embodiment, the information comprises a token that is associated with a data record indicative of a transaction, information is embedded in a QR code displayed in-app on the consumer's mobile device, and the one-way data connection 110 involves scanning the QR code through the use of the retailer's companion verification app and the device's scanning component, such as a camera or laser code reader. More specifically, this connection is likely conducted by the following method: the code is displayed on the consumer's mobile device through the use of the secure self-payment application, the code is then optically scanned by the scanning component of the retailer's electronic device through the use of the retailer's verification application. Alternatively or additionally, the capturing of the code can be performed by other hardware, not necessarily running the verification application, but with access to service provider's web API, such as a POS system or other hardware with a camera or laser code reader. In other embodiments, the QR code itself is not scanned or read; instead the underlying link encoded in the QR code is captured. An example would be through the use of NFC (near-field communication) technology, in which case connection 110 is used to capture the necessary information through a contactless terminal or NFC-enabled device. As described in greater detail below, the one-way data connection 110 is used verify consumer's purchase through the use of a unique code, such as a unique QR code, displayed on the consumer's mobile device. This communication link 110 is used to pass information that is secured and verified by communication link 114.

In some embodiments where the technology or implementation so requires, connection 110 is a two-way data connection. For example, where the technology used for connection 110 is based on NFC technology, a two-way data connection may be required to establish the communication link.

The consumer 102 and the self-payment service provider 106 communicate via a two-way data connection 112. This two-way data connection is performed over a network (such as a wireless network, a wired network, or a combination thereof) in communication with the consumer's mobile device on the one hand and the one or more servers that comprise the service provider network and host the service provider's web API. Information exchanged via two-way data connection 112 includes consumer-specific information such as consumer name, address, payment information, and optional social network aliases. Other information, including information relevant to the parties involved in the transaction as well as information unrelated to these parties, can also be exchanged via two-way communication 112 in accordance with the various embodiments described herein. In the preferred embodiment, two-way communication 112 is primarily initiated by the consumer's mobile device and the service provider network responds by sending requested information back to the consumer's mobile device.

The service provider 106 and the retailer 104 communicate via a two-way data connection 114. This two-way data connection is performed over a network between retailer components (such as the retailer's network, the retailer's electronic devices and the purchase applications running thereon, and the retailer's software or other source code on the retailer's network servers) and third-party servers information exchanged via two-way data connection 114 includes database-specific information such as inventory updates, pricing, accounts receivable or employee identification. In the preferred embodiment, this two-way communication is initiated at regular time intervals by the retailer and the information from the service provider is sent entirely in response to these queries. This technique of periodically initiating communications with a server to receive updated information is commonly referred to in the industry as "polling."

Other information, whether relevant to the parties involved in the transaction, can also be exchanged via two-way communication 114 in accordance with the various embodiments described herein. The most common use of connection 114 is for purposes relating to purchase verification following the communication of information from the consumer to the retailer via connection 110. As noted above, through connection 110 the consumer's mobile device communicates information to the retailer's electronic device, and in the preferred embodiment the consumer's mobile, device displays a QR code and the retailer's verification app is used to scan the QR code displayed on the consumers' mobile device. Using two-way communication 114, the retailer looks for a matching data record to the QR code through the use of the service provider's web API and if a match is found, the service provider's web API retrieves the associated purchase information in the data record from the service provider for display on the retailer's electronic device to be used in accordance with the retailer's loss prevention initiatives.

The consumer 102 and one or more third-parties 108 communicate via a two-way connection 116 that allows the consumer's self-payment application (or other source code) operating on the consumer's mobile device to interact with third-party systems in order to achieve a variety of different functions. Examples of such functions include card recognition performed through the device camera, social media activities, or other communications. This connection 116 can be internal to the operating system (with installed source code) for a software development kit (SDK), Communications over connection 116 may also utilize a polling technique for periodic transfers of information. Additionally or alternatively, communications over connection 116 can be initiated by the consumer device or be initiated remotely. The preferred embodiment uses a combination of native software and consumer device initiated communications for connection 116, although the exact implementation of connection 116 depends on the specific implementation details of the third party service.

The retailer 104 and the third-party 108 communicate via a two-way connection 118 that allows the retailer and third-party to interact in a controlled and secure fashion with some or all of: the retailer's network the retailer's electronic devices and the purchase applications running thereon, and the retailer's software or other source code on the retailer's network servers. The reverse is similar for the third-party by the retailer. Examples of communications via connection 118 include controlled API calls over HTTPS (hypertext transfer protocol secure), SSH (secure shell) connections, or other communication protocols. It is common for these communications to be based on polling techniques. In the preferred embodiment, communications with third party services added on the retailer side use polling for communications over connection 118, while existing infrastructure would use current implementation techniques that could vary from retailer to retailer.

The service provider 106 and the third-party 108 communicate via a two-way connection 120 that allows the web API and the third-party 108 to interact in a controlled and secure fashion. Examples of communications over connection 120 include API calls to card scanning services, payment method or identification verification, email lists, social media communications or other protocols. These connections could be internal to the server, or could be passed to another server run by the service provider which runs the third-party service as software. Communications over connection 120 could also be based on polling=techniques, or be based on service provider initiated queries for specific tasks. The preferred embodiment depends on the specific third-party service, most typically either software running on a separate physical or virtualized server, or queries over the web initiated by the service provider to the third party service.

The consumer 102, retailer 104, service provider 106, and third-party 108 are all parties that may be originating, ending or intermediary points of specific data or activity. In some cases one party may need to send information to one or multiple other parties. Likewise, one party may receive data from another party and then pass on some or all of the received data to others. One specific example would be a method of notifying the retailer that a consumer has approached or entered its store. In one embodiment, location information is provided by way of a Geofence, GPS, or other location service. The communication of this location information originates at the consumer 102, is sent to the service provider 106 via the communication link 112, and is then passed off to retailer 104 via the communication link 114 to ultimately notify the retailer that the consumer is in-store. At that point, either the retailer 104 or the service provider 106 sends a welcome or promotional offer or message to 102 using the same channels. To the extent that any of these actions require the use of third-party services, communication links 116, 118, and 120 are utilized as well. Although direct links have been shown for some communications, it should be understood that single communications may be accomplished by multi-step communications passing through multiple entities either shown or not shown in FIG. 1.

FIG. 1A provides a high-level diagram showing the communications between parties in the secure self-payment application, according to an embodiment where the retailer operates a more secure network. The communication method illustrated in FIG. 1A is utilized in those embodiments where the retailer requires certain communications to be routed through its own server. This communication method may be used with larger retailers which have more strict security protocols and/or require a connection to their enterprise software for certain purposes, which may include, but are not limited to, inventory maintenance, sales tracking, staff and security monitoring. Some retailers may use the arrangement of FIG. 1A or similar communication arrangement in order to stay compliant with security requirements as specified by certain regulatory bodies, such as, for example, to meet certain the security requirements provided by state or federal financial regulations. The communication method shown in FIG. 1A can also be used by the to limit the number of connections to the retailer's network or to designate the retailer's own restrictions When it comes to allowing specific types of connections, networks, IPs, or ISPs are permitted to access the network. FIG. 1A also illustrates that the communication methods generally described with respect to FIG. 1 can be adapted to permit other parties to be part of the communications exchanged, in accordance with and as required by the various embodiments described herein.

The main difference between the communication methods of FIG. 1 and FIG. 1A is that some communications in FIG. 1A are linked directly to the retailer while bypassing alternative communications channels. The communications network in FIG. 1A specifically shows retailer network 122 and communications exchanged therewith. The retailer network 122 is the entity that controls access to the retailer's resources and services. In some embodiments, the retailer network 122 hosts retailer owned content (such as pricing, financial data, images and product descriptions) and controls and routes traffic and requests for specific permissions to this content.

Communications between the service provider web API and the retailer network 122 occur via a two-way communication link 124 that routes traffic from the service provider web API 106 to the retailer network 122. This connection is used when the retailer requires certain control over or access to specific data, such as when the retailer needs to be able to allow or deny certain connections or permissions for security reasons or in rare cases when a third-party service query or reply must pass through a retailer's server. In the preferred embodiment, all the communications of link 124 are initiated as outbound communications from the retailer network to the web API 122 and operate through a polling technique. This polling technique involves a process wherein the retailer server connects to the service provider network every set period of time (for example 5 minutes). This polling technique is extendable to request information at specific non-standard times where it might be useful. For instance a retail POS terminal might perform an item look-up and find that the retailer has one item in stock. Using two-way communication link 124, the retail POS terminal immediately polls the web API to ensure that the item has not been sold through the secure self-payment application.

Communications between the retailer network 122 and the third-party services 108 occur via a two-way connection link 126. The communications exchanged over link 126 may include both verbal communications and data. Link 126 is used by the retailer to pass on specific data on behalf of the self-payment service provider or for the retailer's own purposes due to security related or other issues. Link 126 provides communications from the retailer to whichever third-party is being used to perform or support a specific task. In the preferred embodiment, these connections operate using polling. In addition or alternatively, other communication techniques may be used, for example, an inbound connection on a retailer server.

Overview of Use of Self-Payment Application

FIG. 2 is a flow chart that lists the steps taken in making a purchase according to an embodiment of the secure self-payment application described herein. The steps are compartmentalized into individual sections, but may contain additional sub-steps, some of which are discussed in greater detail with respect to FIG. 3.

At step 202, the consumer accesses the secure self-payment app and registers for service under the application. The service provider or retailer provides the self-payment app to the consumer for access via any suitable method, such as by making the app available for download to the consumer's mobile device over a network via the service provider or retailer's website, or by making the app available for download to the consumer's mobile device via an "app store" or the like accessible by the consumer's mobile device. The app provides the consumer with a means for providing the service provider with information about the consumer that will facilitate a secure self-payment transaction. In the preferred embodiment, the app initially prompts the consumer to sign up for an account with the service provider by establishing a user name and password, and by providing details about the consumer related to the purchase of goods and services, such as the consumer's name, loyalty card data, phone, email, billing and shipping addresses, and payment information. In one embodiment, the app further prompts the consumer to provide secure verification information, such as, but not limited to, a personal identification number (PIN) or other unique identifier. In other embodiments, the app permits the consumer to provide information concerning the consumer's preferences in using the self-payment app, such as push notifications and location settings. Other aspects of this step are discussed below with respect to corresponding elements of FIG. 3.

At step 204 the consumer enters a participating physical retail store and, using the consumer's mobile device, opens the self-payment app containing a module directed specifically to performing self-payment functions (referred to herein as the secure self-payment module). Other aspects of this step are discussed below with respect to corresponding elements in FIG. 3.

At step 206 the consumer provides a set of data that contains identifying information regarding the goods or services to be purchased. The secure self-payment app may provide the consumer with several options for providing such identifying information. Where the consumer's mobile device is a smart phone or other mobile device equipped with camera, the app may contain functionality that permits the consumer to scan the bar code or other unique product identifier of an item. Alternatively, the app may contain functionality that prompts the consumer to enter identifying information manually, or permits a consumer to select the item from a list of available goods or services. To facilitate the entry of information identifying the goods or services to be purchased, the secure self-payment application is capable of connecting to and querying a database, either stored with the service provider or the retailer, in such a way so that the consumer can search or browse for the desired product or service. As further discussed below, once the consumer provides identifying information regarding goods or services to be purchased, the app can provide the consumer with various information about the item, such as product availability either in-store or on-line, product information and reviews, and permits the consumer to add the item to the consumer's virtual shopping cart. Other aspects of this step are discussed below with respect to corresponding elements in FIG. 3.

At step 208 the secure sells-payment app prompts the consumer to provide a method of payment. The service provider may accept payment in the form of major credit cards (e.g., VISA, MasterCard, American Express, etc.), debit cards, pre-paid cards, or gift cards; or by using loyalty points or coupons; or through online forms of payment (e.g., PayPal, online bank payments). Other aspects of this step are discussed below with respect to corresponding elements in FIG. 3.

At step 210 the consumer is given the opportunity to confirm the transaction before it is completed. The secure self-payment app displays information about the transaction to be completed for review by the consumer, such as the goods or services to be purchased, the price of each, the total price for the transaction, and the proposed method of payment. In some embodiments, in connection with step 210 the app provides the consumer with additional offers related to the proposed transaction, such as the purchase of warranties or bags. Depending on the level of security and the method of payment selected, in certain embodiments the app prompts the consumer to enter a personal PIN or password to confirm the purchase. In another embodiment, the app prompts the consumer to enter a card security code for credit card transactions.

At step 212 data relating to the transaction, or "transaction data," is verified and then transmitted by the secure self-payment app to the service provider web API for verification. This transaction data includes information needed for the service provider and third parties to process the transaction, such as identifying information for the goods/services being purchased, the quantity thereof, the consumer's identifying information, and information about the method of payment. Relevant portions of the transaction data related specifically to the amount and method of payment are sent by the service provider web API to the retailer and third-party credit card processing network to process the financial transaction. Relevant portions of the transaction data related to the goods or services being purchased, the quantity thereof, and the method of payment are sent by the service provider web API to the retailer. Examples of data that may be sent by the service provider web API to each relevant party as a direct result of the consumer's inputs into the self-payment app include requests for payment authorization to the payment processor, credit card issuer, issuing bank or online wallet; removal of item(s) from store inventory, consumer details; and issuance of a receipt to the consumer for later review. In these examples, the payment authorization is sent to a third-party payment processor, an item removal request is sent to the retailer, consumer details are updated and saved in the consumer profile and then viewed along with the receipt by the consumer once it is generated and sent back to the consumer's device.

At step 214 the consumer receives a unique code or identifying element to verify the purchase of goods and services. In the preferred embodiment and as described in connection with FIG. 2, this code is a QR code. In particular, once all transaction items are successfully completed, the service provider web API returns a unique, transaction specific QR code for display on the consumer's mobile device, such as a smart phone. As discussed in additional detail below, in a preferred embodiment the QR code contains embedded therein a token in the form of a Uniform Resource Location (URL) string that links to information regarding the purchase of goods and services. As an example, such URL may take the following general form; https://www.selfpayserviceprovider.com/transactions/34561 where the first portion of the address is used to identify the server location, the next portion is used to identify the type of view, and the numerical or other value is used to represent the unique data record for the purchase.

At step 216, the consumer presents the unique code to the retailer to verify the purchase. Once the service provider web API sends the unique code to the consumer, the consumer's device makes the code available liar capture by the retailer, who can then use the code to verify the purchase of goods and services. In the preferred embodiment, the app visually displays the unique code, in this instance a QR code, on the shopper's mobile device so that the shopper may exit the store with confidence that his or her transaction was successfully completed. A retail associate scans the displayed QR code with a retailer mobile device that has a retailer verification app installed therein, or with another compatible scanner that allows the retailer to capture a QR code and view the transaction including items purchased and payment verification on its scanning device and/or mobile device. In the preferred embodiment, once the retailer device captures the QR code, the retail device links to a specific dynamically generated data feed based on the uniform resource location (URL) embedded as a string in the QR code. This URL is accessed through a domain name server lookup that connects the retailer app to a specific location on the service provider web API. The specific location corresponds to a data record in the database of the specific original purchase sent through the self-payment application. In this context, the terms database and data record include not only traditional databases and entries therein, but any other structure for storing information in an organized fashion and includes, but is not limited to, a collection of log files on a server contained in a folder. The capturing of the QR code and underlying string is performed by the retailer device 104 through the use of communication link 110. Request for record retrieval is performed by communication link 114 and then pushed back to the retailer 104 for display on the retailer device by the self-payment service provider 106 using the same link 114 as a reply. The retailer captures the QR code as a means of spot checking the transaction. This may be done either in-store, immediately outside the store, or at the point where a consumer may ask for tag removal or bags, if applicable. The place where the retailer decides to implement its spot check depends on its individual in-store physical retail flow preferences. Inventory tag removal or desensitizing and bagging is optional but may be offered by some retailers. The option to verify the consumer's purchase of goods or services through the capture of the code provided by the service provider web API is a critical option in retailer security of the transaction and is in place to minimize theft or shrinkage. In the preferred embodiment, the QR code is used only for verification purposes and not payment. Depending on the retailer's preferences and desired level of theft prevention, the verification process of capturing the code presented on the consumer's mobile device may be employed for all, random or no shoppers as prescribed by specific retailer preferences.

FIG. 3 describes the actions taken by the consumer to complete a sale or return while using a secure self-payment application.

The process flow 302, "Registration Flow," involves the registration steps associated with the first-time use of the system by the consumer, including the entry of personal, payment, and/or optional data. According to the embodiment shown in FIG. 3, the registration process flow includes the following steps: download app 304, sign up 306, and enter profile and preferences 308.

In step 304, "Download App," die service provider makes the self-payment application available for download to the consumer's device. The download may be triggered through a number of different actions taken by the consumer. The service provider can make the application available via any number of known distribution methods, such as an "app store" download, web site link, a QR code that contains a link to a download location and which may be scanned by a camera on a consumer's mobile device, or other known methods for sending the application to the consumer's device.

At step 306, "Sign Up," using the functionality provided by the self-payment application the service provider allows the consumer to sign up for the self-payment service. In connection with this step the service provider may require that the consumer input contact information, such as a valid e-mail address for communication and perform an e-mail verification step. The self-payment application may further prompt the consumer to input other personal identification data such as name, addresses and phone number, social media information such as social sharing usernames, payment data such as credit card numbers or e-wallet accounts, verification data such as a unique PIN or identification code or other data that may or may not fall into these categories. Depending on whether this data is sensitive and or has specific legal requirements for its collection and storage, the service provider may store this data on its servers while employing varying levels of security on a server or with a third-party, or in some cases within the app on the consumer's device. The service provider may also make the app usable in a limited "browse-only" state if little or no required information is entered into the app by the consumer.

At step 308, "Enter Profile and Preferences," the self-payment application provided by the service provider prompts the user to establish a profile and allows the user to enter in preferences associated with his or her use of the self-payment service. In connection with the sign up step 306, the service provider requires the consumer to enter in individual pieces of identifying data to create a secure self-payment account, and for the service provider to create a unique user ID for the consumer. The consumer profile is characterized by the data entered by the consumer in step 306, and is associated with a unique user ID. Through the functionality provided by self-payment application, the service provider may prompt the consumer to enter additional data not required in the sign up process or to modify the data previously entered. Additional data may include additional desired payment methods, identification, social media information, information on family members or other data that may affect the performance or usability of the app and the secure self-payment method. Some of this information is optional for core functions, but all collected information generally has the purpose of being used for customer profiling, payment, marketing and item suggestion or third-party functions. The app may also allow the consumer to toggle certain settings, which modify the behavior of the service provider web API or the secure self-payment application. Preferences may include push notifications, opt-in advertising or other custom app behaviors.

The process flow 310, "Push Notification" is an optional process, found in certain embodiments. The push notification flow involves the process of launching the self-payment app without the need for the consumer to manually select and launch the app using the operating system (OS) of the consumer's device. According to the embodiment shown in FIG. 3, the push notification process flow 310 includes the following steps: approach or enter participating store 312, and send message that consumer is in store 314.

In the approach or enter participating store step 312, the web API is notified that the consumer's device is near a participating retailer if the device is physically near or in the store. The notification may be triggered as the mobile device connects to the store breaches a "Geofence" or otherwise triggers another location service that causes the web API to send a push notification to the device screen.

At step 314, "Send message that user is in or near store," the web API displays a message on the consumer's device that notifies the consumer that he or she is in or near a retailer that supports the secure self-payment system. The message greets the consumer and displays options to launch the app or to acknowledge and dismiss the push notification. The specific message text may be determined by a combination of factors such as preference settings, item lookup history or desired items.

The process flow 316, "In-Store Flow," describes the actions taken by the consumer while in-store to complete a secure self-payment transaction. According to the embodiment shown in FIG. 3, the in-store process flow includes the following steps: launch app 318, build cart 320, and confirm payment 322.

In the launch app step 318, the app is launched so that purchase and item scanning functions can be performed. This may be done either by completing the steps described in 310, by manually selecting and launching the app in the mobile device OS, or from within another app or web browser.

At step 320, "Build Cart," the secure self-payment app keeps a tally of the items that the consumer wishes to purchase in an electronic in-app shopping cart. The shopping cart is built as the consumer scans an identifying code (such as a barcode or other unique item identifier) with the device camera or otherwise looks up and confirms items that he or she wishes to purchase or view in-app. The web API displays information from a linked database that includes price and may include information such as product description, images, additional recommendations or other information that may aid the consumer in making the purchase decision. The app may give the consumer an option to confirm the item for purchase and to either store it in an in-app virtual shopping cart with other previously entered items or to purchase the item alone. There may be an option to select a desired quantity of the item or to add specific promotional codes. The web API may also display promotions and suggestions triggered by the customer's use of the app. To provide the consumer with meaningful promotions and suggestions, the secure self-payment system may track and monitor the consumer's item lookup and purchase history as well as use all data entered by the customer when setting up or modifying the consumer profile. If the consumer chooses to add an item to his or her virtual shopping cart and continue shopping, this step repeats until the consumer has added all the items he or she wishes to purchase. Once the virtual shopping cart contains all the items that the consumer wishes to purchase, the purchase may be completed as described in subsequent steps. In addition, the service provider may offer an optional "shipping" function. This shipping function may be used to allow consumers to add items to their shopping cart in-app and then have them shipped to a physical location instead of taking the items with them on their way out of the store. In this case, the web API communicates with the retailer that the purchase should be shipped to a designated address.

For many reasons, and in particular for reasons related to security and anti-theft concerns, a retailer may create restrictions that are implemented by the self-payment app or web API that only allow specific items to be added to the shopping cart or that impose transaction or item value limits. In some cases, items may be at high risk of running out of stock, too large, to carry out of the store and may pose liability issues (e.g., a television set), too expensive to purchase within the secure self-payment application as deemed by the retailer (e.g., a high-end digital camera), or may carry an inventory tag that the retailer wishes to remove or de-activate themselves. Where the retailer has created such restrictions, the consumer is notified of the specific restriction in-app once the web API retrieves the product information from the item database including any associated restrictions.

At step 322, "Confirm Payment," the shopping cart takes the item and price data and displays a total purchase amount in-app on the consumer's device. The secure self-payment application displays the total purchase amount and prompts the consumer to select his or her default payment method, or to select another saved payment method, or to create a new payment method. The secure self-payment application may also give the consumer options to change quantities, add promotional codes, remove items or to go back to step 320 to add more items to his or her in-app virtual cart. The secure self-payment application attempts a purchase through the web API and the payment processor once the consumer confirms his or her intent to attempt to apply his or her selected payment method to the proposed transaction. In the preferred embodiment, step 322 is only completed once the consumer confirms the purchase amount in-app and agrees to begin the checkout process.

if the original payment method is declined by the payment processor, the confirm payment step 322 can be re-attempted by the consumer with another default, stored, or new payment method. The in-app virtual shopping cart maintains the same items that were added by the consumer until a payment method is entered that is accepted by the payment processor, the consumer leaves the store, a lengthy amount of time has passed, or the consumer opts to clear the cart. If there are multiple failed purchase attempts either due to a failed or declined request sent to a payment processor or other fault such as an error with generating a unique verification code, such as a QR code, the secure self-payment application optionally displays a message that directs the consumer to a live retail associate or service desk for additional help. The secure self-payment method optionally also notifies the retailer of a failed purchase attempt via the retailer mobile device or POS system for the retailer's own fraud prevention measures. Where a consumer or transaction poses a particularly high security risk, the process may not permit the confirm payment step 322 to be re-attempted by the consumer following a declined payment method, or a specific number of declined attempts, as specified by the retailer.

The process flow 324, "In-Store Return Flow" describes the consumer process when returning or exchanging an item originally purchased in-app. According to the embodiment shown in FIG. 3, the in-store return process flow includes the following steps: retrieve receipt 326, present QR code 328, return or exchange item 330, and refund or exchange honored 332.

At step 326, "Retrieve Receipt," the secure self-payment application makes the receipt available to the consumer for display on his or her device. The receipt can be stored and displayed in the self-payment application. In addition, the web API is capable of sending the receipt to third-party apps, such as Apple Passbook, or to an e-mail account, whereupon the receipt can be retrieved and displayed in such third-party app or e-mail application. After speaking to a retail associate about wishing to initiate a refund, the consumer retrieves the receipt for display to the retailer to provide verification of the original purchase. In the preferred embodiment, receipts are stored in a "purchase history" section within the self-payment application. Other implementations may be used for storing and retrieving receipts, however, and these other implementations may vary depending on the configuration of the secure self-payment application or third-party application. Receipts may be organized by date, retailer, types of items, geographical location, payment method and/or other Criteria.

At step 328, "Present QR Code," through the self-payment application the service provider makes available for capture a unique token, generally in the form of a UPI link, that can be used to verify the consumer's purchase of the goods or service. In the preferred embodiment, the self-payment app displays on each receipt a QR code, which is a graphical representation of the unique token, such as a unique string code that represents a URL of dynamically generated web content, corresponding to the database entry containing information regarding the purchase of goods and services. In another embodiment, the self-payment application makes available the token or URL for capture by the retailer device via wireless data connection, such as NPC. In the preferred embodiment, when the QR code is captured by the retailer device, the retail device extracts the embedded URL code and links to the service provider's web server maid can request data across a variety of formats (typically XML or JSON). The capture of the token, such as the scanning of the unique QR code or transmission of the token via a wireless link, is performed by the retailer device 104 through the use of communication link 110. Request for record retrieval is performed by link 114 and then pushed back to the retailer 104 for display on the retailer device by the self-payment service provider 106 using the same link 114 as a reply. In the case the app is provided by web technologies (for instance HTML5, CSS, etc.) a web form or page containing information relating to the purchase such as time and date, items purchased, consumer identity and purchase amount is sent by the web API for display on the retailer device. The web view may be accessible as either a web page or as a data feed. In addition, the web view may require device authorization on the retailer device with one or more authentication factors to ensure data management. Possible authentication factors include pre-login password, login password, encrypted key authorization, Device Registry Checks (stores of authorized manufacturer serial number) and/or biometrics. In the preferred embodiment, the verification QR code is visible on all receipts, but exact placement of the QR code on the receipt may vary. Once the QR code is visible and clearly displayed on the device screen, the consumer may present his or her mobile device to the retailer for capture or manual entry of the displayed transaction number.

The retailer then captures the unique token, such as the QR code, or manually enters in a corresponding transaction number either through the functionality provided by the secure self-payment retailer verification app or compatible retailer POS system and/or custom conversion software and hardware. Upon successful verification, the retailer verification app or compatible retailer POS system displays an itemized receipt on the retailer's device. In the preferred embodiment, the retailer follows its specific return or exchange procedures via its mobile device running the retailer verification app or POS system. This step 328 requires the retailer to select the items being returned or exchanged through the use of its chosen QR code reading method. The consumer may also be asked whether he or she would like the transaction refunded to his or her original payment method, store credit or other as per the retailer and payment method rules.

At step 330, "Return or Exchange Rem," once the token and corresponding purchase have been successfully verified and the retailer has performed any necessary steps on its end, the item is returned or exchanged. As previously discussed, in the preferred embodiment the token is provided in the form of a link embedded in a QR code that links to a transaction URL with transaction information. The transaction URL may contain access restrictions, for instance those of a specific consumer or retailer device. In certain embodiments, a substitution technique enables the QR code associated with the transaction to access more data under stronger security restrictions and different user permissions. For example, the string https://www.selfpayserviceprovider.com/transactions/34561 could be read and replaced programmatically by https://www.selfpayserviceprovider.com/exchanges/34561. This access would have stronger access restrictions: not accessible by consumer device and only accessible for retail devices and accounts authorized to process exchanges. Because of the exchange needs, the data attached to this information on the service provider server could include the original method of payment and a payment transaction id token to be sent to the payment processor to handle the refund or exchange. The QR-coded receipt and surrounding architecture is used as part of the secure self-payment method so that the return can be made in compliance with financial laws and retailer specific policies without needing the information necessary to do so to be present on either the consumer device or the retailer device/POS. If the transaction is an equal-value exchange, a monetary transaction is not performed. After the retailer successfully performs a refund or exchange, a new, modified receipt is created by the web API and this updated receipt and transaction is stored on the server. The next time the consumer accesses his or her purchase receipts, the self-payment application downloads all updated receipts from the service provider server, including a new QR code, with the new string pointing to the revised receipt. This enables both the retailer and the consumer to see the new information while enabling the service provider to have full records of the transaction history as separate transactions stored in the consumer's profile with the service provider and may be viewed by the consumer in-app. In a non-preferred embodiment, the QR code remains the same, but the information being linked to by the QR code reflects the changes to the transaction as a result of the return or exchange. These changes to the QR code are performed by modifying the existing entries in the data record to include additional information regarding the change, such as to indicate the return, and generate an updated receipt for that return, as opposed to creating a new transaction for the return and a receipt for that transaction. In this embodiment, the updated receipt may also be stored by the retailer and such receipt data may be modified in such a way as to reflect the details comprising the modified transaction.

At step 332, "Refund or Exchange Honored," the secure self-payment application makes available an updated electronic receipt to the consumer. The consumer is then able to verify electronically through the use of the secure self-payment application that his or her purchase of the returned item has been marked as returned or exchanged. In certain embodiments, the retailer gives the consumer a paper record of the return, or the retailer keeps a paper record for itself.

Process flow 334, "Out of Store," is an optional process found in certain embodiments. This process flow describes a feature provided by the secure self-payment system that some retailers may implement to allow consumers to pre-purchase or pre-select items or services before arriving at a physical retail location. The out of store process flow includes the following steps: add items or services to cart 336, approach or enter participating store 338, pick up items 340, and present QR coded receipt 342.

Step 336, "Add Items to Cart," is similar to the build cart step 320 of the in-store process flow. The main difference between steps 336 and 320 is that in step 336 of the out of store process flow the secure self-payment application is opened while the consumer and device are not physically in the retail store. The service provider makes it possible to add desired items to the in-app shopping cart through the use of the same item identification techniques as described in step 320.

As items are added into the shopping cart, the secure self-payment application sends out a request to the retailer network to confirm that the retailer carries the item and that it is stock.

As described in greater detail herein, the consumer's mobile device and self-payment application may be equipped with location service functionality, which permit the device and application to determine the consumer's location and whether or not the consumer is located within or near a store. When such location services are enabled, the secure self-payment application may display a separate "out of store" shopping cart on the retailer's page or section in the application when the consumer is not in the store. This out of store functionality is launched through a designated section within the secure self-payment application.

In the preferred embodiment, the retailer allows the secure self-payment application to complete the payment using the process described in 322 and to generate the QR code before the consumer physically arrives at the retail store. In a preferred embodiment, the self-payment application stores the QR-coded receipt in a separate category designated for the pick-up of goods and services. This QR code stores a unique string URL token resembling: https://www.selfpaymentprovider.com/pick-up/23451 where the items available for pickup would be listed. Upon a successful pick-up of all items, a receipt of the normal transaction variety is generated and stored as an ordinary receipt, and the pick-up receipt is erased from the consumer system. In the event of a partial pick-up, a revised pick-up receipt is generated for the outstanding items, and a partial receipt is generated for the items picked up. This process involves creating a data entry in the corresponding record indicating which items have been picked up by the consumer, and which items remain for pickup. Upon picking up the remainder of the items, a second partial receipt is issued. Alternatively, upon picking up the reminder of the items the receipts are merged.

Step 338, "Approach or Enter Participating Store," is similar to step 312 in the push notification process flow, in that the service provider's web API is notified that the consumer is in or near the retail store and that the consumer may launch the app. In this case, the displayed message is used to notify the consumer that he or she has items in-store that have already been purchased and which are waiting on a pick-up.

At step 340, "Pick Up Items," once the consumer is in the store, he or she may locate the desired items either in-aisle or at another retailer specified location. The consumer may take the items which were paid for in 336 as described in 322 and begin to make his or her way out of the physical store.

At step 342, "Present QR Code," per the retailer's loss prevention initiatives, the consumer may be asked to display the QR code generated by the secure self-payment application on his or her way out. The QR code is then read by the retailer's verification app that generates a purchase lookup query for the service provider's web API. Although this step is described in connection with the preferred embodiment wherein the token is in the form of a URL link embedded in a QR code that is displayed to the retailer for capture via scanning, it would be appreciated that this step may take other forms where the unique token is presented via wireless transmission, such as through NPC communications. For example, the consumer may place the consumer device in close proximity to the retailer's electronic device operating the verification app (or other POS device having similar functionality), whereupon the consumer device and electronic device establish a wireless communication link that permits the consumer device to transmit the unique token to the retailer's electronic device.

Figure 4A:
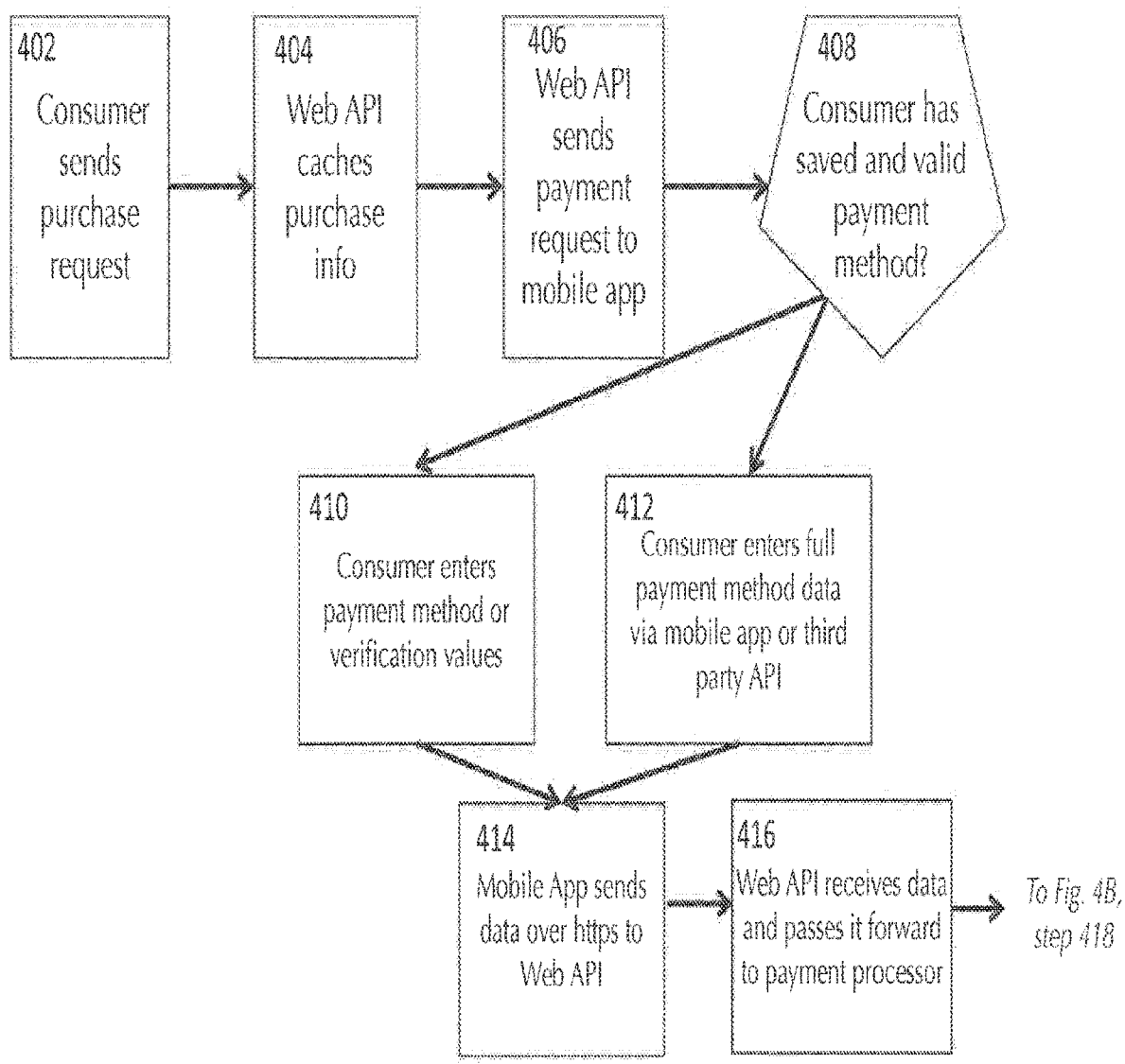

FIGS. 4A and 4B are a process flow chart showing the technical steps in the secure self-payment system according to an embodiment of the invention. This figure describes a process that results in a transaction together with the retailer verification process. This figure mainly describes the behavior and processes of the web API, although certain steps or portions thereof can be undertaken by the consumer in-app via the self-payment app on the consumer's mobile device. In this section all references to a web API or API, unless specified as third-party or other, refer to the service provider's self-payment web API. As discussed below, the self-payment web API may take the form of one or more servers with programming that enable them to perform the functionality described herein. The process described in FIGS. 4A and 4B can be varied based on a variety of factors. For example caching may be optional depending on implementation details. Furthermore, this process description is designed from the perspective of a service provider who is not a payment provider, and assumes that the service provider stores tokens that are linked to credit card data on a payment provider or payment service network rather than directly storing credit card data. Those with relevant experience will recognize that these and other minor variations can be made to the process, including the addition, exclusion, and variation of certain steps, while still remaining within the scope the secure self-payment systems and method described herein.

At step 402 the consumer through the functionality provided by the self-payment app on the consumer's device sends a purchase request by adding items to the virtual shopping cart, making selections that indicate he—or she wishes to confirm and pay for the specific selected items including selecting a specific and personal method of payment. The consumer has thus declared his or her intent to purchase the items in the in-app shopping cart as described in 322.

At step 404 the web All caches the purchase request sent by the consumer's mobile device. In this step the shopping cart data such as items, prices, quantities and final total is cached by the web API for use by the secure self-payment system.

At step 406 the web APT sends the payment request to the secure self-payment application running on the consumer's mobile device. A payment request is sent to the consumer's mobile device from the web API for payment confirmation. The request uses the cached data from step 404 but may also add in additional data such as tax policies or other discounts that were not properly applied at the previous stages. In the preferred embodiment this request uses JSON and various well known encryption technologies including HTTPS while ensuring that the secure key matches the service provider's secure key, is signed by a valid signing authority, and is current. In the preferred embodiment, the consumer can initiate this automated process by hitting a purchase button.

At step 408 the web API, or alternatively the self-payment application running on the consumer's mobile device, checks to determine if the consumer would like to use a saved or cached credit card or payment method, and determines whether or not the method selected by the consumer is valid. Two possible outcomes of the check at step 408 are "Yes" and "No". "Yes", step 410, is a result of a stored and valid payment method being found and selected by the consumer in-app as his or her method of payment for the current purchase. "No", step 412, is a result of either an invalid payment method being found and selected in-app by the consumer or a result of no payment information being found or entered in by the consumer at any point. Throughout steps 408, 410 and 412, "valid" and "invalid" payment methods are from the perspective of the service provider. Note that a payment processor may later reject a "valid" payment method. For example, a consumer may have selected a "valid" payment method but later the payment processor may reject it due to unavailable credit.

If the result of the check at step 408 is "YES" then the system proceeds to step 410 in which the consumer may enter payment or identity verification. If the check at step 408 comes back with a previously saved and valid payment method, the secure self-payment application prompts the consumer to verify his or her identity or ownership of the method through the entry of a unique identifier. This unique identifier may depend on the method of payment employed by the consumer, and may be a credit card's verification value, a custom secure self-payment method or other payment method PIN, or a third-party security login or verification such as Verified by Visa.

If the result of the check at step 408 is "NO" then the system proceeds to step 412 in which the consumer enters payment data via the secure self-payment application running on the consumer's mobile or via a third-party API. If the check at step 408 comes back with no previously used or stored payment method, the self-payment application prompts the consumer to enter in a new payment method along with all relevant verification data such as name, address, card verification value, birthday or other checks that may be used to prove ownership of the payment method. Likewise, a similar full-entry interface may be presented to the consumer if the check at 408 returned with a previously saved, but currently expired or invalid, payment method. The secure self-payment application may allow the consumer to enter a payment method either through direct manual entry through the application, or through the use of a third-party information capture API. In the preferred embodiment both of these methods are implemented and the consumer is offered a choice. Example third-party APIs may include image recognition via the camera on the mobile device to verify a physical payment card or ID, or other well-known methods of payment entry not relating to manual in-app data entry. Once the secure self-payment application receives payment method information, the same shortened verification steps discussed in step 410 may apply in order to verify the payment method.

At step 414 the self-payment app on the consumer's mobile device sends the payment request data using HTTPS to the retailer's web API. The payment data and verification values are sent securely over HTTPS to the web API for further processing.

At step 416 the web API receives the payment data and verification values and passes this information forward to a payment processor. There are four case scenarios in which the payment data is sent to a payment processor: (i) the secure self-payment system caches credit cards; (ii) the retailer's POS Caches credit cards; (iii) the retailer's POS passes payment to a third-party; and (iv) the secure self-payment system passes payment to a third-party. This step involves the passing on of payment data for processing. The method in which the payment data is processed may be performed using any number of well known techniques and may vary based on retailer type, agreements, payment method, third-party used or a number of different factors.

At step 418 the payment provider processes the transaction or sends back a warning. This step is the response to the payment request sent by the secure self-payment system to the payment processor. The three possible outcomes are: (i) transaction approved; (ii) transaction declined; and (iii) a request for payment info re-entry. Re-entry may be a result of an expired payment method, incorrect data entry or other factors as determined by the payment processor.

If the transaction is approved, the system proceeds to step 420 where the web API processes the previously cached purchase data together with the payment approval code and saves it to the service provider database as an approved purchase. This database could be a separate database on a separate server the service provider uses for payments, a database on the same server as the inventory database, a different table in the same database as the inventory database, or an extension of the same table. In this context, the terms database and data record include not only traditional databases and entries therein, but any other structure for storing information in an organized fashion and includes, but is not limited to, a collection of log files on a server contained in a folder. The approved purchase transaction may have additional data elements (or "data entries") added to the record which does not include the sensitive payment data but can include purchase data such as: items purchased, total purchase amount, payment type, location and time of purchase, consumer ID, payment ID number, or other non-sensitive information relating to the purchase. This data is stored for later use for purchase verification, returns or exchanges, or marketing initiatives corresponding to a successful transaction. The payment query returns to the service provider web API and the consumer's payment method is charged or debited. At this point, sensitive data has been processed and is not stored with the service provider's API.

At step 422, according to the preferred embodiment, a QR coded receipt is generated by the web API. The generation process for the QR code occurs as follows. A unique token is generated that is associated with the approved purchase transaction record. The token can be associated with the approved purchase transaction record in a number of ways. For example, the token may be associated with the approved purchase transaction record by virtue of a lookup table. Alternatively, the token may be a URL link (or portion thereof) that links to the approved purchase transaction record. The token is transformed into a unique QR code through the use of a QR code generator, which generally takes the form of a software function. This QR code generator may be a module within the web API or may be hosted by a third party on a third party server in communication with the web API via a network. The QR code generator receives as an input the token and returns a QR code with the token embedded therein. In this manner, the QR code is a representation of a web or network address associated with a page and/or data feed connected programmatically to the database entry corresponding to the consumer's purchase. For example, if the transaction ID for a purchase in the database has the unique identifier 34152 then an example QR code would be an encoding of the string https://www-.selfpaymentserviceprovider.com/transactions/34152. The retailer devices can determine which web or network location to access by capturing this string from the consumer's device—through either scanning a QR-coded receipt or other capture techniques such as NFC. Data that may be represented by the web page or other method of data exchange can be loaded using the link provided in the QR code together with information embedded in the retailer application, through the previously described web-view methodology.

At step 424 the token is sent to the consumer's mobile device for storage. In the preferred embodiment, the token is sent in the form of a QR code. The QR code generated in step 422 is sent by the web API to the consumer's mobile device for display and storage.

At step 426 a spot check may he performed by the retailer. This step references the act of the retailer verifying the consumer's purchase. In the preferred embodiment, for retail spot checks the secure self-payment application displays the QR code generated in step 422 upon request, by the consumer, if asked by the retailer to provide proof of purchase. In an alternative embodiment, the consumer's mobile device is brought into proximity of the retailer's device so that the token associated with a purchase transaction can be wirelessly transmitted to the retailer's device for verification purposes. The frequency of spot checks is left at the retailer's discretion. This spot check maybe performed at random, always, sometimes, or not at all. In all purchase cases performed by the self-payment application, the QR code can be provided as a method of purchase verification. This QR code may be sent by the web API for display either in the secure self-payment application, third-party apps or other methods of displaying the QR code. There are two outcomes to this step: yes or no, corresponding to whether a spot check is performed, or is not performed, respectively.

If the outcome of step 426 is a "yes" (corresponding to a spot check being performed) then at step 428 a cheek for a purchase corresponding to the token or displayed QR code is performed. Through the use of the retailer verification app or compatible hardware or software running the service provider's web API such as a POS system, the retailer captures the QR code that is displayed on the consumer's device. Once the retailer's device captures the QR code, it sends a request to the service provider web API to determine whether the QR code is valid. If the link embedded in the QR code points to a service provider database entry representing a valid purchase, the web API interprets the QR code as referring to a valid purchase receipt (i.e., having a "match") and may further return the associated purchase information retrieved from the data record in the service provider database. There are two possible outcomes for step 428: match or no match, corresponding to whether or not there is a match between the data record linked by the QR code and a database entry in the retailer's and/or service provider's database.

If a match is confirmed, then at step 430 the system operates to indicate on the retailer's device that there is a match between the data record linked by the QR code and a database entry in the retailer's and/or service provider's database (i.e., a "match") such as by displaying the details of the consumer's transaction on the retailer's device operating the verification app. Step 430 follows if the QR code match request from step 428 finds a transaction in the retailer's and/or service provider's database that is linked to the displayed QR code. The retailer's device optionally displays the items purchased, consumer's name, total purchase, amount, time and place of purchase or other data that may be used to then verify the purchase visually or through other methods. A positive "match" occurs when the QR code displayed by the consumer mobile device is confirmed to point to a database entry that exists in the web API and references one specific transaction conducted by a specific consumer at that retailer. The system determines that a "match" is made if the web API retrieves purchase information from the data record link stored in the QR code. If a match occurs, the web API will then send the linked purchase receipt containing the purchase information stored in a database in 420 to the retailer device over HTTPS, SSH, or other encrypted exchange technology which is then displayed on a visual interface through the retailer verification app. The information that is part of a match reply includes data such as the purchase time, the customer profile photo, and all the purchased items on the consumer's receipt so that the retailer can ensure the valid use-case. It can also have geo-tagged information about whether the consumer has left the store since purchase, and/or the number of times the receipt has been scanned.

If no matching QR code is found, then at step 432, the system operates to indicate that there are no results (i.e., "no match") or no purchase transactions referenced by the consumer displayed QR code so that on retailer device, a message will appear indicating that no matching transaction was found. Step 432 follows if the QR code match request from step 428 has not found a transaction in the retailer's and/or service provider's database that is linked to the displayed QR code. This may be a result of a mis-scan, lack of network connectivity, a cracked screen or drained battery on the consumer's mobile device, failure to meet security permissions such as an unregistered retailer device or a number of other factors. A "No Match" indication is a warning that purchase information was not successfully retrieved and sent to the retailer's device. This warning can be further divided into a number of specific error messages with recommended steps to correct for ease of use. The warning message may be customized in a variety of ways depending on the implementation details, the technology partners, the retailer preferences, the qualifications and training of the loss prevention associate and other factors. For example, automated threat risk software could flag the fail as a high risk transaction if it detects a clear attempt to spoof a receipt, and a low risk transaction in the case of identifying a broken or invalid link on a server with the correct secure keys or if the retailer device loses its internet connection.

Step 434 follows a "no match" result at step 432, and involves the retailer applying its own fraud prevention processes for this use case. If the secure self-payment method spot-check fails, the retailer may choose to use a number of other fraud prevention methods based on that information. These fraud prevention methods may be whichever methods) the retailer currently employs or wishes to employ.

Step 436 follows the payment processor query at step 418 resulting in a failure to process the payment information sent from the self-payment app at step 418, and serves to notify the consumer of the failure. If the result of 418 is a failure, the web API notifies the consumer of a transaction decline. The web API may further prompt the consumer to re-enter some information in the secure self-payment application and to retry processing of the payment information.

At step 438 the web API generates and caches failure data for risk analysis. The failure data may include information corresponding to the reason that the payment processor indicated a failure to process the payment information it received this may be represented as an error code. The failure data may be used for purposes relating to security and payment integrity or for other risk related processes and activities.

At step 440 the service provider evaluates risk based on the failure data. This step includes the service provider's internal analysis and processes relating to risk levels and transactions. Processes may include behaviours such as closing or suspending a consumer's account or notifying payment processors or issuing banks of certain behaviours. This behaviour may be driven by many factors and is flexible and dynamic depending on the needs of the retailer, self-payment service provider, the payment and technology partners, and the consumer. It may be put in place to minimize fraud while avoiding conflict with the consumer.

At step 442 the secure self-payment method transaction concludes. This step is the result of a completed in-app transaction. The transaction may be one where a spot check is or is not performed by the retailer. This step may also be a result of a payment method being declined or the consumer aborting the purchase due to the inability to verify certain information with the payment processor.

Figure 4C:
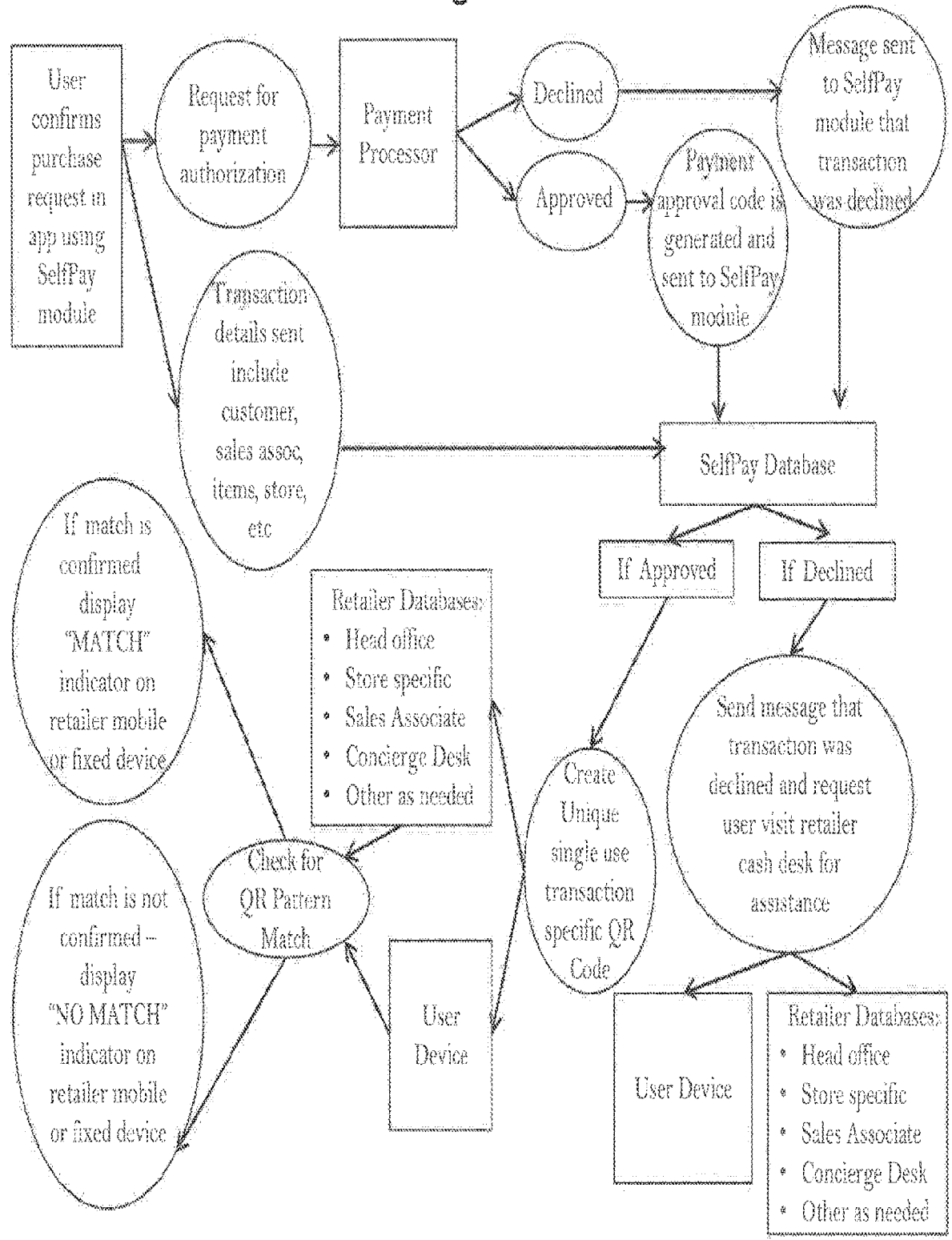
FIG. 4C is a process flow diagram showing certain steps undertaken in the secure self-payment transaction using a secure self-payment application and related system components, according to another embodiment of the invention.

FIG. 4C shows the steps in the self-payment transaction according to another embodiment of the invention.

Figure 5A:
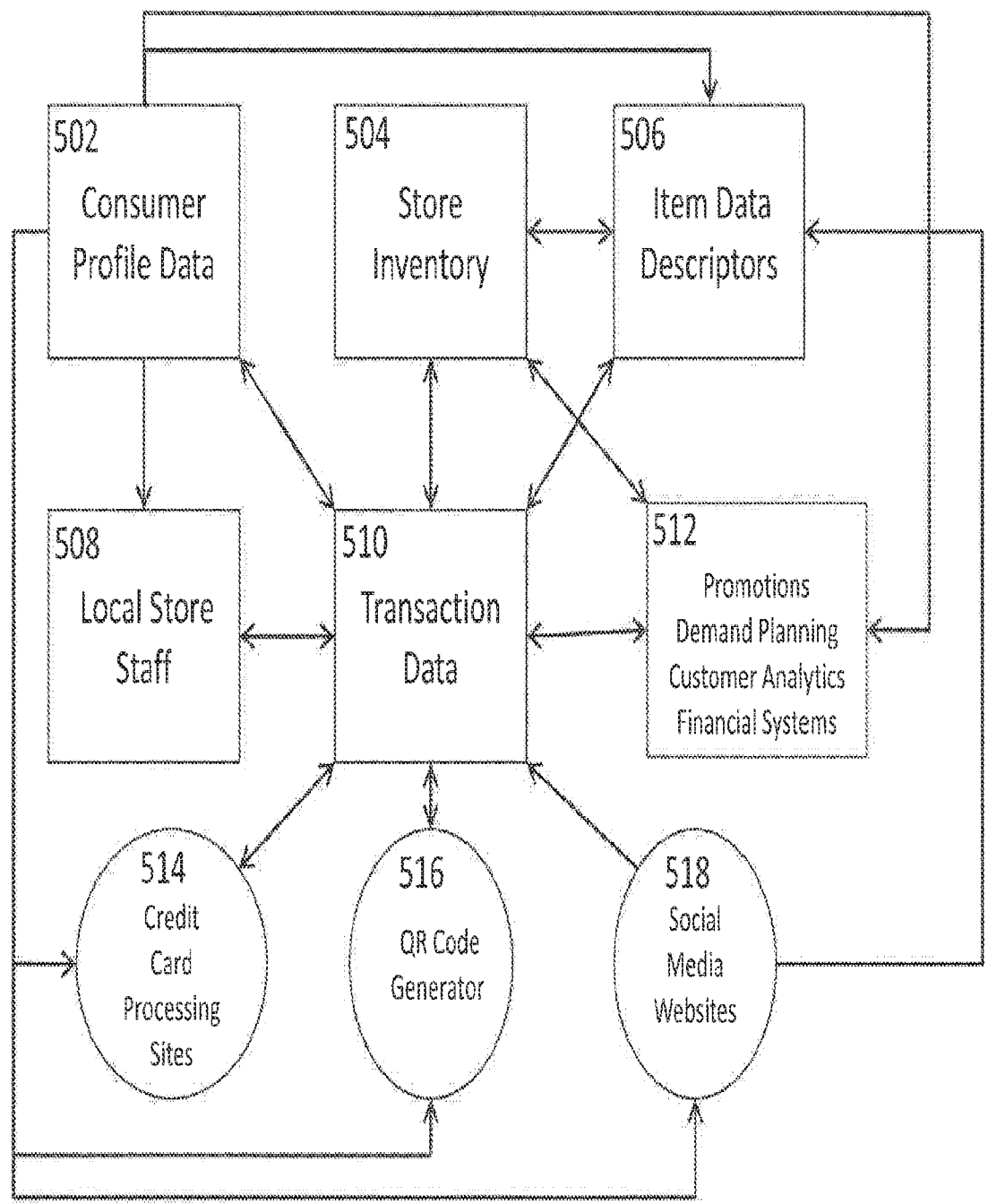
FIG. 5A is a relational diagram showing the interactions between databases and system components used in the self-payment transaction system, according to an embodiment of the invention.

FIG. 5A describes the general relationships and connectivity with respect to the data shared between the various devices and entities used in the self-payment systems and methods described herein. The connections between these entities can occur by some combination of connections to databases on the same network, direct id links between tables in the same databases, network connections to different databases by techniques such as polling or POST requests and connections using a variety of addressing methods for security to databases on a different virtualized server within the same physical server.

In the preferred embodiment, the data shared between the devices and entities is stored in a combination of the following: core data instances on to iOS devices; postgreSQL instances on one or more virtualized servers on one or more physical servers as part of a cloud computing solution; a retailer's preferred database technology on a network with restricted or severely limited outside access. In other embodiments, caching, text logs, or other non-database storage methods may be used. In the preferred embodiment, the data shared between the devices and entities is such that a retail associate has no access to consumer data without the consumer present, analytics data is made anonymous to protect user privacy, and consumers are able to modify profile preferences to set restrictions on the uses of their data.

Consumer profile data 502 includes profiles that are built out of preferences and collected consumer information and transaction history. Consumer profile data 502 is used as a component in the process of tailoring the secure self-payment application to the needs of the consumer and is also a database in which the consumer's settings and preferences are stored. In the preferred embodiment, this data is used by the service provider as a part of the information required to successfully craft an offer or item suggestion. In another embodiment, consumer profile data 502 is used as a means of accessing contact information to send the consumer service provider messages. The consumer profile data 502 may also include a consumer transaction log. The transaction log is the historical record of all individual interactions such as item or QR-coded receipt captures, sales, returns or exchanges. This transaction log, like the consumer settings and preferences, may be used for purposes of analyzing consumer browsing and buying behaviour as well as for generating consumer item suggestions and offers to be delivered by the secure self-payment application.

In other embodiments, data referenced in consumer profile data 502 is shared with third parties so that the third party may function properly. An example would be a method of exporting transaction data into an accounting or budgeting suite.

Examples of data included in the consumer profile data 502 include the consumer's name, email address, other contact information such as address, age, gender, social media account info and a transaction log. In other embodiments, the consumer profile may contain appointment histories, social interactions, and consumer/staff interactions. All such data can be carefully collected and managed via consumer preferences, retailer preferences, laws, industry best practices, and a variety of other factors.

The data stored in the consumer profiled data 502 is shared with item data descriptors 506 for purposes relating to the lookup of item descriptions, images or other details relating to an item being browsed in-app. A consumer's access to item data descriptors 506 may also be stored in the form of consumer browsing history in consumer profile data 502.

Consumer profile data 502, or portions thereof are shared with a retailer's local store staff 508 when the consumer would like information on specific store staff and may also be used to store specific consumer-staff relationships/ratings for item or offer recommendation or other marketing purposes. The contact history itself may also be used in a variety of ways in staff management or HR for the retailer. In the preferred embodiment, this contact history data is stored on the service provider's server. In a nova-preferred embodiment the contact history data is stored in the retailer server, or across multiple locations with some duplication.

Consumer profile data 502 is shared with promotions data 512 for purposes relating to promotions, consumer analytics and demand planning. For example, a promotion may be crafted based on the data contained in consumer profile data 502 which may or may not be unique to the individual consumer. This connection uses data in consumer profile data 502 relating to the consumer's demographics, browsing and purchase history.

Data 502 is shared with credit card processing sites 514 to look up consumer information that is stored by the payment processor when required per security practices. This may be a required step to completing payment within the secure self-payment application. Such lookups may be governed by laws, standards bodies, and other factors and details of these connections may vary in accordance with industry best practices.

Data 502 is shared with the QR code generator 516 whenever a verification QR code is generated and the consumer must display it as part of the spot check process. In the preferred embodiment, the QR codes can he generated dynamically and no storage needs exist. In a non-preferred embodiment, the consumer is linked to the service provider's QR code storage for QR code retrieval.

Data 502 is shared with social media sites 518 when a consumer needs access to his or her social media account(s) or would like to make a social media post. This data may be stored or analyzed by the service provider and accessed for purposes relating to item suggestions through the secure self-payment application or the social media account. Social network logins may be stored separately from the consumer sharing history, which may be connected to a service provider user account by anonymous id or other method. This would enable a higher security on any login and password data for social networks than is typically used by the social networks themselves.

Store inventory 504 includes data representing the goods and services available for sale by a retailer.

Store inventory 504 is used as a basic method of item lookup. As the consumer scans an item identified within the secure self-payment application, 504 is displayed as a means of identifying the item. In the preferred embodiment, this data is accessed from a copy of the POS provider's records stored in the server architecture and updated through the polling technique described in FIG. 1A.

An optional use of this data is to determine whether an item is in stock. The secure self-payment application may be able to dynamically display an available item count as stored in 504.

An example of this type of data is the item name, UPC and in-store count. The store inventory 504 can be stored locally or accessed by the service provider web API.

Each item in the store inventory 504 has its own associated item data description 506, as well as other related item lookup data, 504 and 506 are closely related as each inventory item and will have its own description or other lookup data such as brand name, images, or category. The detail of this data connection is subject to the details of the POS system, the retailer implementation, industry best practices and a broad spectrum of other factors. In the preferred embodiment the data will be mapped to a standard representation on the service provider's network, with the mapping occurring through each polling connection.

Store inventory 504 may be linked to promotions data 512 for purposes relating to tracking promotion usage rates for specific, items and for promotion adjustment purposes if an item receives or loses stock, or for other purposes whenever items reflected in the inventory data 504 have an associated promotion reflected in promotions data 512.

Item data descriptors 506 are database entries for information requests when regarding a specific item. The purpose of the information is to further elaborate on the item in question and referred to by the data in 504. These descriptors are connected to a transaction for reviewing purchased items and for user lookups histories. Item data descriptors 506 may be a database stored with the retailer on its POS system or an external third party database.

Examples of the type of information contained in 506 include brand name, images, written description, item category or other information that is not specifically 504.

The local store staff 508 contains information about the retailer's store staff that may be located within the physical store that the consumer is in or is browsing.

A purpose of 508 is to let the consumer view available store associates and to make contact with an associate through the associate's mobile device. Local store staff 508 is an optional data set and not required for core functionality.

Data contained in 508 may include the store associate's name, contact information and scheduled hours.

Transaction data 510 includes information regarding a completed purchase this data is connected to all other data described in FIG. 5A. Social media websites 518 may only access this data if specifically requested by 518 as a result of a user action.

Transaction data 510 is the data from consumers' purchases and is used in connection with most other data points.

A purpose of the transaction data is to display specific information relating to the purchase on the consumer receipt visible in the secure self-payment application. Parts of this data such as time of transaction, item purchased, payment method and retailer may also be used when crafting offers catered to the individual consumer.

Examples of information relating to transaction data include the item purchased, item pricing information, time of purchase, location of purchase, quantity of items purchased, the name of the retail associate who helped with item selection (if applicable), discounts received, payment method and the verification QR code associated with the purchase transaction.

The transaction data 510 consists only of the lower security pieces of a transaction. Information such as payment hashes and tokens, more detailed credit card information, purchase identifiers, and any information requiring a more fully secure solution is hosted separately in accordance with industry best practices, retailer preferences and a variety of factors.

Transaction data 510 is used with customer profile data 502 when the consumer performs any action relating to a past or present transaction. This is necessary as part of the data in 502 directly relates to completed transactions. The service provider may store consumer transaction history within the consumer profile in order to make item or promotion recommendations. Such information may exist in a broad variety of implementation factors.

Transaction data 510 is used with store inventory 504 to adjust inventory amounts for sales, returns or exchanges. This is a step taken as a transaction is completed so that the retailer may adjust its inventory item counts. Connection may be implemented in a variety of ways depending on data access factors, including through third-party POS integrators, POS API access, or direct connections.

Transaction data 510 is used with item data descriptors 506 to display item description data when paired with a transaction. The consumer's receipt may display an image of the item or other data not relating to exact item name and item count purchased. Implementation details vary depending upon POS preferences, retailer preferences, any relevant API's, SDK's and custom software factors, as well as other factors.

Transaction data 510 may be used in connection with the local store staff data 508 so that individual store associate's transactions are tracked for commission or other purposes and to link a transaction to a store associate for the consumer's records or other purposes. Implementation details vary depending upon POS preferences, retailer preferences, any relevant API's, SDK's and custom software factors, as well as other factors.

Transaction data 510 is closely connected to promotions data 512 as many details in the transaction data trigger the behavior of promotions and offers. Transaction data also has a direct effect on customer analytics which may be shared with the retailer. A practical example of this data is to make a specific promotion usable one time only. Once the transaction is completed, the specific offered promotion may not be accessed again by the individual consumer.

Transaction data 510 is closely connected to payment and credit card processing sites 514 for reporting and authorization purposes. Transaction data is sent directly to the credit card processor for authorization. The amount of the transaction as well as other details such as retailer name may be used for display on the consumer's monthly credit card bill. Purchase processing results are stored with transaction data.

Transaction data 510 is closely connected to QR code generator 516 as each transaction is represented by a QR code that is used for in-store verification. The QR code generation is a product of a successfully completed transaction.

Promotions data 512 includes information related to promotions, demand planning, customer analytics and financial systems.

A purpose of 512 is to keep track of all items offered and sold during a promotion. The secure self-payment system uses this data for many purposes including inventory balancing, offer crafting, consumer segment characterization, employee training and for other analytics purposes. The service provider may make use of this real time collected data for its promotional initiatives, marketing, advertising, sales and other business functions in accordance with retailer and consumer agreements.

Examples of data in 512 include consumer real time browsing and shopping history, service provider promotions, and retailer-specific promotions. In addition, 512 organizes and stores data in such a way that it may be analyzed for dynamic offer crafting. A simple example of this data being used to craft a suggestion would be a consumer's scan history, but no purchase, of 11 shirts over 2 days. It is known that the consumer has scanned 11 shirts but because no purchase was made, the secure self-payment system may recommend a shirt of a different style or lower price.

Payment and Credit card processing sites 514 refers to payment and credit card processing data. A hash is connected to customer and transaction. As each consumer has payment methods saved in-app and unique purchases, the hash must be connected to both.

The purpose of this data is to verify a transaction as legitimate. In the preferred embodiment, such data will be hosted in accordance with industry best practices. The data includes the consumer's name, address, credit history and other data most often used by the payment processors as a method of purchase verification.

QR code generator 516 is the QR code connected to a transaction and individual consumer history. 516 is used to represent a transaction. The QR code is created to be used as a method of accessing a web form in-app or data for generating a custom receipt.

The purpose of 516 is to create a representation of a transaction that is used for purchase verification purposes. In the preferred embodiment, QR codes do not store purchase data; they are rather a method of accessing the corresponding data. As described herein, in the preferred embodiment the QR code contains embedded therein a token that can be used to verify the purchase of goods and services.

Social media websites 518 includes data related to social options connected to customer history such as scanned or purchased items and shared promotions.

The data stored in 518 may include the consumer's social media friends list, status updates, shared images or other information stored as per the individual social media provider agreement. This data is accessed through the social media login credentials which may be stored in 502. This is intended to represent the data relationships for social media, which can be a history of what the customer shared to which networks for data analytics, or a variety of other factors.

Social media websites 518 may access customer profile data 502 when the consumer wishes to login to his or her social media account while using the secure self-payment application. In this case, the secure self-payment application may use the login credentials stored in 502.

Social media websites 518 may access item data descriptors 506 when the consumer wishes to post pre-determined item information to a social network and would like to access item descriptions or information.

Social media websites 518 may access transaction data 510 when the consumer would like access to a previous purchase for posting to social networks. This allows the consumer to post information such as total cost, place of purchase, or other information relating to a completed purchase on his or her social media account.

Figure 5B:
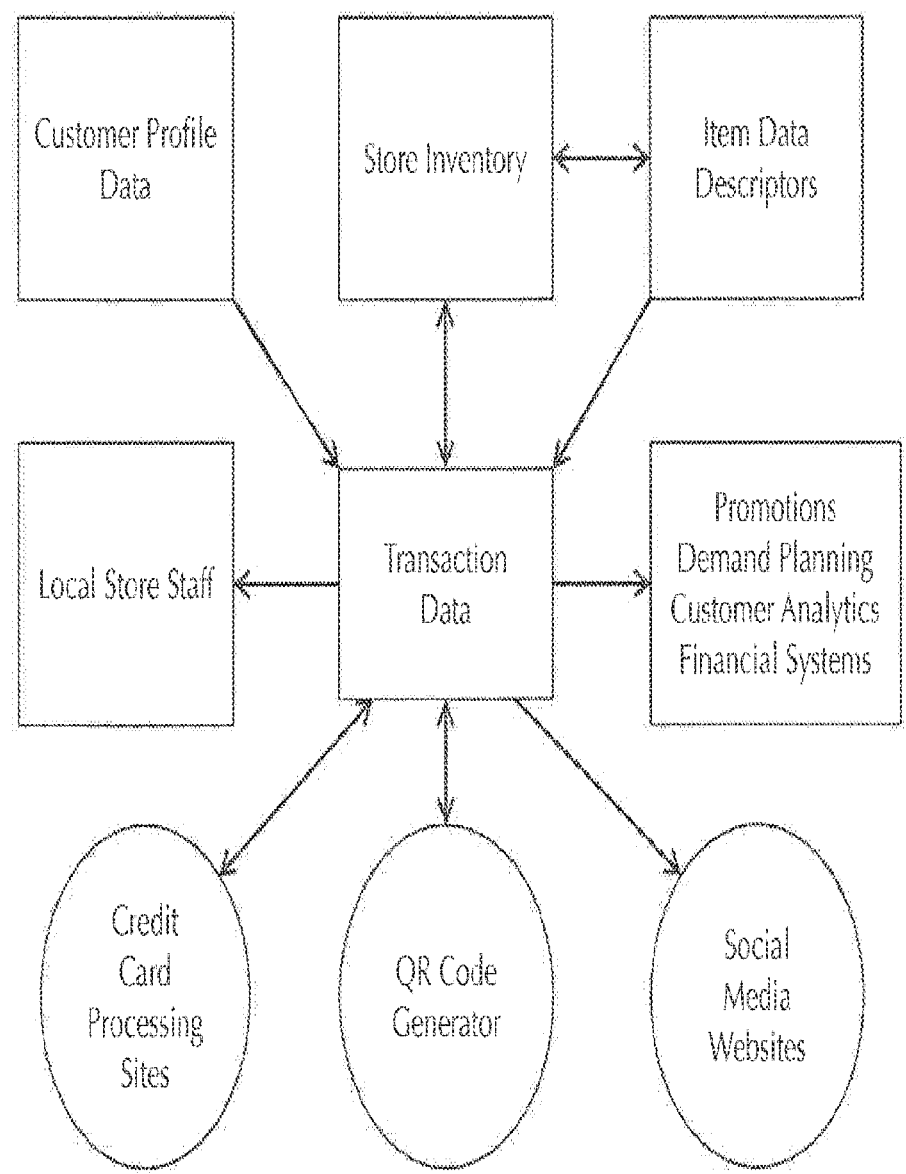
FIG. 5B is a relational diagram showing the interactions between databases and system components used in the self-payment system and method, according to another embodiment of the invention.

FIG. 5B describes the general relationships and connectivity according to another embodiment of the secure self-payment application.

Figure 6:
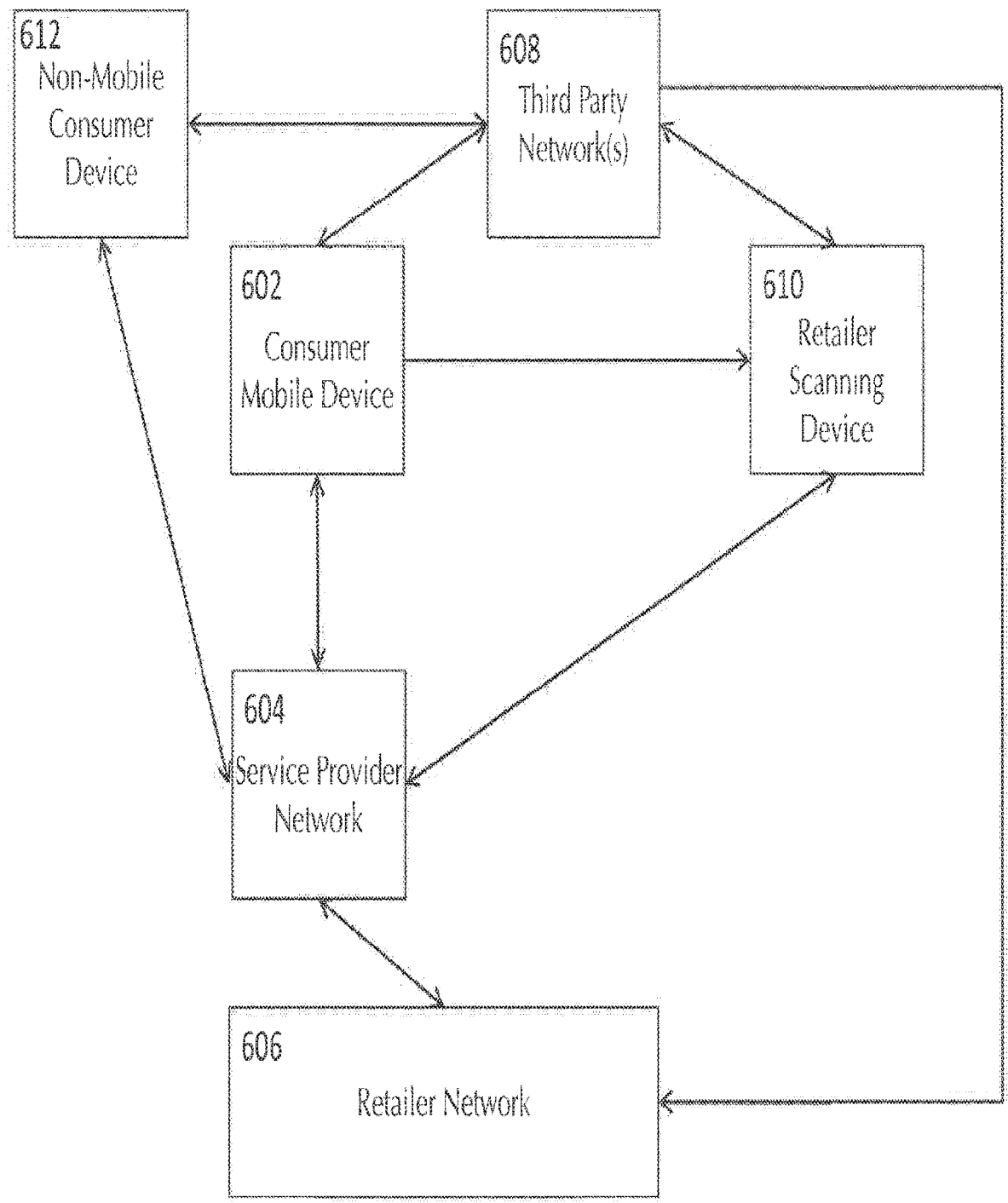
FIG. 6 is a diagram illustrating the devices that may be used in the secure self-payment system and method, according to an embodiment of the invention.

FIG. 6 is a diagram illustrating the devices that may be used in connection with the self-payment system and method described herein. The nature of communications between the devices may be further explained by FIG. 1 and FIG. 1A. Descriptions of each of the devices are provided below.

Consumer Mobile Device

The consumer mobile device 602 is a small, typically hand-held device that a user can take with them from location to location as he or she moves around during his or her daily activities. Specific examples of a consumer mobile device include the Apple iPhone, Apple iPod Touch, Apple iPad, Samsung Galaxy, or other well-known portable devices. These devices are modified to include software in the form of an application or "app" that provides the devices with the functionality necessary to carry out the self-payment systems and methods described herein.

Figure 9:
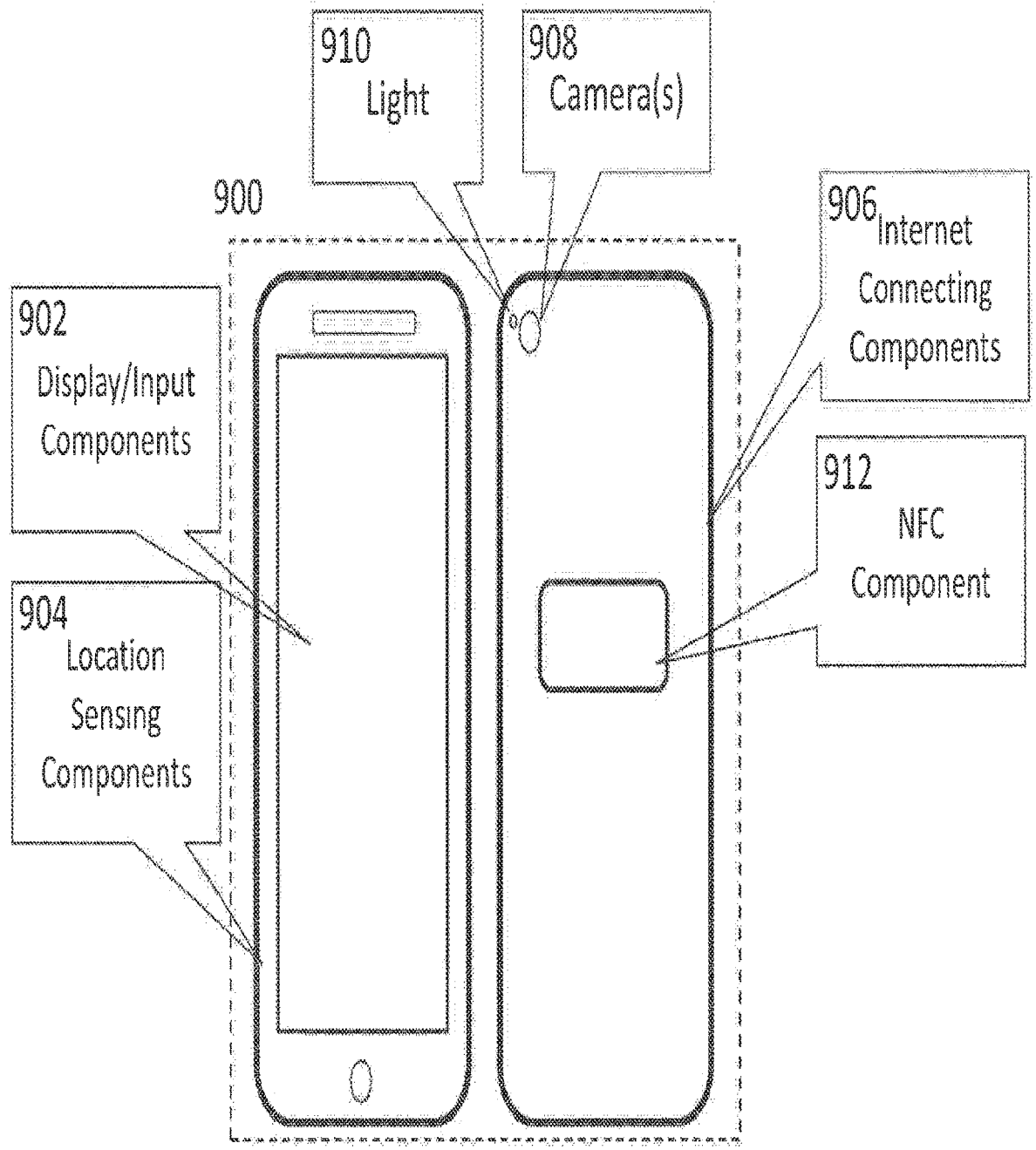
FIG. 9 is a diagram showing components of a consumer mobile device to be used with the secure self-payment system and method, according to an embodiment of the invention.

Generally, the consumer mobile device runs an operating system (OS) and can run apps that the user installs through a device app store. The device typically uses some sort of means of inputting information into the device such as a touch screen or tactile keyboard. Other typical components include a visual display, camera, location sensing component and internet connection component. These other components are further explained with reference to consumer mobile device 900, as shown in FIG. 9. A mobile device is generally a phone, portable web browser or personal digital assistant used to keep track of schedules and daily tasks. In the preferred embodiment, this device contains hardware and software which provides functionality for: providing an Internet connection to the web API; providing a visual display for a graphic user interface to interact with the consumer and to display a QR-coded receipt; providing one or more methods of interaction with the functionality provided in the third party provider offering; providing a camera for barcode scanning; providing a camera fur recognition of credit and debit cards; and providing a unique device identifier for authentication reasons. In other embodiments consumer mobile device 602 contains hardware and software for: providing a local wireless connection to the service provider API; providing a visual, audio, Near-Field Communications or other media channel for transferring a unique token, receipt request, and receipt information.

The purpose of the consumer mobile device for tasks relating to the secure self-payment method is to allow the consumer to interact with the service provider's web API and secure self-payment application. The consumer mobile device acts as an input method so that information such as item identification, and personal data and payment data may be entered in-app by the consumer. Likewise, the mobile device screen is used by the secure self-payment application to display the verification QR code so that it may be captured by the companion retailer verification app. The app receives the inputs and then can connect to the web API to perform the function desired by the consumer and display the proper communications and replies to the consumer on the device screen. The mobile device is the physical access point used by the consumer for access to functions performed in-app and by the web API.

Specific examples of interactions performed through the use of the consumer mobile device 602 include downloading the self-payment app 304; inputting information related to the sign up process 306; inputting profile and preference 308; launching the secure self-payment application 318; building of a shopping cart 320 and 336; entering payment information for goods and services 322; receipt storage and lookup 326; QR code display 110 and 328 and 426; token storage and wireless transfer; as well as location-sensitive actions listed in 310. Some of these interactions are not exclusive to the consumer mobile device and may also be performed by the fixed consumer device 612.

The consumer mobile device interacts with the other devices through a two-way likely wireless connection to 608 for purposes likely relating to payment, item lookup, social media tasks or other features which may not be performed directly by the service provider or are enhanced through the use of a third party service, a two-way likely wireless connection to 604 for purposes relating to the retrieval of consumer account information, promotions and service provider to consumer communications, and real world physical interaction with 610, involving the use of the consumer's secure self-payment application and mobile device screen, and the retailer verification app and electronic device camera or other scanning or image capturing mechanism for the purposes of verifying a consumer's purchase.

Service Provider Network

The service provider network 604 is operated on a server or combination of computers and peripherals that is used to share information between parties in the secure self-payment system.

A function of the service provider network is to control access and permissions to specific information as needed by each party. This can be accomplished in part by hosting copies that can be accessed via the polling technique discussed above in connection with FIG. 1A. This polling technique is the preferred embodiment of communications between the retailer network and the service provider network. This polling implementation could use a 12-factor handshake where each side verifies the other's signed SSL Certificate. The network 604 may route traffic and allow or deny permission based on a variety of criteria such as accessing device type or IP, account type (consumer, retailer or third party), security clearance such as first-time user, regular user or third party, or other criteria that may be used to describe the accessing device for purposes relating to access permission. The service provider network 604 also hosts the web API. One embodiment would require a three-factor authentication where the first factor is a check of the device IMEI (a unique hardware identifier) matching the device connecting to the network to the user account, and the second would be a user token exchanged entirely over HTTPS to verify the user account for a user mobile device connection to the Service Provider network, and the third would be a user PIN handled on the local device. Devices failing the three-factor authentication could be denied access to certain functionalities until the user registers the device: in the event that the user account token fails, all functionality except registering/changing users could be disabled.

Figure 8:
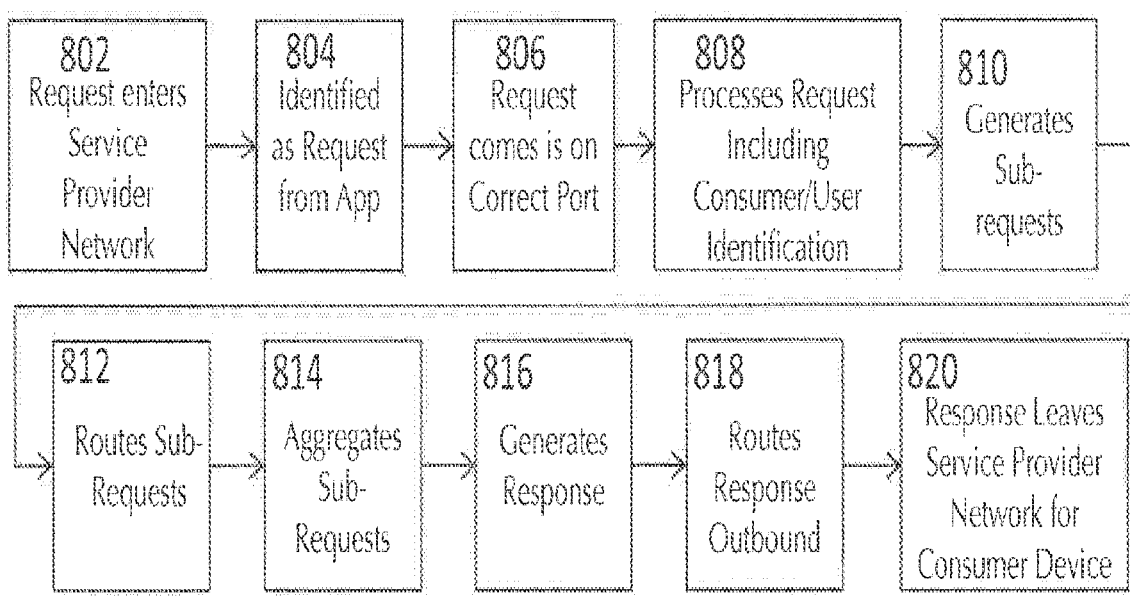
FIG. 8 is a diagram showing the process steps involved in fulfilling a request from a consumer device submitted to the self-payment system server, according to an embodiment of the invention.

Specific examples of interactions performed by the service provider network 604 include communicating query replies to the consumer mobile device 602 regarding consumer account information, promotions, QR, code verification reply or other service provider to consumer communications as outlined and explained in FIG. 8. Other interactions involving the service provider network involve communications with the retailer network 606 for purposes of item pricing or consumer information lookup to he pushed to the consumer mobile device 602; a link to the retailer electronic device 610 used to receive an interpretation of the captured QR code in order to push the appropriate reply to 602 consumer mobile device and retailer electronic device 610; and a link to a non-mobile consumer device 612 used for some of the same communications as with the consumer mobile device 602. The non-mobile consumer device 612 is explained further. All of these communications are two-way likely wireless network connections. The service provider does not necessarily require physical access to a server but this is illustrated nonetheless as the service provider may be using some sort of hosting for its web API or other assets.

Specific examples of the service provider network may include: (i) cloud hosted combination of virtual servers implemented on one-or-more hardware servers, those servers running software pertaining to this application, (ii) the network in (i) with the service provider providing its own servers rather than relying on cloud hosting, Retailer Network Retailer network 606 The retailer network is likely operated on a server or combination of computers and peripherals that is used to share information between parties in the secure self-payment system. There may be many instances of a retailer network. Each instance and description may vary from the other as the retailer network is proprietary to each retail client and some concessions or modifications may need to be made.

A purpose of the retailer network in the secure self-payment system is to provide the service provider network 604 and third party network(s) 608 with the information required to perform secure self-payment system tasks. The retailer network may route traffic and allow or deny permission based on a variety of criteria. General criteria that the retailer may use within its network include accessing device type or IP account type (service provider or third party), security clearance based on third party type (payment service, item lookup service, social network, etc), or geographical location of the device requesting a query reply. These are examples as the retailer is free to set its own network configuration. A common embodiment would reject all inbound communication from consumer devices, the service provider web API, and third party services, and synchronize the data with the outbound service provider by polling at set or variable intervals (for instance every 5 minutes). All incoming data would come from replies to outbound requests which would be recognized as responses to specific requests and accepted.

Specific examples of interactions involving the retailer network include providing the service provider network 604 with item lookup data such as inventory status, pricing or graphical assets, sharing consumer information, providing the service provider network with updated promotions, or receiving consumer data based the consumer's shopping habits as well as secure self-payment application purchase reports from the service provider network 604. Interactions with third party network(s) 608 do not necessarily include the service provider but are likely to relate to information passed through by other parties destined for a mutual third party such as payment or item information. The exact connection configuration and type of information shared between the retailer network 606 and the third party network(s) 608 will rely on each retailer's needs, The devices interact as illustrated in FIGS. 1 and 1A and in the corresponding descriptions herein. In the preferred embodiment, the interactions feature mostly two-way connections performed through a wireless connection, with the exception of the one-way QR-based exchange. The secure self-payment system functions or communications do not necessarily require physical access to the physical retailer server itself or to change the server or network configuration hut this is illustrated nonetheless as the secure self-payment system will be communicating with the retailer network—although, may be accessed via a delayed polling method as described in greater detail above in connection with FIG. 1A. In a non-preferred embodiment, the one-way QR-based exchange can be replaced by an alternative one or two-way medium; for instance NFC could be implemented as a bi-directional exchange.

One example of the retailer network is a retailer point of sale and inventory management system, implemented on either standard or custom hardware, with either a local database or a polling or non-polling connection to a cloud database solution. Additionally or alternatively, this network could be implemented for e-commerce rather than a local solution. The retailer network could also include a cloud-based inventory management and point of sale system wherein most of the processing hardware is located at a remote server location and is accessed through a wide-area network such as the internet. The retailer network could also take the form of a centralized or partially centralized network managed by the retailer or third party consisting of aggregated information from across multiple stores, each of which has a local point of sale and inventory management system with a polling or direct connection to said centralized network. Such a network consists of a combination of routers, firewalls, servers, as well as internal and third party software solutions.

Third-Party Network(s)

Third-party networks(s) 608. The third-party network(s) is likely operated on a server or combination of computers and peripherals that is used to share information between parties in the secure self-payment system. The secure self-payment system may be connected to many different third-party networks. Each third-party network performs a different function or is an alternate provider of the same function in order to enhance the secure self-payment application functionality.

The purpose of the third-party network(s) in the secure self-payment system is to enhance or modify functions performed by the secure self-payment application or to provide functionality that the service provider does not provide itself. The information controlled and hosted by the third-party networks(s) 608 could be social media, payment processing, secure payment data storage or other services. The third party network(s) may route traffic and allow or deny permission based on a variety of criteria such as accessing device type or IP, account type (service provider, consumer or retailer), security clearance based on query type and accessing device (payment service, item lookup service, social network, etc.), or geographical location of the device requesting a query reply. These are examples only as the third party is free to set its own network configuration.

Specific examples of functions performed by the third-party network include payment processing 418 performed through a payment processor network and API, communications with the consumer mobile device 602 relating to visual recognition and interpretation of a consumer's payment card through use of an API and the consumer mobile device camera, and communications with third-party network(s) 608 relating to payment or item information as required by the retailer. It should be noted that the secure self-payment system functions and communications do not necessarily require physical access to the physical retailer server.

Specific examples of third party networks include: (i) a payment provider network accessed through POST requests consisting of: XML, JSON or other paradigm for information exchange; (ii) a payment provider network accessed through a series of requests in accordance with an exchange protocol or business logic rule-set; (iii) a payment provider network accessed through other methods; (iv) a network providing an alternative function to payments (for instance OCR on an image) with access akin to (i), (ii) or (iii).

Retailer Electronic Device

Retailer electronic device 610 is typically a handheld or stationary piece of hardware that is traditionally used by retailers to identify items by scanning a barcode. The retailer capturing device may be a mobile device, the retailer's POS system or any other device that may be used to capture a barcode or QR code or to capture the underlying string within the QR code.

The, purpose of the retailer scanning device is to verify a consumer's purchase through a real world interaction. In the preferred embodiment, this real world interaction involves using the retailer's scanning device to read the QR code displayed in-app on the consumer's mobile device.

In the preferred embodiment, the retailer electronic device 610 is a mobile retailer electronic device with a retailer verification app which provides the device the functionality described herein. One example of such a device is a retailer owned iPod Touch augmented with custom hardware, such as a Honeywell Captuvo SL-22 sled, that attaches to the phone and provides a 1d-2d imager to augment the camera feed for faster capture and processing of optical images.

In a preferred embodiment, the retailer device has wide are network (internee) access and a method of displaying the information resulting from the communication protocol initiated by a successful scan of the QR code in concert with the verification app running on the retailer device.

In another embodiment, the retailer electronic device 610 is an already existing hardware POS barcode reader or other device with access to the service provider's web API and a visual interface such as a screen. In this embodiment, the barcode reader is responsible for reading the code displayed on the consumer's mobile device, and software within the barcode reader provides functionality for extracting information from the code, and providing this information to the web API. The web API receives the information embedded in the code and send a query reply back to the PDS system or reader to display on the screen.

In other embodiments the retailer device 610 is any other device that supports a video camera or picture camera for barcode reading. The retailer device 610 may also be an electronic device with hardware and software that support an alternative exchange, protocol to QR codes, such as NFC communications or other types of wireless communications.

In yet another embodiment, the service provider web API communicate secure self-payment method sales transactions and sales batches for live inventory management. The service provider web API may further communicate other information for display or storage on the retailer device 610.

A specific, and most often used, example of the interaction performed by the retailer scanning device is the act of verifying a purchase, and includes communication with the consumer mobile device 602, service provider network 604, and possibly the retailer network 606 and/or third-party network(s). The QR code displayed on mobile device 602 is captured and interpreted by retailer electronic device 610. Retailer electronic device 610 sends a query to the service provider network 604 asking whether the QR code corresponds to a legitimate purchase (step 428, as discussed in connection with FIGS. 4A and 4B, above). A reply is sent back to 610 retailer scanning device with an answer. The retailer scanning device 610 then displays either a legitimate purchase receipt (per step 430) or a request to reseed the information or a "no match" result (per step 432). Depending on the retailer's individual needs, the scanning device may also transmit some information relating to pricing or inventory updates to the retailer network 606 or third-party network(s) 608.

In another embodiment, the interaction by the retailer electronic device 610 may be used to perform an item exchange (per step 324). This function makes use of the same connectivity but depending on the retailer's own configuration it may require internal retailer connectivity and interactions not illustrated here.

In the preferred embodiment the connection between retailer electronic device 610 and consumer mobile device 602 is a physical real world interaction involving the retailer's electronic device and the retailer verification app being used to capture the displayed QR code directly from the consumer mobile device. Connections to the service provider network 604, retailer network 606, and third-party networks 608 are also conducted via two-way likely wireless connections. In a non-preferred embodiment this connection may be one-way or two-way based on the technologies in use and implementation details of those technologies. In addition, the nature of the QR code can be changed to allow for cases where the retailer wireless connection is disabled.

In other embodiments, the connection between the retailer device 610 and consumer device 602 may still make use of a real world physical interaction with the consumer's mobile device but the retailer device 610 may be a retailer POS system scanning device such as a barcode reader or NFC terminal or other hardware.

In yet other embodiments, the connections between the retailer electronic device 610, the service provider network, and the third-party network(s) 608 are not wireless. The exact configuration of such embodiments is dependent on retailer preferences and device capabilities.

In the preferred embodiment, specific examples of the retailer scanning device are mobile devices such as an Apple iPhone, Apple iPad, Apple iPod Touch, Samsung Galaxy S3 or Samsung Galaxy Note. These devices are modified to include software in the form of an application or "app" that provides the devices with the functionality necessary to carry out the self-payment systems and methods described herein.

In other embodiments, specific examples of the retailer scanning device are POS hardware systems such as the IBM SurePOS with a compatible barcode/QR code reader and access to the service provider web API. Again, these devices are modified to include software in the form of an application or "app" that provides the devices with the functionality necessary to carry out the self-payment systems and methods described herein.

Non-Mobile Consumer Device

Non-Mobile Consumer Device 612 is a device that is typically not mobile and cannot be used by a consumer in various locations. Generally, the non-mobile consumer device runs an OS, can install applications and has internet access. Typical components include an input device such as a keyboard or touch screen and a visual interface such as a screen or monitor. The non-mobile nature of the device relates to the fact that typically it does not operate on battery power or is too large to be portable by the user from one place to another, The purpose of the non-mobile consumer device for secure self-payment system functionality is to allow the consumer to perform certain tasks that do not necessarily need to be performed in-store. The non-mobile consumer device is not a necessary component of the secure self-payment system and is used by the consumer as an optional convenience. The non-mobile consumer device has access to the service provider web API via an internet connection and web browser as well. While it is unlikely that this device is not intended to be used to perform an in-store transaction, it is possible that such devices may provide access to a consumer's account or be able to perform some specific functions in the out of store flow 334.

Specific it that may be performed through use of the non-mobile consumer device include entering profile and preferences 308, and viewing purchase history through the use of a web browser, the consumer's login credentials to the service provider web API and a connection to service provider network 604. Other interactions include the ability to add items to cart 336 through the use of the fixed device input component or camera component and the connection to service provider network 604. Interactions with third party network(s) 608 may include the request for item information not accessible by service provider network 604 or to securely edit payment information. Generally, the specific functions of the non-mobile consumer device are preformed through a login to the web API.

In one embodiment it is possible that the non-mobile consumer device initiates a purchase and completes payment for an out-of-store purchase with service provider network 604. Service provider network 604 sends a verification QR code and purchase receipt for display in the consumer's secure self-payment application on consumer mobile device 602 for display in-store.

The non-mobile consumer device interacts with service provider network 604 and third party network(s) 608 using a wireless connection. The consumer's internet may not be wireless itself, but the consumer will not have direct wired access to either of these parties.

Specific examples of a non-mobile consumer device include a desktop PC such as a Dell Inspiron, or a smart TV with a web browser such as an LG Smart TV.

Request Processing in Networks

Figure 7:
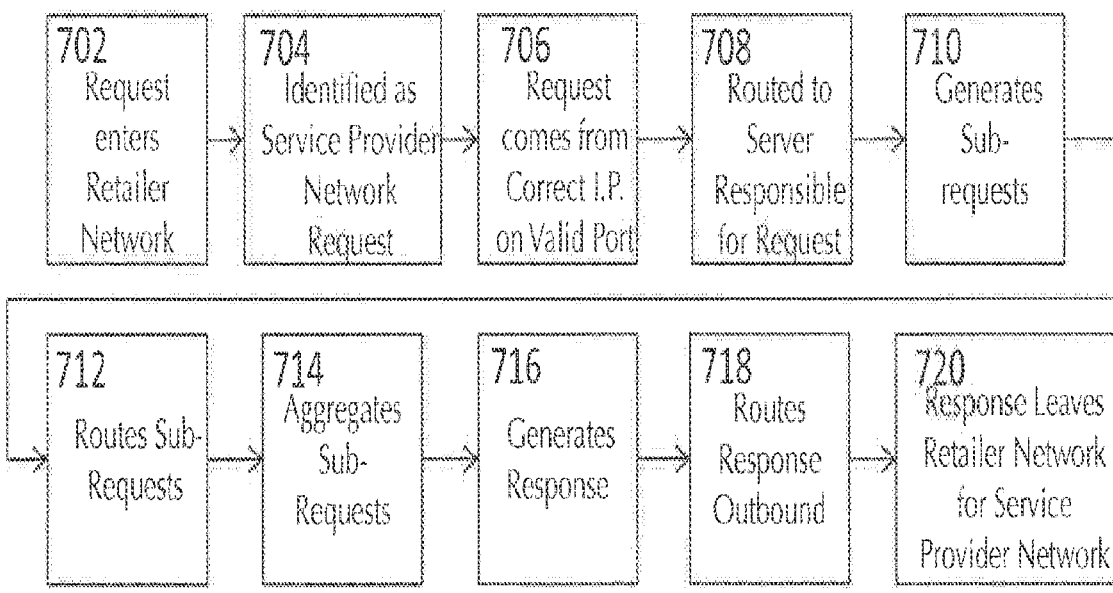
FIG. 7 is a diagram showing the process steps involved in fulfilling a request from the self-payment web API to the retailer network, according to an embodiment of the invention.

FIG. 7 is a diagram showing the process steps involved in fulfilling a request from the web API of the service provider network to the retailer network, according to an embodiment of the invention. Note that in the case of the polling solution mentioned in FIG. 1A, the process of this figure is not used but rather all data entering the retailer network comes as the response to an outbound request from the retailer network. In such a case, the polling software would run on the retailer server and manage a series of business logic rules for directing messages to and from hardware in a manner akin to this process.

The process begins at step 702, "Request Enters Retailer Network." In this step the service provider's web API hosted on the service provider network 604 generates a request and sends it outbound for the retailer network 606 to process. A common example, which will be traced throughout this description, is an inventory update. Other examples may include updating promotions, item prices, consumer profiles or pushing sales reports to the retailer. This request is routed to an appropriate machine on the service provider network 604 and sent out from a specific Internet protocol (IP) address. This request would originate on the service provider server and pass to the retailer network through a wide area network.

At step 704, "Identified as Service Provider Network Request," the request is sent to the IP address for the retailer network 606 by using any one of well-known network protocol communication standards, such as cURL and HTTPS, in a standard process that includes confirming the identity of the network, such as by confirming that the network is using a signed and verified certificate. The port to which the request is sent depends on the specific retailer configuration and permissions. This identification is executed in a back-and-forth handshake between the service provider server, the retailer server and the signing authority's server.

At step 706, "Request Comes from Correct IP on Valid Port," the router on the retailer network identifies the service provider network's request as having an IP address permitted to use the specific port on which the request is sent and, allows the request to enter the retailer network on the port. In the preferred implementation this step is instead addressed by the previous handshake using the Signing Authority to Confirm the Sender's identity.

At step 708, "Routed to Server Responsible for Request from Service Provider" the retailer network routes requests to appropriate servers on the network. The retailer network is already configured to send these requests. The server to which the request is sent may confirm the service provider's network certificate and evaluate the request. This could be a direct connection (already at the server), a connection to a specific virtualized server, on the same hardware as the current server, or a physically different server.

At step 710, "Generates Sub-Requests," the request is processed by the appropriate server and this processing generates sub-requests to be routed for processing. In the inventory update example, the machine to which the service provider network's request is sent generates an update command for the retailer inventory database, which could either be sent to the POS API or to the retailer database directly. A specific example would be a retailer having its inventory database on one server and its transaction database on another server. If the inbound request were to add a transaction and an inventory adjustment, this would create two separate requests and send each to the appropriate server on the network.

At step 712, "Routes Sub-Requests," sub-requests are sent as determined by the processing on the server in 710. For the inventory example, the inventory database is updated typically by a decrement command. For the transaction example, the database would he sent a create record instruction in the database's preferred implementation language (for instance SQL) with the fields and values matching the information sent in the add transaction sub-request The above example instructions also have routing information and/or security information/encryption over the retailer network, or in the cases of third-party services it has routing information and encryption to connect to the remote service. The request also has information about where to return results.

At step 714, "Aggregates Sub-Requests," the results of the sub-requests are returned to the retailer network 606 and routed to the machine responsible for the specific request by the router in a process similar to steps 702-708 in cases where the request went to an external process, or by permitted connections between machines, such as those with valid security certificates and IP addresses, in cases where the request is internal. "Returned" as used in this context means "is sent as the reply to the request" These returns may be treated as outbound communications by the retailer server rather than inbound, and generally have different processing rules or rejection rules when coming back through security. In cases of delays sub-requests may be sent again, or the entire request may timeout to either reprocess or have a timeout result sent back to the service provider network 604 for a decision on what to do. The requests are processed by one or more retailer servers, and may include the use of virtualized and physical hardware.

At step 716, "Generates Response," in the event that the critical sub-requests conclude successfully the request is tagged a success and relevant information is sent back. For successful requests where some sub-requests fail, those sub-requests are re-tried after sending a success message to the user. In the event the requests continue to fail, a warning/notification may be sent back to the service provider network, typically through a status code on the response to the request.

At step 718, "Routes Response Outbound," information is sent back to the self-payment network using standard communication protocols, such as cURL and HTTPS, confirming the service provider's certificate and the retailer connecting to the self-payment network on an authorized port, using the previously identified confirmed encryption keys (possibly reconfirming the identity).

At 720, "Response Leaves Retailer Network for Service Provider Network," the request result is sent to a permitted port on the service provider and is routed back to the self-payment server that made the request.

FIG. 8 illustrates the detailed steps taken for a consumer device request to the self-payment server, according to an embodiment of the invention.

At step 802, "Request Enters Service Provider Network," the consumer's mobile device 602 or non-mobile device 612 generates a request for the service provider's network to process. This request is routed to an appropriate server on the service provider's network.

At step 804, "Identified as Request from App," the request is passed to a server running the web API on the service provider network possibly through any number of the following: a firewall, a cache manager, a web request manager, a server configuration, an app preloading tool, a load balancing tool and sent to an instance of the web API running on the service provider network 604 for processing, At step 806, "Request Comes, is on Correct Port," the router on the server identifies the request as valid and allows the request to enter the service provider's network, routing it to a server for processing.

At step 808, "Processes Request including Consumer/User Identification," the web API checks the consumer ID for permissions to the specific data. The web API confirms the request and begins processing the request.

At step 810, "Generates Sub-Requests," the service provider server processes the request and generates sub-requests for processing. This could be a local port communication or external routing to either third-party network(s) 608 or the retailer network 606.

At step 812, "Routes Sub-Requests," sub-requests are sent as determined by the self-payment web API. Exact sequences of commands will vary depending on the nature of the request. The processed request reply is routed back to the self-payment server for further processing.

At step 814, "Aggregates Sub-Requests," the results of the sub-requests are returned to the self-payment network and routed to the machine responsible for the specific request. In case of delays, sub-requests may be sent again, and/or the entire request may timeout to either reprocess or have a timeout result sent back to the consumer device for a decision on what to do.

At step 816, "Generates Response," in the event that the critical sub-requests conclude successfully, the request is tagged a success and relevant information is sent back to the consumer device 602 or 612. For successful requests, where some sub-requests fail, those sub-requests are re-tried after sending a success message to the consumer device. In the event those sub-requests continue to fail a warning/notification is logged.

At step 818, "Routes Response Outbound," information is sent back to the consumer device using standard communication protocols, such as cURL and HTTP, confirming the ability of the consumer's device connecting to the service provider's network on an authorized port, using the previously identified confirmed encryption keys.

At step 820, "Response Leaves Service Provider Network for Consumer Device." the request result is sent to the consumer's mobile device 602 or non-mobile device 612 using a permitted port.

The following describes components of certain physical devices that may be used in a secure self-payment method transaction. Each device type that is used has many configurations and may include additional components or omit certain ones listed here. These illustrations are "typical" device examples only, and are not intended to limit the invention to any particular configuration described below. The descriptions below are best understood with reference to FIGS. 9 through 12.

Consumer Mobile Device Example

FIG. 9 is a diagram showing components of a consumer mobile device 620 to be used with the secure self-payment method, according to an embodiment of the invention. Although a smart phone 900 is shown as an illustrative embodiment of a consumer mobile device, the consumer mobile device is not limited to smart phones and may very well be a pair of smart glasses or a watch. The smart phone 900 is displayed as an example of one specific type of device that includes all the listed components. In reality, a consumer mobile device 620 may include only some of these components and may also have additional ones not illustrated. The consumer mobile device 900 is the main means through which the secure self-payment application is made available to the consumer and is used to perform secure self-payment system tasks. The components listed herein may be similar to the mobile device that the retailer uses to run the retailer app, as further described below.

Display/Input Components 902. The display is responsible for communicating information to the consumer. Through the display 902 the consumer views information communicated through the secure self-payment application and the device OS. The display 902 also gives the consumer feedback based on his or her interactions with the device. As a consumer enters in data, the display 902 shows a digital representation of the data he or she wishes to enter and/or are entering. An example of this is the typing in of one's credit card number. As each individual number character is selected by the user, the display visualizes this input and display it in a designated field.

The display 902 is also the main method of visualizing the inputs made by the user and communicating messages and data sent by the service provider's web API or other parties.

In this illustration, the display also serves as a means for permitting the consumer to input data into the mobile device, and into the mobile OS and the secure self-payment application. Other well-known input means may be used for the consumer mobile device either in connection with or as an alternative to the display, such as a tactile device (such as a device keypad), means for voice or speech-to-text recognition, means for detecting physical movements made with the device, or a hardware attachment. The most common hardware components used as an input device include a tactile keypad or keyboard, or the display itself via a touch screen.

Location Sensing Components 904. The location sensing components 904 are used for what is commonly known as "location services." The consumer mobile device 900 via installed software and third party services can provide the consumer device with the ability to sense a specific geographical location or area where the consumer's mobile physical device is located. In the preferred embodiment, the secure self-payment application uses location information mainly for purposes relating to sending and crafting geographically targeted offers and item suggestions, to notify the consumer that he or she is near or in a secure self-payment method-enabled store, or to enable the consumer to search for nearby retailers.

Location sensing components for enabling a mobile consumer device to provide location information are well known in the art, and the exact component or software responsible for this function varies by device manufacturer or use case. Commonly used methods of determining a device user's location include GPS or Wi-Fi.

Internet Connection Components 906. Internet connection components are used by the mobile consumer device 900 to access information that is not stored directly on the mobile device. Through the internet connection components 906, and with the proper permissions, the consumer mobile device 900 can access the internet and local or other networks. The method of access varies based on case, network, service provider, hardware or other factors. Common mobile methods of access to networks and the internet include 3G, LTE and Wi-Fi. The secure self-payment application requires the use of this when processing many requests such as item lookups and item suggestions.

Camera(s) 908. The consumer mobile device 908 may have more than one camera. The device camera(s) 908 are used to capture an image or video of physical items and then create a representation of them in an image or video format viewable to the user or to be used with certain third-party services. The secure self-payment application may use camera components for: identification of physical items via barcode or other item identifiers so that pricing may be looked up or the item added to the shopping cart; to capture payment card information through the use of a third party API or SDK or to take an image of the consumer so that the image may be associated with the consumer's profile Light 910. The device light 910 is used to adjust the brightness of the area in front of the device cameras) 908 to provide a more suitable environment for image capture. This light 910 may be used to aid in the capture of an item barcode image for item identification purposes.

NFC Component 912. The NFC, "near field communications" component is typically used as a method of conducting secure transactions between two NFC-enabled devices. Typically, the NFC component is internal to the device but may also be an attachable sticker or tag. To perform a transaction, two compatible devices such as a mobile device and a POS terminal must be held around 4 inches from each other so that a small packet of data may be transmitted. In some embodiments, these transactions may be data sharing between two people such as photos or stored contacts or monetary such as a funds transfer between two mobile wallets or an in-store purchase of goods or services. The secure self-payment application may use the NFC component to read the token, or string linking to a database entry which is represented by the QR code displayed on the consumer receipt. In embodiments that use NFC to capture the token, the QR code itself may be an optional component that provides a standard self-payment system feature and provides an alternate reading method for non-NFC devices. In this case, the consumer device NFC chip is responsible for transmitting the string to the retailer device NFC chip.

Retailer System Example

Figure 10:
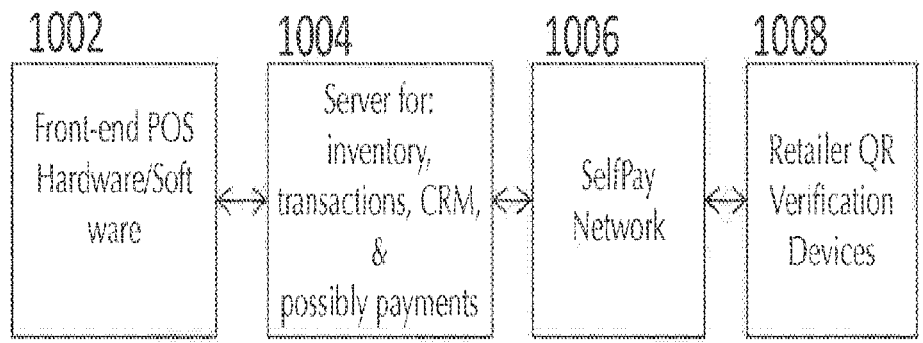
FIG. 10 is a diagram of a type of retailer point-of-service ("POS") system which may be used with the secure self-payment system and method, according to an embodiment of the invention.

FIG. 10 is a diagram of a type of retailer point-of-service ("POS") system which may be used with the secure self-payment method, according to an embodiment of the invention. The POS system 1000 is a comprehensive hardware and software combination that many retailers use for front and back office functions. The most common use for a POS system is to track sales and identify inventory items.

For purposes of explanation, the POS system 1000 described herein is abstracted into four components. It is understood, however, that other POS systems with additional or fewer components, or with components different from those described below may be used in connection with the secure self-payment systems and methods described herein.

POS System 1000 includes front-end hardware and software components 1002. The POS front-end hardware and software components 1002 include the hardware and software responsible for the standard operation of classical POS systems, other than the server components 1004 discussed below. These hardware and software components may comprise well known components that enable the POS system 1000 to perform standard functions related to, for example, tracking sales, identifying inventory items. Specific examples of POS hardware systems and components include the IBM SurePOS system, a Symbol or Honeywell laser barcode scanner, and an APG POS Podium Cash Drawer. Specific POS software includes RetailPro 9 POS, Lightspeed POS, and Quickbooks POS Pro 13.

POS system 1000 also includes a server 1004 for inventory, transactions, and customer relationship management ("CRM"). The server 1004 contains a POS database which stores sales transaction information, inventory information, and customer information. The server 1004 may also contain a supporting API that permits additional functions such as enhanced inventory descriptions, live inventory updates between the brick and mortar store and an online web presence, or web site updates such as shipping information through third party integration such as an eCommerce toolkit. This server will accept read and write requests from both the front-end hardware/software 1002 and the service provider network 1006.

The service provider network 1006 is the network that runs the supporting web API for the secure self-payment application. The service provider network 1006 manages requests from the secure self-payment application running on the consumer mobile device, including requests for purchases. In another embodiment, these purchase requests can be managed by 1004 where the server 1004 is equipped with supporting API functionality. The service provider network 1006 optionally controls a database to store information that might not be contained in the POS, such as information related to enhanced item descriptions or secure self-payment method exclusive promotions, Retailer QR verification devices 1008 are examples of the retailer electronic devices 610 that the retailer uses to "spot check." A spot check is the physical act of the retailer verifying a consumer's purchase. Traditionally this act is done through visual inspection of a paper receipt and the items the consumer is taking out of the store. In the secure self-payment system case, this involves the use of the retailer's capturing device 610 capturing and verifying the QR code displayed on the consumer mobile device 602 to check for a matching transaction.

As noted herein, the self-payment system and method in its various embodiments may rely on one or more networks. These networks may generally consist of a local area network ("LAN") connected to a wide area network ("WAN") through one or more routers. Each network may include one or more server machines, physical and/or wireless connections, routers and firewalls. Each server takes the form of a machine with a specific local address on the network, and each server includes hardware and software that enables it to run programs, manage information, and process requests. In particular, each server runs specific programs that receive, process, and forward message requests, as well as to performs tasks specific to that particular network (as further described with respect to each network). In addition, each server includes storage means to process, store, and manage specific information (typically through databases and application caching).

Each network may further include one or more routers, which are devices for directing traffic to specific machines in a Local-Area Network (typically a wired network but may have wireless links). The servers and routers may further include firewall software, which are programs for the restriction of communications to a network (when run on a router) or a server (when run on the server). Each network may utilize or include portions of the Internet, which is generally classified as a wide area network with relatively open communications and low security.

Retailer Example

Figure 11:
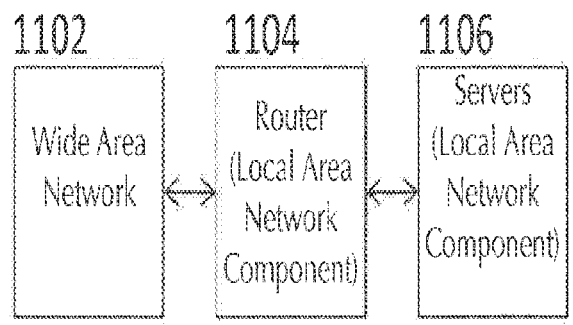
FIG. 11 is a diagram of a type of retailer network which may be used with the secure self-payment system and method, according to an embodiment of the invention.

FIG. 11 is a diagram of a retailer network 1100 which may be used with the secure self-payment method, according to an embodiment of the invention. The retailer network 1100 includes a wide area network (WAN) portion 1102. This WAN portion 1102 can generally be any distributed network that is either open access or non-local. In the preferred embodiment, the WAN portion of the retailer network 1100 is most typically the internet.

The retailer network also has a local area network (LAN) portion that includes one or more routers 1104. Each router is a piece of hardware with corresponding software that functions primarily to determine which servers 1106 to send requests to. The secondary function of each router is to provide a software firewall that can reduce traffic internally by blocking bad requests before routing them on the LAN.

The LAN portion of the local area network also includes one or more servers 1106. The servers 1106 run software to support the network functionalities described herein. In the case of a retailer network these servers 1106 typically include hardware and software that enables them to perform functions related to inventory management, CRM, payment processing, returns, and transaction history. As an example, the retailer LAN network typically has a server and POS system connected. This server and POS system controls the retailer's proprietary information relating to items, pricing, HR, or other functions relating to running a brick and mortar store. The POS system may be connected to a database with the above information and may run supporting API to augment specific functions such as providing additional item information or connecting to other non-internal sources of information.

Service Provider Network Example

Figure 12:
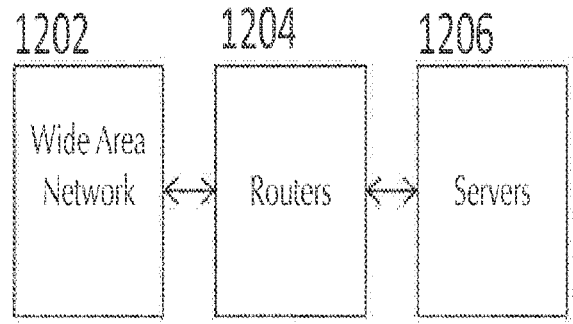
FIG. 12 is a diagram of the service provider network to be used with the secure self-payment system and method, according to an embodiment of the invention.

FIG. 12 is a diagram of the service provider network to be used with the secure self-payment method, according to an embodiment of the invention;

The service provider network 1200 includes a WAN portion 1202. The WAN can generally be any distributed network that is either open access or non-local. In the preferred embodiment, the WAN portion of the retailer network 1200 is most typically the internet.

The service provider network also has a LAN portion that includes one or more routers 1204.

The LAN portion of the service provider network also has one or more servers 1206 that run software to support the specific functionality of the service provider network 1200. In the case of the service provider network 1206 these servers 1206 typically include hardware and software that enables them to perform functions related to serving a webpage, an API for a mobile device OS application, a webserver for domain management, an operating system for managing the server configuration, one or more database systems for managing the data generated by these tasks, socket configurations for request redirection, deployment infrastructure, remote back-up infrastructure, load balancing tools, analytics tools, and other functionalities.

In the preferred embodiment, the secure self-payment method is used in combination with a verification app used by the retailer, typically a retail sales associate, for the purpose of successfully verifying a consumer's purchase. The service provider makes this verification app available to its retail clients by making the app available for download over a network via a secure portion of the service provider's website, or by providing the retailer with storage media containing the verification app and from which the retailer can install the app on retailer POS and mobile devices. For security purposes, the service provider generally limits access and use of the verification app to retailers. For example, the service provider may require that a retailer create a separate, secure retailer account with the service provider, and may limit access to the verification app to those retailers who have such an account. Limit to the verification app may be securely controlled because it serves a different purpose than the self-payment app made freely available to the public. In contrast, the verification app may not be publically available to download on a general "app store," The retailer verification app may also require the use of login checks in addition to a username and password such as verification of the device ID, a retailer login or geographic information.

Example Consumer Device and Self-Payment Application Screen Views

Figure 13:
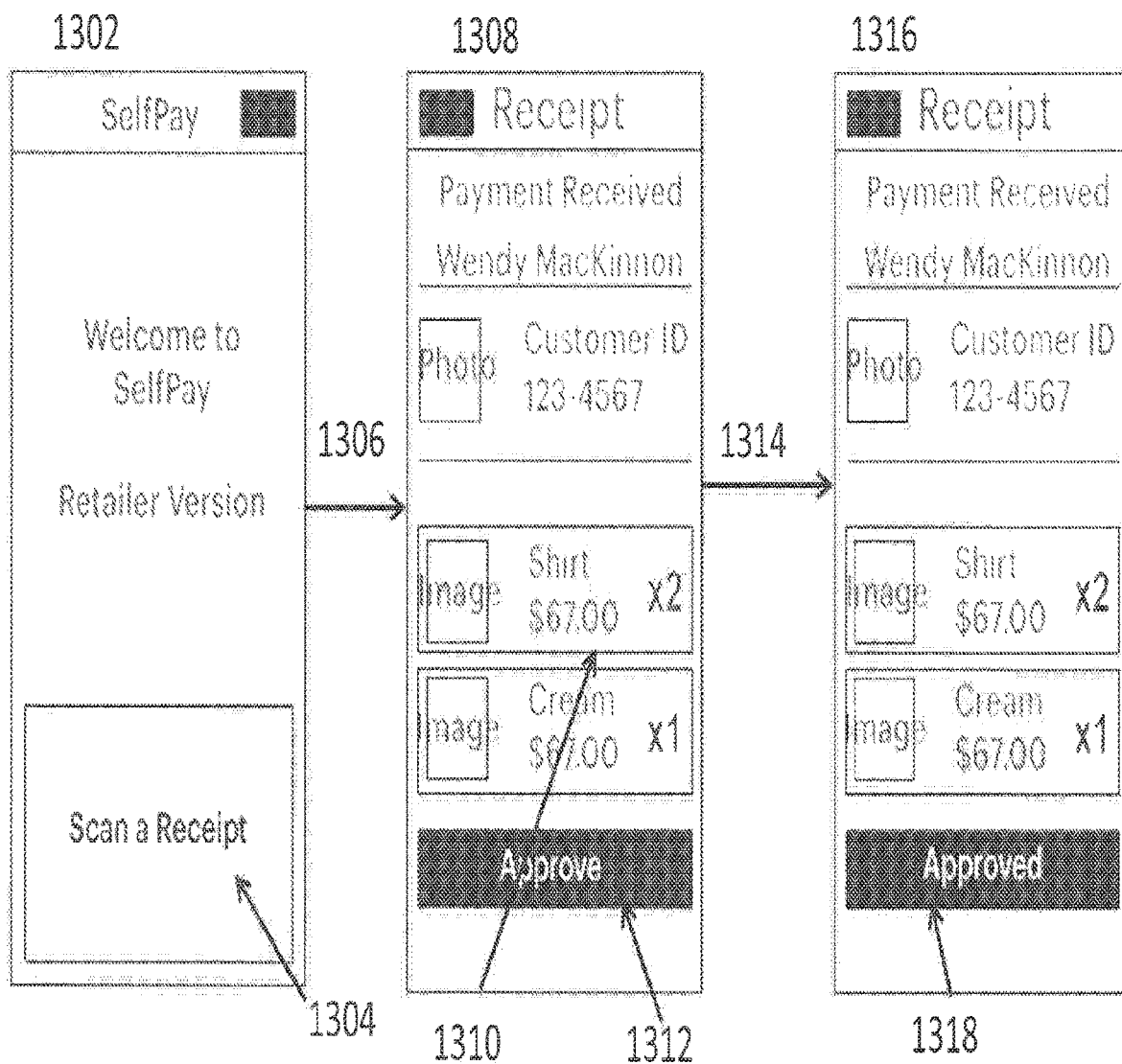
FIG. 13 is a screenshot diagram demonstrating the process involved in successfully verifying a consumer purchase through use of the retailer self-payment verification application, according to an embodiment of the invention.

FIG. 13 is a diagram illustrating the process involved in successfully verifying a consumer purchase through use of the retailer self-payment verification app, according to an embodiment of the invention. The retailer verification app may display an initial welcome screen 1302 once the secure self-payment system has authenticated the retailer. The main function of the welcome screen 1302 is to provide the retailer with retailer specific functions, most notably a method to verify and match a code, such as a QR code, on the consumer's receipt to a sales transaction. Upon prompting the verification app to capture a QR coded receipt 1304 the retailer verification app presents the retailer with an interface to identify the QR code displayed on the consumer's device. This requires a real-world physical connection involving the retailer mobile device running the verification app and the consumer's mobile device running the secure self-payment application and is similar to the method in which the consumer identifies an item in the secure self-payment application by scanning a barcode, QR code, or other identifier. In the preferred embodiment the retailer device operating the verification app has a camera, along with a processor and software adapted to operate the camera to facilitate scanning of a unique code, such as a QR-code, and to scan or otherwise capture an image of the code. The retailer device may further comprise a display along with hardware and software adapted to display a real-time image of the image to be captured by the camera in order to facilitate scanning of the code.

Once the retailer has utilized the verification app to capture, the QR code on the consumer's device, the verification app operates at 1306 to send a query regarding the QR code to the to service provider's web API. The verification app sends a query to the service provider's web API to retrieve the purchase information corresponding to the QR code as presented by the consumer. This is further explained in FIGS. 4A and 4B and is part of the spot check procedure 426 and includes 428, 430 and 432. If the retailer captures the QR coded receipt displayed on the consumer's mobile device or a paper print out of the QR coded consumer receipt, the retailer's device displays information that is referenced by the successful transaction. It is the matching of the QR code through the use of the service provider's web API and the corresponding display to the retailer device that is the confirming step that can give the retailer confidence that the in-aisle consumer payment transaction was successful and legitimate. Each retailer can customize how and where and whether to-verify every transaction or can set up his or her own custom business process for verifying selected transactions based on the retailer chosen rules and processes.

Upon a successful query, the verification app presents the retailer with a confirmation screen 1308. The service provider's web API pushes to the retailer verification app the purchase information that was recorded when the consumer submitted payment and the QR code was originally generated 1310. The retailer verification app displays portions of the purchase information that may assist the retailer with verification of the purchase, such as the items and the quantity purchased, along with the consumer's identification information. The confirmation screen 1308 provides the retailer with an "Approve" function 1312, which the retailer uses to signal to the verification app that the retailer has reviewed the purchase and verified the details thereof.

Following activation of the "approval" function, at 1314 the retailer verification app sends information to service provider's web API indicating verification and approval of the purchase. The retailer verification app notifies the secure self-payment system that the retailer has approved and inspected the purchase. At this point, the web API may mark the purchase as approved. The web API may also update the purchase information in the data record to indicate that the purchase has been approved. In addition, the web API may send a notification to the consumer's secure self-payment app with a timestamp of approval or receipt verification attempt, which the self-payment app may then store in connection with the consumer's receipt. In the preferred embodiment the QR code is only valid for one purchase transaction and cannot be used twice for the same task. For example, if once the QR code has been captured and approved originally, the associated data record is marked as approved and is otherwise recorded in the retailer's system; as a result, if a consumer or retailer attempts to capture the same QR again, the web API will notify the retailer that it cannot be approved again. In this case, the web API would return information to the retailer's verification device stating that the information linked to by the QR code has already been approved and no further action relating to the approval process should be taken. In the use case where spot checks are not universal, a geofence (coordinate region on a map) could be used for the same functionality. In this case, the action of the device leaving a designated area in combination with the location sensing component of the mobile device would internally mark the receipt as having left the store. In such a case, the retailer should apply its loss prevention procedures if a customer tries to use the receipt twice. In this implementation, the QR code itself does not change on the consumer device; the database software running on the service provider server updates the transaction with details about the consumer device having left the store (where the locations services on the consumer device are enabled) or the QR code having been used to complete a spot check and no longer being valid for further spot checks. When the query for that transaction is sent by the process that occurs on the retailer device after capturing the QR code, the updated information is sent with the new result.

After activation of the "approval" function, the verification app presents the retailer with an approved screen 1316. The web API sends back a message to the verification app that it has received the approval and will mark the purchase as approved 1318. On subsequent verification attempts by other retail associates, the verification app may Show the approved screen right away instead of requiring an "Approve" 1312 action, Although the functionality of the verification app has been described above with respect to a purchase verification, the retailer verification app may include a "retailer dashboard" which provides additional functionality, such as giving the retailer access to data relating to total sales, promotions, and consumer behavior. For such functionality, the retailer verification app may include logic for accessing the retailer's POS system and related databases which store and manage inventory, sales and transaction information, promotions and marketing, and consumer information.

In some embodiments, the retailer verification app is capable of performing an associate-assisted in-store payment. In this case, the verification app contains similar functionality as the self-payment app of the consumer's mobile device, and the retailer mobile device containing the verification app is operated in a similar fashion as the consumer's mobile device with the self-payment app in order to handle a self-checkout process. In certain embodiments involving associate-assisted in-store payments, the payment process may differ in that the consumer is not required to have a secure self-payment account for the most basic payment function: instead payments are performed using the retailer's service provider account.

In other embodiments, the retailer verification app contains functionality that allows it to be used as an aid for the store associate when helping a consumer in-store. In particular, the retailer's verification app may be used for item lookup queries, promotions, or to better understand the consumer's past shopping and browsing history.

In yet another embodiment, the retailer verification app is not offered as a stand-alone application but is instead bundled in with POS software or other retail hardware or software through the use of a retailer service provider API.

Following are descriptions of app screenshot with respect to the self-payment app as displayed on the consumer mobile device. These screenshots are for illustration purposes only and do not represent the full feature set that may be available in the final product.

Figure 14:
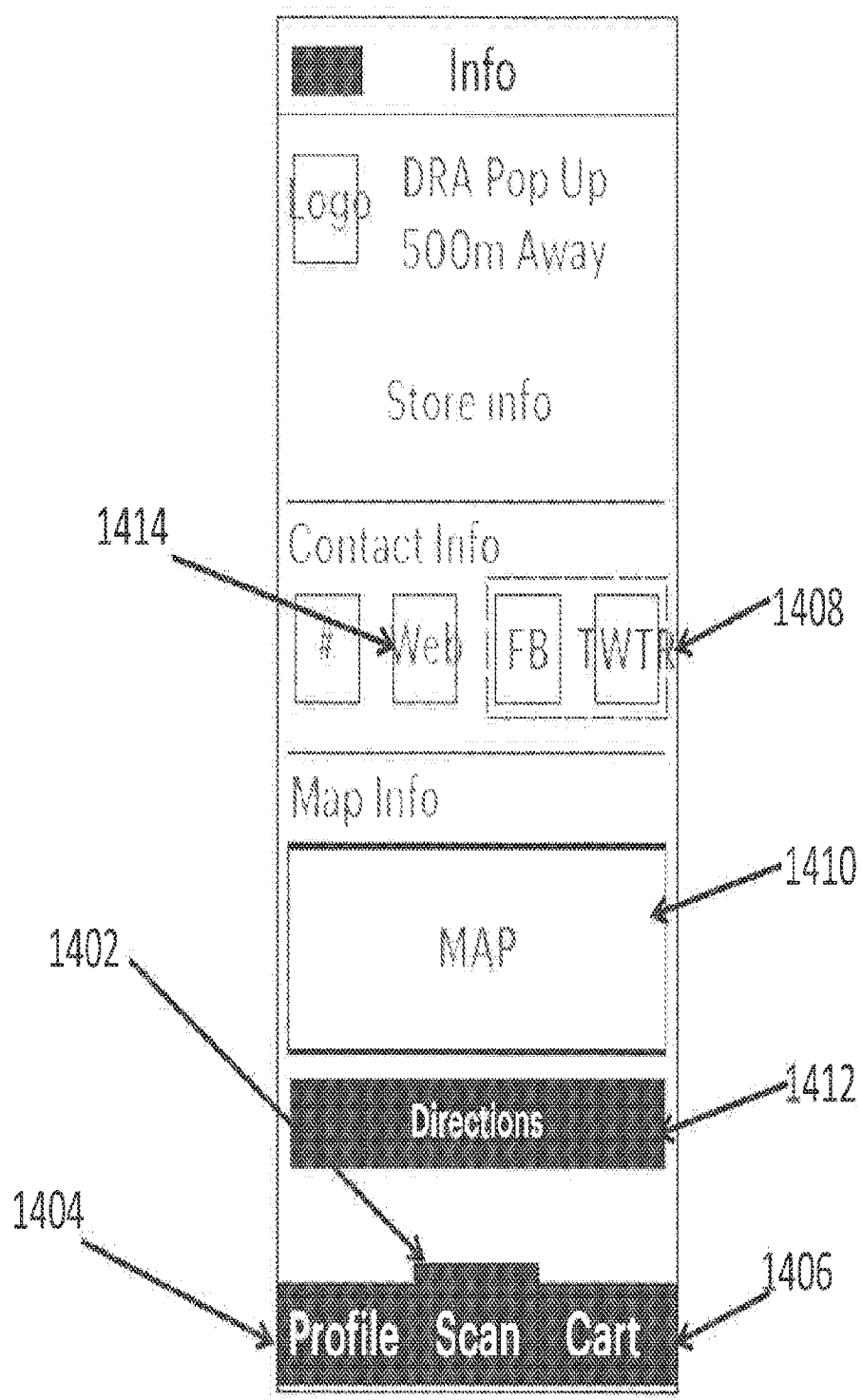
FIG. 14 is an example menu interface which may be displayed on the consumer's device via the consumer's secure self-payment application according to an embodiment of the invention.

FIG. 14 is an example menu which may be displayed on the consumer's device in-app, according to an embodiment of the invention. A retailer branded info screen, such as the one set out in FIG. 14, may be a first step to performing many functions possible from the secure self-payment application app. Key features displayed in FIG. 14 include item scanning to be used to identify an item that the consumer wishes to purchase 1402, a profile section used to view the consumer's previous purchases, payment methods, or to add personal information 1404, and the consumer's shopping cart used to view the items that the consumer has already identified as those he or she wishes to purchase 1406. Other features may include a variety of functions that may he performed through a third-party API. On this mock up screenshot these include social media links 1408. Map 1410. Directions 1412, Internet 1414, and Scan 1402. It is possible that other functions may also make use of third-party APIs.

Figure 15:
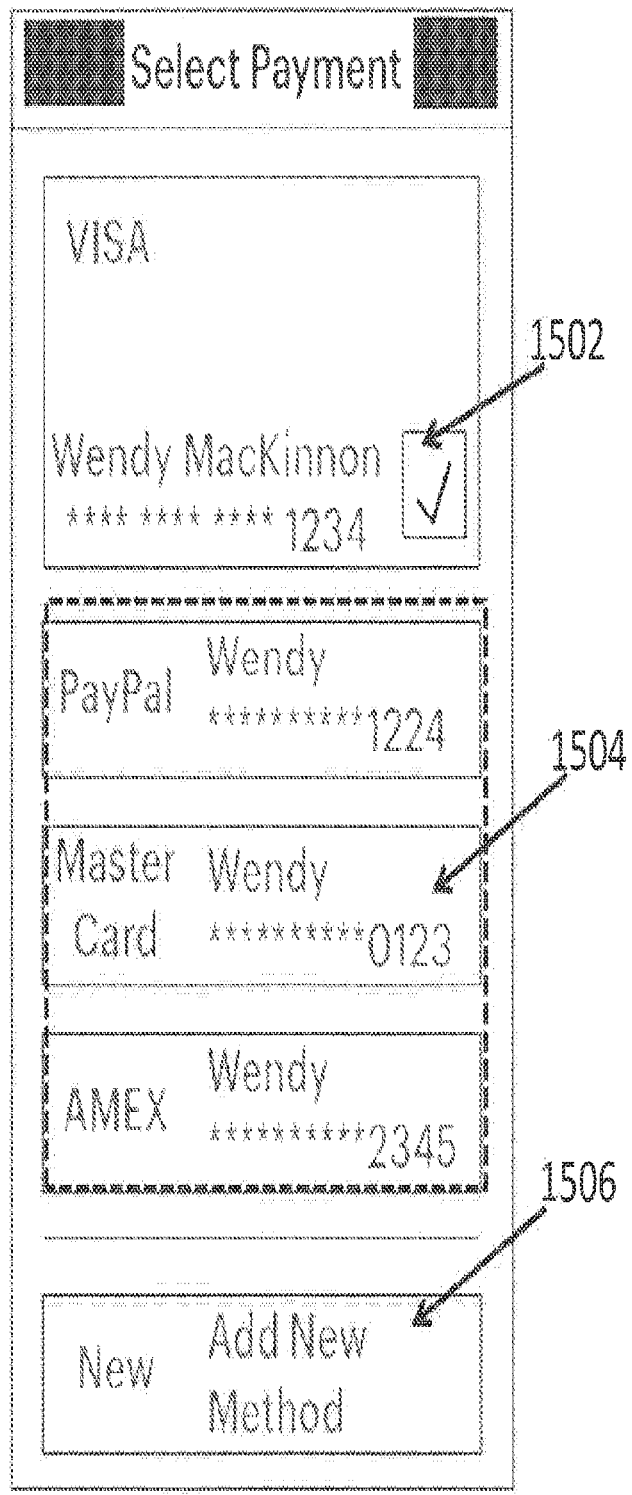
FIG. 15 is an example payment method interface which may be displayed on the consumer's device via the consumer's secure self-payment application, according to an embodiment of the invention.

FIG. 15 is an example payment method interface which may be displayed on the consumer's device in-app, according to an embodiment of the invention; this figure provides an illustrative screen of some possible payment methods that the service provider may offer for use in app. According to the embodiment shown, the payment screen is visible upon checkout 322. A similar screen may be visible upon the creation of a consumer profile 308. Due to the wide variety of possible payment options it may be necessary that the secure self-payment method use multiple payment processors. In the case illustrated in FIG. 15, the consumer has selected his or her Visa credit card as his or her payment card of choice 1502. The consumer also has several payment methods available 1504 that he or she has inputted previously during a checkout 322 or profile update 308, and has the ability to add a new payment method 1506.

Figure 16:
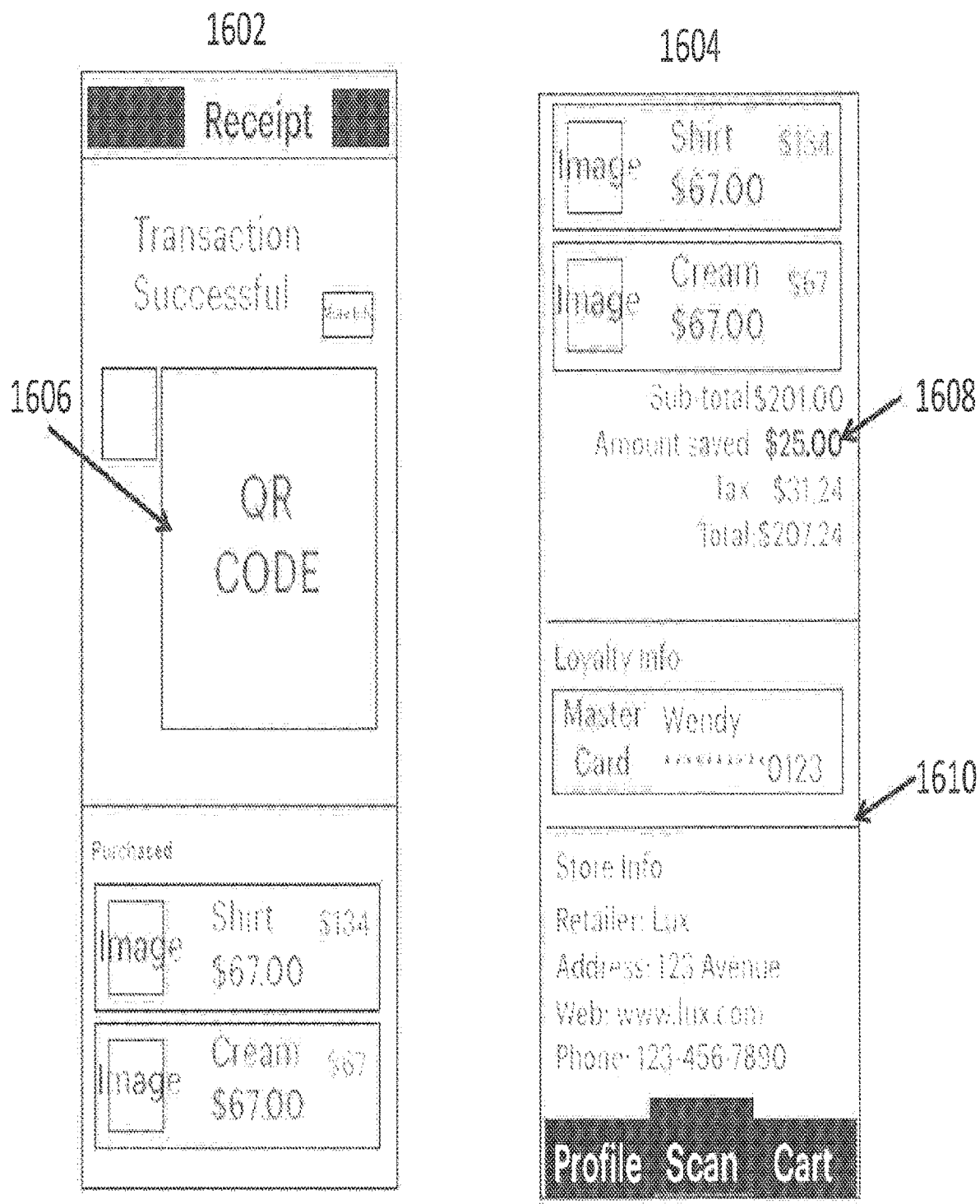
FIG. 16 is an example QR-coded receipt as displayed on the consumer's device via the consumer's secure self-payment application, according to an embodiment of the invention.

FIG. 16 is an example QR-coded receipt as displayed on the consumer's device in-app, according to an embodiment of the invention. This is an illustrative QR-coded receipt which is generated by the secure self-payment app after the consumer's payment method has been approved and the purchase has completed at step 424. This QR-coded receipt is used by the consumer as proof of the completed transaction and may also be used for record keeping purposes by the consumer and is available on demand in the consumer profile section of the secure self-payment application. The self-payment web API generates a QR code and creates a receipt to be displayed in-app that includes the QR code, items purchased, loyalty information, store information and other information relevant to the transaction.

1602 is an example of an itemized receipt along with a QR code 1606 that may be captured by the retailer's device. After capturing the QR coded receipt displayed on the consumers' mobile device and assuming a matching transaction is, found by the web API in the service provider's network, the retailer's device then displays relevant purchase information as illustrated in FIG. 13. This code is verified by the retailer in a spot check process 426 through the use of a real world physical connection involving the retailer's electronic device running the retailer verification app, capturing the QR-coded receipt from the consumer device and running the secure self-payment application and is used for verification purposes only. FIG. 13 describes one method in which this may be done.

1604 is the same screen viewed on the consumer device after the consumer scrolls down. This screen displays additional information such as the total purchase amount and applicable discounts 1608, and applicable loyalty and retailer information 1610.

In one embodiment, the service provider makes available the QR coded receipt for use with the Apple Passbook app. Apple Passbook integration is beneficial to the consumer in that it provides a method of verifying the QR code that allows the consumer to take fewer steps to display the QR code. This integration is particularly useful if the consumer spends additional time at the retail store such that his or her device enters "sleep" mode and under normal circumstances the secure self-payment application would need to be opened once again.

Figure 17:
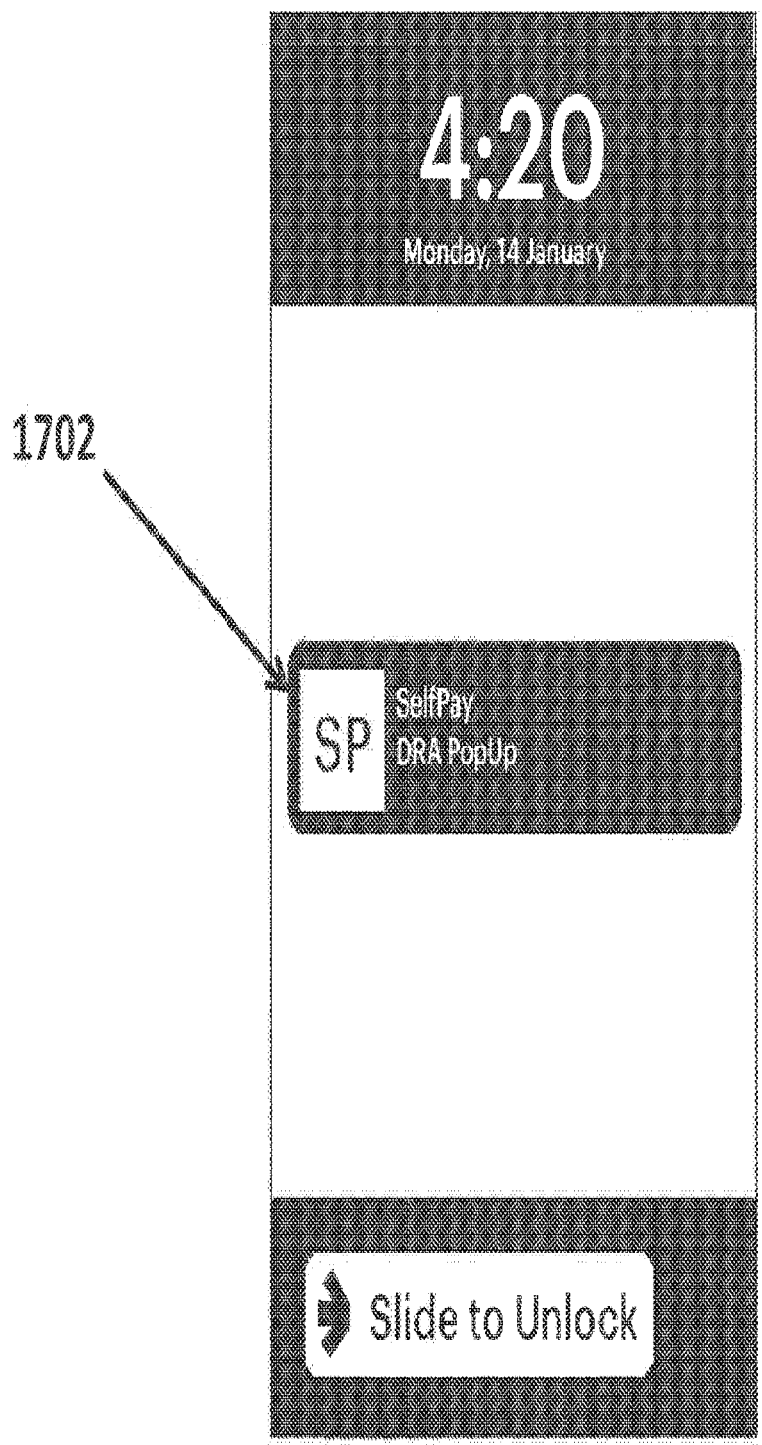
FIG. 17 is an example device lock screen displayed on the consumer's mobile device when the consumer's secure self-payment application is integrated with Apple Passbook, according to an embodiment of the invention.

FIG. 17 is an example device lock screen displayed on the consumer's mobile device when the secure self-payment method is integrated with Apple Passbook, according to an embodiment of the invention; this screen is an example of how the secure self-payment application can integrate with Apple Passbook. Passbook integration is optional for core secure self-payment application functionality but provides extra convenience to the consumer while becoming a more time saving purchase verification method. Using location services, Passbook can determine whether the consumer is near or in the retail store and as per the consumer's settings will notify them through a screen similar to this one. The location-sensing functionality of Passbook allows it to detect if the consumer is currently at a GPS coordinate within a geofence corresponding to a retailer where the consumer has made a purchase and received a receipt through the self-payment application. Having configured the self-payment app to display transactions in Passbook, the consumer may designate that the self-payment app should display notifications for these retailers in Passbook when the consumer device is near a physical location for these retailers. In the example show in FIG. 17, the consumer has completes a transaction with a specific retailer and has configured the self-payment app to display notifications from the app in Passbook. As a result, when the consumer is near a physical store location for the retailer, Passbook displays the self-payment app notification 1702 on the lock screen of the consumer device.

By swiping left or right on the bar displaying the "SP" logo 1702, the mobile device opens Passbook and displays the most recent QR-coded receipt from that location. If the consumer has multiple purchases, the receipts corresponding to those purchases are displayed in reverse order of time of purchase in Passbook. In the preferred embodiment, the consumer profile settings in the secure self-payment application and Apple Passbook allow only the QR code that corresponds to the purchase to be displayed directly on the device lock screen. In this case, the retailer uses its scanning device as with a regular secure self-payment purchase method transaction but the consumer is not required to unlock his or her device and reopen the self-payment application.

Figure 18:
FIG. 18 is an example interface displayed on the consumer's mobile device and viewed in the Apple Passbook app when the consumer's secure self-payment application is integrated with Apple Passbook, according to an embodiment of the invention.

FIG. 18 is an example interface displayed on the consumer's mobile device and viewed in the Apple Passbook app when the secure self-payment method is integrated with Apple Passbook, according to an embodiment of the invention.

Once Apple Passbook is launched, the transaction-specific QR coded-receipt 1802 is displayed. The method in which Apple Passbook is launched determines whether or not other retailers or Passbook apps will be visible on the screen. If the app is launched from the lock screen while near a secure self-payment retailer, only the transaction-specific QR-coded receipts will be visible. If launched otherwise, other Passbook passes may be visible as in FIG. 18. In general, however, once the consumer has set the correct options in his or her secure self-payment app profile and settings, the secure self-payment app and Passbook are integrated to provide the functionality described here. The exact appearance of the display interface and method of in-app QR code retrieval depend on the consumer profile and settings as well as behavior and permissions of the third-party Passbook API.

The screen shown in FIG. 18 displays a functional QR code, in that it is identical to the QR code on the receipt accessible via the non-Passbook secure self-payment app. Accordingly, the QR code shown in the Passbook display in accordance with FIG. 18 may also be scanned by the retailer and used as purchase verification. In certain embodiments, once the QR code is verified by the retailer's scanning device, the secure self-payment system will instruct Passbook to mark the code as used or keep a tally of how many times the QR code was captured. In other embodiments, the outcome of the code being used will be displayed on the retailer side, mitigating the need to show such information on the consumer side.

Figure 19:
FIG. 19 is an example QR code illustrating certain characteristics thereof, according to an embodiment of the invention.

FIG. 19 is an example used to define the key characteristics of a QR code, according to an embodiment of the invention, and in that regard illustrates certain features of QR codes.

A QR Code is a type of matrix bar code that may store rich information or link to a web page with information and may be read by smart phones, tablets or other mobile or fixed scanning devices. The code consists of black or colored modules arranged in a square pattern on a white background. QR codes look like barcodes (due to their black and white coloring and square shape), but when captured with a smart phone, tablet or other mobile device, they reveal encoded information. The QR code can store over 7,000 numeric, or 4,000 alphabetic characters.

A QR code which is displayed on a consumers' mobile device can be read by a smart phone, tablet or other fixed or mobile device that is equipped with a camera or scanner, an app having functionality or manual entry code that allows it to decipher the QR code, and internet or wireless area network access. In typical cases, the person deciphering the QR code only needs to open a code-reading app, scan or take a picture of the QR code using a camera which is accessible through a code-reading app, and then the code-reading app will retrieve the data linked to the QR code such that this data will automatically appear for the person on his or her mobile device. In the preferred embodiment, the QR code is processed by a camera, through progressively attempting to recognize the data in the code. The process automatically terminates with results when it successfully identifies and decrypts the QR code.

The secure self-payment method requires the retailer to capture the QR code displayed on the consumer's device with a device with access to a connection to the service provider API for purchase information retrieval. In the preferred embodiment, this device is a retailer mobile device running the retailer verification app. In other embodiments, this may be a fixed or mobile scanner equipped with the ability to read QR codes and to connect to the service provider API either directly or through an intermediary such as the retailer's POS system.

Additional Features

In certain embodiments, the secure self-payment application may include optional features. These optional features may be implemented in specific cases per the retailer's or consumer's request, through the use of third-party APIs, or through functionality included in some of the remaining 20 modules in the service provider's suite. The features listed below provide an illustration of the flexible and modular nature of the secure self-payment application in its entirety.

Each of the optional features described below is provided via one or more optional application-specific modules that may be included with the self-payment app. Each of these modules contains the requisite software to carry out the functionality described in connection with the features. In addition, where applicable and as further described below, other self-payment system components, including the retailer verification app, retailer mobile device, service provider network (including web API), and retailer network, may contain additional hardware and or software to accommodate the additional functionality of the software modules that implement the optional features described below.

Personal Associate. Separate from the self-payment method but part of the service provider's self-payment application suite is a personal associate option. This personal associate option may be used by consumers to contact an associate at any time during the shopping experience or from outside the store to request a fitting appointment, advice or other interaction with a retail associate. Through the personal associate option, consumers may confirm a "Personal Shopper Assistant" option from the following choices:

(a) Choose a personal associate Used by consumers who are familiar with the retailer's store associates. Consumers may choose a specific known associate by name.

(b) Choose any sales associate—To be used by first-time consumers, or those who do not have a favorite sales associate. This may display a list of currently available or all retail associates for selection.

(c) Decline the option to have a personal sales associate connected to your shopping visit(s). This choice may be used by consumers in the store who would like an uninterrupted shopping trip. This will notify the retail associates via the retailer electronic devices that the consumer does not require assistance in selecting items or advice on product selection.

The personal shopper features are provided via a personal shopper software module that includes the functionality needed to carry out the above steps. The software module displays the above choices and prompts the consumer to select one of the above choices. Once the consumer selects one of the above choices the personal associate module makes use of a similar or the same service provider API as the secure self-payment process. In particular, the personal shopper software module utilizes the communication capabilities of the consumer mobile device to send a message to the web API of the service provider network indicating the consumer's choice. The web API of the service provider network responds by processing the message from the personal shopper software module and generating one or more messages to be pushed to the retailer verification apps operating on retailer mobile devices and POS systems indicating the consumer's choice.

In one embodiment, a method of identifying retail associates requires all retail sales associates to carry a QR-coded business card or form, or have their personal associate QR code displayed on their retailer device. If at a point in the shopping trip, an associate does provide assistance, and if the consumer accepts the option, using the self-payment app the consumer can scan a sales associate-specific QR code. Upon scanning the sales associate's specific QR code, the secure self-payment application provides the consumer with the option to leave a comment or fill out a consumer satisfaction survey at a later time. In this case, the consumer satisfaction survey, may be sent to the retailer's eCommerce website, POS system, store manager's email or other online repository. This feature also allows the retailer to track purchases attributable to specific sales associates.

Consumer Visit Alert. Using the consumer visit alert option within the secure self-payment application, consumers may make an appointment to visit a store to pick up items that were previously selected in-app. Upon selecting the option to set up a consumer visit, the secure self-payment application provides the consumer with the ability to select a specific date, time, location and personal sales associate. Upon making an appointment via the customer visit alert module, the secure self-payment application sends a request through the service provider's web API to the retailer's electronic device running the companion retailer verification app or network. The retail associate may then reply back with an "available" or "not available" response. If the retail associate is available at the requested time, the web API may send back a confirmation to the secure self-payment application and the consumer may then be guaranteed that a sales associate will be able to meet with them to provide all services without having to wait.

In one embodiment, when a consumer creates an appointment using the secure self-payment application, the web API may send the sales associate or retailer a "Customer Visit Alert" to the retailer electronic device. This alert may contain information such as the name of the consumer, the selected items, and the date and time of the consumer's expected arrival.

The consumer visit alert features are provided via a consumer visit alert software module that includes the functionality needed to carry out the above steps. This module prompts both consumer and retail associate to input their request or reply. This module uses a similar or same service provider API as the secure self-payment process. In particular, the consumer visit alert module utilizes the communication capabilities of the mobile device to send a message to the service provider's web API so that it may be routed properly to the receiving retailer or consumer device.

Product Description and Reviews. The web API may connect to a third party database that stores reviews or descriptions of the item that the consumer has identified in-app. The item information and review databases may be separate entities and may be stored with either the service provider, retailer, or require a third-party API or connection to an information service. Specific examples of third party review platforms that provide an API for integration into systems such as the secure self-payment system include PowerReviews and BazaarVoice.

In one embodiment, the review platforms may serve to provide the consumer with additional user generated content relating to the product he or she is interested in.

In another embodiment, the consumer may be able to interact with the item information or reviews service by submitting his or her own content which may then be viewed by other consumers.

The product review features are provided via a reviews module that includes the functionality needed to carry out the required embodiment. This module will prompt the consumer to view reviews as well as provide an option for submitting his or her own thoughts on the product. It is intended that the reviews feature is used as a method of viewing additional user generated information about a product that is not stored with the retailer or an item information database. This will likely require the reviews module to make contact with a third-party review platform web API for retrieval and submission of reviews.

Share Item Over Social. Networks. The secure self-payment application may provide the consumer with an option to select a social networking function so that information may be posted on his or her profile on social networks such as Facebook, Twitter, Pinterest or others. The secure self-payment application will make use of third-party social network APIs as well as au in-app interface for this function. Using the interface displayed in-app on the consumer's device, the consumer may post information including the price, product name, an image of one or more items, and/or images of themselves holding or wearing the item(s), and any other identifiers.

The social media features are provided via a social media module that includes the functionality needed to carry out the required task. It may be that one, some, or all social media sites mentioned above are supported by the retailer or the secure self-payment application at any given time. As each social media site provides its own readily available mobile API, the social media module will select the proper API to use and display the correct interface. The social media module may also connect with the consumer profile 502 to retrieve the consumer's username and password for faster access to his or her social media account.

Inventory Tag Removal and Bagging. The secure self-payment application displays an option that allows the consumer to request item anti-theft tag deactivation, shopping bags or help with heavy items. This requires a connection to store inventory 504 and requires that the retailer internally mark items in its software database which have an inventory tag or may be too heavy too lift. The service provider API retrieves this information and displays it to the consumer as he or she retrieves the product information for view on the screen of his or her device.

In one embodiment, the service provider web API sends a message to the retailer mobile device running the companion retailer verification app that a consumer needs assistance with tag deactivation and may provide a locution where the consumer is by accessing the consumer device location services component.

In another embodiment, the consumer may be directed to a designated store, associate or service desk via an in-app message, The tag removal, bagging and assistance features are provided via a software module that includes the functionality needed to carry out the required task. It may be that a retailer does not have the required resources to internally flag items in its 504 database as heavy or needing deactivation. When possible, the service provider API would retrieve the necessary information from the retailer database and 504 and display the relevant flags on the consumer's mobile device in-app.

Additional Embodiments

An alternate use of the invention is based-around a two-capture process that may be used to ensure that only an authorized device can use a code to purchase items. In the preferred embodiment of this alternate use, this two-capture process can only begin when the consumer using the device knows a PIN or password for the consumer application. For clarity, and in accordance with industry nomenclature we refer to this alternate use as a mobile wallet. This alternate use does not include the consumer adding items to a virtual cart in a physical store but rather the consumer would shop in a regular fashion by selecting items in store and bringing them to a cash desk.

For this service provider mobile wallet, a consumer signs-up for the service provider and is provided with a consumer-specific QR code which represents a consumer-specific string used for identification of the device and consumer. In the preferred embodiment, this consumer QR code is unique by device-consumer pair but may vary across the consumer's multiple devices or if multiple consumers are using the same device. After creating an account the consumer could then use his or her mobile wallet as follows.

The consumer engages in a traditional in-store shopping experience and brings the, items he or she wishes to purchase to the retailers point of sale (POS) system.

The retail associate/cashier enters the presented items into the retailer's POS system and builds a corresponding purchase receipt, often by scanning the barcode on the items presented by the customer.

The consumer elects to pay with the service provider's alternate self-payment method. The retail associate confirms this selection of payment method on the POS or retailer mobile electronic device. This confirmation readies the retailer's capturing device to capture the consumer/device-specific QR code displayed on the consumer mobile device.

The consumer opens the service provider technology to the payment screen, establishing a network connection to the service provider. This network connection is the connection 112 in FIG. 1 and FIG. 1A. This screen initially displays the consumer/device specific QR code.

The consumer/device specific QR code is captured by the retailer verification device as embodied by the physical real world connection 110 in FIG. 1 and FIG. 1A.

The retailer POS sends the customer and device pair string represented by the QR code along with the transaction details to the service provider by a regularly established connection 114 (see FIG. 1 and FIG. 1A).

The self-payment service provider processes the received information, and sends a payment authorization request to the payment processor corresponding to the retailer's specific payment processor.

The payment processor receives a payment authorization request and processes that request, resulting in either a granted authorization or an error code. In the event of an error code, the code and any corresponding information is sent to the service provider, and then to one or both of the consumer and the retailer with appropriate additional information, depending on the preferences of the service provider. The receipt of an error code leads to either termination of the process or a restart.

In the event of a granted authorization, the service provider is sent the success message from the payment processor.

The service provider then generates a companion transaction-specific and unique QR code for the consumer and the specific device. The transaction-specific unique QR code is sent to the consumer device by look-up of the appropriate open connection for response.

The consumer device receives the transaction-specific QR code and updates its currently displayed payment screen display to show the new image. Note that the new QR.-code will never arrive at the consumer device unless the consumer has a valid device for the customer-device pair code as the service provider server can check the device identifier and other properties to ensure the code is only sent to a valid device. In the event the code is not received the retailer can abort or restart the process. A warning may also be sent to the consumer or retailer device.

The retailer captures the transaction-specific QR code directly from the consumer's device. This transaction specific code contains a verification key confirming that the real world device is not fraudulent.

The retailer capturing device processes the transaction-specific QR code and sends the information collected by capturing the transaction-specific QR code to the service provider server.

If a matching transaction-specific QR code is found on the service provider server, for this specific transaction, the process continues. If a matching transaction-specific QR code is not found, the service provider sends a warning message back to the retailer and/or the consumer and either or both parties may abort or restart the process.

The service provider server then sends the payment processor server the request to complete the previously authorized transaction.

The payment processor attempts to complete the transaction, resulting in either a successful transaction or an error code. Upon an error code, the service provider will send appropriate notifications to the retailer or retailer and consumer devices, and will most likely abort the transaction.

In the event of a successful transaction by the payment processor, the service provider notifies all parties. At this point, the transaction-specific QR code is marked as used by the service provider and no longer works to provide payment. The retailer and/or service provider may store the transaction-specific QR code information to be able to capture again in the future for processing returns in a manner similar to that described in the Process Return flow 324. The net result of this process is a dual capture solution for a mobile wallet, where the first scan initiates an authentication check, and the second capture verifies the consumer, by confirming the self-payment mobile wallet service provider has audited the consumer-device pairing and current connection. Note that no sensitive information is directly exchanged: the consumer/device QR code only works on that specific device so it cannot be used on another device, while the unique transaction code will only work for the exact purchase that is uniquely identified in that retailers POS. The above steps need not occur in the particular order listed unless otherwise stated.

The invention can be implemented in digital electronic circuitry, or in computer hardware, firmware, software, or in combinations of them. The invention can he implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

All references, including publications, patent applications, and patents, cited herein are hereby incorporated by reference to the same extent as if each reference were individually and specifically indicated to be incorporated by reference and Were set forth in its entirety herein.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to hose of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

The use of individual numerical values are stated as approximations as though the values were preceded by the word "about" or "approximately." Similarly, the numerical values in the various ranges specified in this application, unless expressly indicated otherwise, are stated as approximations as though the minimum and maximum values within the stated ranges were both preceded by the word "about" or "approximately." In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value or range. Thus, as a general matter, "about" or "approximately" broaden the numerical value. Also, the disclosure of ranges is intended as a continuous range including every value between the minimum and maximum values plus the broadening of the range afforded by the use of the term "about" or "approximately," Thus, recitation of ranges of values herein are merely intended to serve as a shorthand method of referring individually to each separate value falling within the range, unless otherwise indicated herein, and each separate value is incorporated into the specification as if it were individually recited herein.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

I claim:

1. A system comprising:
   a capturing device configured to receive a unique code from a mobile device, the unique code corresponding to a transaction and identifying a data record, the data record identifying a plurality of items and further identifying a type of payment, wherein the unique code represents a purchase of the plurality of the items;
   communications circuitry communicatively coupled to the capturing device and configured to transmit, to a remote server, a query including the unique code and receive a response including information to enable validation of the transaction; and
   a display communicatively coupled to the communications circuitry and configured to display an indication regarding a status of the transaction,
   wherein the system is configured to access a dynamically generated data feed based on a uniform resource location (URL) embedded in the unique code.

2. The system of claim 1, wherein the system is associated with a retailer electronic device, a kiosk or a POS system.

3. The system of claim 1, wherein the system is associated with a retailer electronic device, the retailer electronic device including an optical scanner.

4. The system of claim 1, wherein the transaction is for a purchase of the plurality of items.

5. The system of claim 1, wherein the transaction is for an exchange of one or more of the plurality of items.

6. The system of claim 1, wherein the system is associated with a retailer electronic device, the retailer electronic device including an optical scanner, the optical scanner being a barcode or QR code scanner.

7. The system of claim 1, wherein capturing device is an optical capture device and associated software configured to process captured images.

8. The system of claim 1, wherein the status indicates the transaction has been approved.

9. The system of claim 1, wherein the status indicates the transaction has been denied or flagged for attention.

10. The system of claim 1, wherein the status further includes information about the transaction including one or more of: a list of the plurality of items, payment information, a time and place of purchase, retailer information, and/or user identity information.

11. The system of claim 1, wherein the validated transaction is at least based on a verification of the unique code, the verification comprising comparing embedded information from the unique code to a table, the table comprising valid purchase information.

12. The system of claim 1, wherein the capturing device is a camera or a laser code reader.

13. The system of claim 1, wherein the display is configured to display one or more of: the plurality of items purchased, a user's name, a total purchase, an amount, a time and place of purchase and/or other data usable to verify the purchase.

14. The system of claim 1, wherein the system is a handheld mobile device or a stationary piece of hardware.

15. The system of claim 1, further comprising a server, the server comprising:
server communications circuitry;
a processor and memory that receive from the server communications circuitry information associated with the transaction;
instructions running on the processor and stored in the memory that, when executed: process the transaction information for a sale of the plurality of items and generate the unique code.

16. The system of claim 1, further comprising a server, the server comprising:
sever communications circuitry;
a processor and memory configured to receive from the communications circuitry the unique code and verify the unique code by retrieving embedded information from the unique code, the processor and memory further configured to compare the embedded information from the unique code to one or more entries in a table containing valid purchase information; and
the server communications circuitry configured to forward the status of the transaction to the communications circuitry.

17. The system of claim 1, wherein the unique code captured by the capturing device is displayed on a smartphone.

18. The system of claim 1, wherein the unique code is optically scanned by a scanner in association with a verification application.

19. The system of claim 1, wherein the data feed is connected programmatically to a database entry corresponding to the transaction.

20. The system of claim 1, wherein the system interacts with a smartphone of a user to exchange information.

21. The system of claim 1, wherein the data feed relates to a database entry corresponding to the transaction.

22. The system of claim 1, wherein the URL is accessed via a domain name server lookup associated with a retailer application.

23. The system of claim 22, wherein the domain name server lookup is related to a specific location on a service provider web API, and wherein the specific location corresponds to a data record in a database of a specific original purchase sent through a self-payment application.

24. A system comprising:
a capturing device at a point-of-sale device configured to receive a unique code from a mobile device, the unique code corresponding to a transaction and identifying a data record, the data record identifying a plurality of items and further identifying a type of payment, wherein the unique code represents a purchase of the plurality of the items;
communications circuitry in the point-of-sale device communicatively coupled to the capturing device and configured to: transmit, to a remote server, a query including the unique code and receive a response including information to enable the point-of-sale device to validate the transaction, and provide an indication regarding a status of the transaction,
wherein the system is configured to access a dynamically generated data feed based on a uniform resource location (URL) embedded in the unique code.

25. The system of claim 24, wherein:
the capturing device is a server or an optical scanner; and
the indication is transmitted to a smartphone; and
the user is a consumer or a personal shopping assistant.

26. The system of claim 24, wherein the transaction is a sale of the plurality of items.

27. The system of claim 24, wherein the point-of-sale device is associated with a retailer verification app and a retailer service provider API.

28. The system of claim 24, wherein the unique code was generated to verify a valid purchase of the plurality of items.

29. The system of claim 24, wherein validating the transaction includes a server configured to compare embedded information from the unique code to entries in a table containing valid purchase information and provide an indication whether the embedded information in the unique code matches an entry in the table containing valid purchase information.

30. The system of claim 24, wherein the unique code represents a valid purchase.

31. The system of claim 24, wherein the capturing device is an optical scanner associated with the point-of-sale device and the point-of-sale device includes a display.

32. The system of claim 24, wherein the transaction is for a purchase of the plurality of items.

33. A system comprising:
a capturing device at a point-of-sale device configured to receive a unique code from a mobile device, the unique code corresponding to a transaction and identifying a data record, the data record identifying a plurality of items and further identifying a type of payment, wherein the unique code represents a purchase of the plurality of the items;
communications circuitry in the point-of-sale device communicatively coupled to the capturing device and configured to transmit, to a remote server, a query including the unique code and receive a response including information to enable the point-of-sale device to validate the transaction; and
a display communicatively coupled to the communications circuitry and configured to display an indication regarding a status of the transaction,
wherein the system is configured to access a dynamically generated data feed based on a uniform resource location (URL) embedded in the unique code.

34. The system of claim 24, the data feed is connected programmatically to a database entry corresponding to the transaction.

35. The system of claim 24, wherein the URL is accessed via a domain name server lookup associated with a retailer application.

36. The system of claim 35, wherein the domain name server lookup is related to a specific location on a service provider web API, and wherein the specific location corresponds to a data record in a database of a specific original purchase sent through a self-payment application.

37. The system of claim 24, wherein the data feed relates to a database entry corresponding to the transaction.

38. The system of claim 33, the data feed is connected programmatically to a database entry corresponding to the transaction.

39. The system of claim 33, wherein the data feed relates to a database entry corresponding to the transaction.

40. The system of claim 33, wherein the URL is accessed via a domain name server lookup associated with a retailer application.

41. The system of claim 40, wherein the domain name server lookup is related to a specific location on a service provider web API, and wherein the specific location corresponds to a data record in a database of a specific original purchase sent through a self-payment application.

* * * * *